(12) United States Patent
Ling et al.

(10) Patent No.: US 12,723,986 B2
(45) Date of Patent: Sep. 1, 2026

(54) SURFACE-ENHANCED RAMAN SCATTERING (SERS) PLATFORM FOR ANALYSIS

(71) Applicant: NANYANG TECHNOLOGICAL UNIVERSITY, Singapore (SG)

(72) Inventors: Xing Yi Ling, Singapore (SG); In Yee Phang, Singapore (SG); Gia Chuong Phan Quang, Singapore (SG); Siew Kheng Boong, Singapore (SG); Howard Yi Fan Sim, Singapore (SG); Sher Lin Charlynn Koh, Singapore (SG); Shi Xuan Leong, Singapore (SG); Yong Xiang Leong, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 195 days.

(21) Appl. No.: 18/264,370

(22) PCT Filed: Feb. 4, 2022

(86) PCT No.: PCT/SG2022/050053
§ 371 (c)(1),
(2) Date: Aug. 4, 2023

(87) PCT Pub. No.: WO2022/169421
PCT Pub. Date: Aug. 11, 2022

(65) Prior Publication Data

US 2024/0044802 A1 Feb. 8, 2024

(30) Foreign Application Priority Data

Feb. 4, 2021 (SG) ............................ 10202101214P

(51) Int. Cl.
*G01N 21/65* (2006.01)

(52) U.S. Cl.
CPC ..... *G01N 21/658* (2013.01); *G01N 2021/656* (2013.01); *G01N 2201/1293* (2013.01); *G01N 2201/1296* (2013.01)

(58) Field of Classification Search
CPC ..... G01N 2201/1293; G01N 2201/129; G01N 2201/1296; G01N 21/554; G01N 21/65;
(Continued)

(56) References Cited

U.S. PATENT DOCUMENTS

2007/0155021 A1* 7/2007 Zhang .............. G01N 33/54373 977/902
2012/0208174 A1* 8/2012 Galush ................ G01N 21/554 435/7.1
2018/0217068 A1* 8/2018 Tabb ..................... G01N 33/58

FOREIGN PATENT DOCUMENTS

CN 108920897 A * 11/2018 ............. G06N 3/045
WO WO 2019139543 A1 7/2019

OTHER PUBLICATIONS

Zhu et al., "Frequency Shift Raman-Based Sensing of Serum MicroRNAs for Early Diagnosis and Discrimination of Primary Liver Cancers," Analytical Chemistry 90: 10144-10151, Jul. 2018. (Year: 2018).*

(Continued)

*Primary Examiner* — Kara E. Geisel
*Assistant Examiner* — Christina I Xing
(74) *Attorney, Agent, or Firm* — Seed IP Law Group LLP

(57) ABSTRACT

Herein disclosed is a surface-enhanced Raman scattering (SERS) chip for generating multiple SERS profiles simultaneously from one or more analytes suspected to be in a sample. The SERS chip includes one or more substrates, and one or more Raman probes formed on the one or more substrates, wherein each of the one or more Raman probes
(Continued)

includes a SERS-active nanoparticle grafted with a receptor molecule, (i) wherein the receptor molecule on each of the one or more Raman probes on one substrate is different from the receptor molecule of the one or more Raman probes on another substrate, and/or (ii) wherein the one or more Raman probes include two or more Raman probes and wherein the receptor molecule on each of the two or more Raman probes on one substrate is different, wherein the receptor molecule includes a thiol group proximal to the SERS-active nanoparticle and a functional group distal to the SERS-active nanoparticle, wherein the functional group interacts with the one or more analytes to induce a change in molecular vibration of the receptor molecule which is identifiable by surface-enhanced Raman scattering for generating the multiple SERS profiles. Herein also discloses a method of identifying one or more analytes suspected to be in a sample, the method includes contacting the surface-enhanced Raman scattering (SERS) chip described in various embodiments of the first aspect with a sample suspected to contain the one or more analytes, collecting SERS signals from the surface-enhanced Raman scattering (SERS) chip which has contacted the sample, constructing a combined-SERS profile from the SERS signals, and providing the combined-SERS profile to a device configured with a model trained to identify the one or more analytes from the combined-SERS profile.

15 Claims, 49 Drawing Sheets

(58) Field of Classification Search
CPC .... G01N 21/658; G01N 33/574; G01N 33/98; G01N 33/53; G01J 3/44; G06N 20/10
See application file for complete search history.

(56) References Cited

OTHER PUBLICATIONS

Song et al., "An ultrasensitive SERS sensor for simultaneous detection of multiple cancerrelated miRNAs," Nanoscale 8: 17365-17373, Sep. 2016. (Year: 2016).*
Lee, KM., Herrman, T.J. Determination and Prediction of Fumonisin Contamination in Maize by Surface-Enhanced Raman Spectroscopy (SERS). Food Bioprocess Technol 9, 588-603 (2016) (Year: 2016).*
Cao, Jie, and Jinzu Wang. Development of Ag Nanopolyhedra Based Fiber-Optic Probes for High Performance SERS detectionElectronic Supplementary Information (ESI) Available: Characterization Techniques, and Relevant Measurements and Characterizations of the Fiber SERS Probes. (Year: 2015).*
Kang S, Rahman A, Boeding E, Vikesland PJ. Synthesis and SERS application of gold and iron oxide functionalized bacterial cellulose nanocrystals (Au@Fe3O4@BCNCs). Analyst. Jun. 15, 2020;145(12):4358-4368. doi: 10.1039/d0an00711k. (Year: 2020).*
ACS Nano 2012, 6, 6, 4892-4902 (Year: 2012).*
Anal. Chem. 2018, 90, 17, 10144-10151 (Year: 2018).*
Agarwal et al., "SERS detection and DFT calculation of 2-naphthalene thiol adsorbed on Ag and Au probes," *Sensors and Actuators B: Chemical 237*:545-555, Jun. 2016. (11 pages).
Belousov et al., "A flexible classification approach with optimal generalisation performance: support vector machines," *Chemometrics and Intelligent Laboratory Systems 64*:15-25, Oct. 2002. (11 pages).
Dina et al., "Characterization of Clinically Relevant Fungi via SERS Fingerprinting Assisted by Novel Chemometric Models," *Analytical Chemistry 90*:2484-2492, Jan. 2018. (9 pages).
Dixon et al., "Comparison of performance of five common classifiers represented as boundary methods: Euclidean Distance to Centroids, Linear Discriminant Analysis, Quadratic Discriminant Analysis, Learning Vector Quantization and Support Vector Machines, as dependent on data structure," *Chemometrics and Intelligent Laboratory Systems 95*:1-17, 2009 [Published Online Aug. 2008] (17 pages).
Elci et al., "Recognition of glycosaminoglycan chemical patterns using an unbiased sensor array," *Chemical Science* 4:2076-2080, Mar. 2013. (5 pages).
Fariña et al., "Terpene Compounds as Possible Precursors of 1,8-Cineole in Red Grapes and Wines," *Journal of Agricultural and Food Chemistry 53*:1633-1636, Feb. 2005. (4 pages).
Ho et al., "Rapid identification of pathogenic bacteria using Raman spectroscopy and deep learning," *Nature Communications 10*:4927, Oct. 2019. (8 pages).
Ho et al., "SERS and DFT investigation of the adsorption behavior of 4-mercaptobenzoic acid on silver colloids," *Colloids and Surfaces A: Physicochemical and Engineering Aspects 474*:29-35, Mar. 2015. (7 pages).
International Search Report, mailed Apr. 20, 2022, for International Patent Application No. PCT/SG2022/050053. (5 pages).
Kao et al., "Multiplex Surface-Enhanced Raman Scattering Identification and Quantification of Urine Metabolites in Patient Samples within 30 min," *ACS Nano 14*:2542-2552, Feb. 2020. (11 pages).
Kho et al., "Frequency Shifts in SERS for Biosensing," *ACS Nano 6*(6):4892-4902, May 2012. (11 pages).
Koh et al., "Plasmonic nose: integrating the MOF-enabled molecular preconcentration effect with a plasmonic array for recognition of molecular-level volatile organic compounds," *Chemical Communications 54*:2546-2549, Feb. 2018. (4 pages).
Lee et al., "Designing surface-enhanced Raman scattering (SERS) platforms beyond hotspot engineering: emerging opportunities in analyte manipulations and hybrid materials," *Chemical Society Reviews 48*:731-756, 2019 [Published Online Nov. 2018] (26 pages).
Lee et al., "Driving $CO_2$ to a Quasi-Condensed Phase at the Interface between a Nanoparticle Surface and a Metal-Organic Framework at 1 bar and 298 K," *Journal of the American Chemical Society 139*:11513-11518, Jul. 2017. (6 pages).
Leong et al., "In Situ Differentiation of Multiplex Noncovalent Interactions Using SERS and Chemometrics," *ACS Applied Materials & Interfaces 12*:33421-33427, Jun. 2020. (7 pages).
Lussier et al., "Deep learning and artificial intelligence methods for Raman and surface-enhanced Raman scattering," *Trends in Analytical Chemistry 124*:115796, Jan. 2020. (15 pages).
Lussier et al., "Machine-Learning-Driven Surface-Enhanced Raman Scattering Optophysiology Reveals Multiplexed Metabolite Gradients Near Cells," *ACS Nano 13*:1403-1411, Feb. 2019. (9 pages).
Marcelo et al., "Methods of multivariate analysis of NIR reflectance spectra for classification of yerba mate," *Analytical Methods 6*:7621-7627, Jul. 2014. (7 pages).
Phan-Quang et al., "Plasmonic Colloidosomes as Three-Dimensional SERS Platforms with Enhanced Surface Area for Multiphase Sub-Microliter Toxin Sensing," *Angewandte Chemistry 127*:9827-9831, Jun. 2015. (5 pages).
Phan-Quang et al., "Tracking Airborne Molecules from Afar: Three-Dimensional Metal-Organic Framework-Surface-Enhanced Raman Scattering Platform for Stand-Off and Real-Time Atmospheric Monitoring," *ACS Nano 13*:12090-12099, Sep. 2019. (10 pages).
Polášková et al., "Wine flavor: chemistry in a glass," *Chemical Society Reviews 37*:2478-2489, Aug. 2008. (12 pages).
Shin et al., "Early-Stage Lung Cancer Diagnosis by Deep Learning-Based Spectroscopic Analysis of Circulating Exosomes," *ACS Nano 14*:5435-5444, Apr. 2020. (10 pages).
Sipos et al., "Discrimination of mineral waters by electronic tongue, sensory evaluation and chemical analysis," *Food Chemistry 135*:2947-2953, Jul. 2012. (7 pages).
Song et al., "An ultrasensitive SERS sensor for simultaneous detection of multiple cancer-related miRNAs," *Nanoscale 8*:17365-17373, Sep. 2016. (9 pages).
Tominaga et al., "Stereoisomeric Distribution of 3-Mercaptohexan-1-ol and 3-Mercaptohexyl Acetate in Dry and Sweet White Wines Made from *Vitis vinifera* (Var. Sauvignon Blanc and Semillon)," *Journal of Agricultural and Food Chemistry 54*:7251-7255, Aug. 2006. (5 pages).

(56) References Cited

OTHER PUBLICATIONS

Xu et al., "Detection of Pesticide Residues in Food Using Surface-Enhanced Raman Spectroscopy: A Review," *Journal of Agricultural and Food Chemistry 65*:6719-6726, Jul. 2017. (8 pages).
Zhang et al., "Experimental and theoretical studies of Raman spectroscopy on 4-mercaptopyridine aqueous solution and 4-mercaptopyridine/Ag complex system," *Journal of Raman Spectroscopy 38*:1106-1111, May 2007. (7 pages).
Zhang et al., "Ultrasensitive Surface-Enhanced Raman Scattering Sensor of Gaseous Aldehydes as Biomarkers of Lung Cancer on Dendritic Ag Nanocrystals," *Analytical Chemistry 89*:1416-1420, Jan. 2017. (5 pages).
Zhu et al., "Frequency Shift Raman-Based Sensing of Serum MicroRNAs for Early Diagnosis and Discrimination of Primary Liver Cancers," *Analytical Chemistry 90*:10144-10151, Jul. 2018. (8 pages).

* cited by examiner

FIG. 9

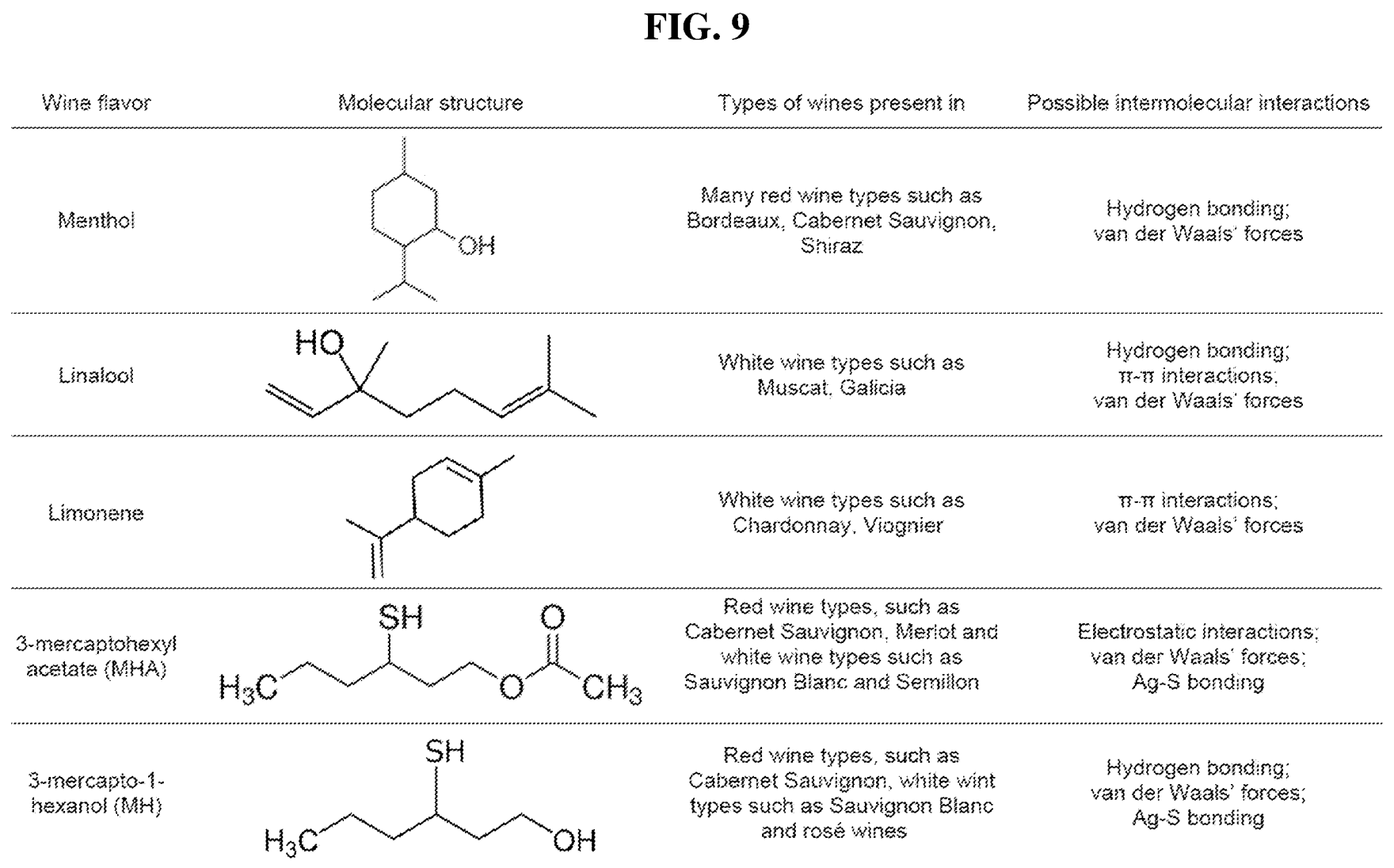

| Wine flavor | Molecular structure | Types of wines present in | Possible intermolecular interactions |
|---|---|---|---|
| Menthol | OH | Many red wine types such as Bordeaux, Cabernet Sauvignon, Shiraz | Hydrogen bonding; van der Waals' forces |
| Linalool | HO | White wine types such as Muscat, Galicia | Hydrogen bonding; π-π interactions; van der Waals' forces |
| Limonene | | White wine types such as Chardonnay, Viognier | π-π interactions; van der Waals' forces |
| 3-mercaptohexyl acetate (MHA) | SH O $H_3C$ O $CH_3$ | Red wine types, such as Cabernet Sauvignon, Merlot and white wine types such as Sauvignon Blanc and Semillon | Electrostatic interactions; van der Waals' forces; Ag-S bonding |
| 3-mercapto-1-hexanol (MH) | SH $H_3C$ OH | Red wine types, such as Cabernet Sauvignon, white wint types such as Sauvignon Blanc and rosé wines | Hydrogen bonding; van der Waals' forces; Ag-S bonding |

FIG. 10A
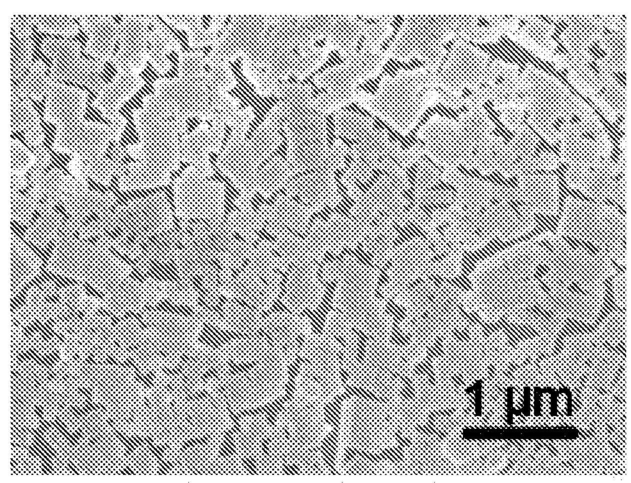
FIG. 10B
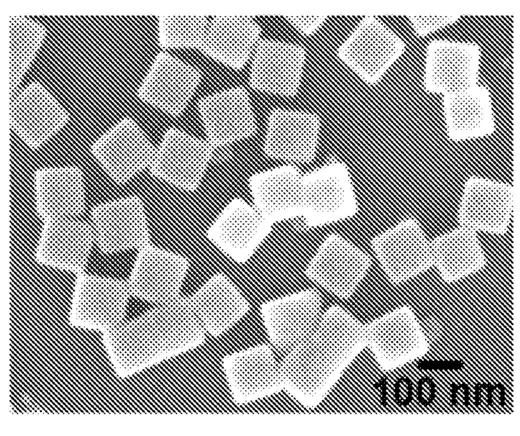
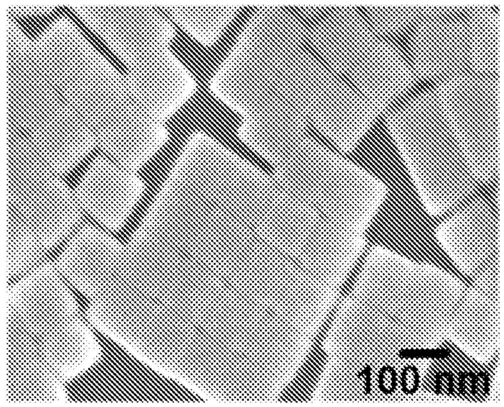
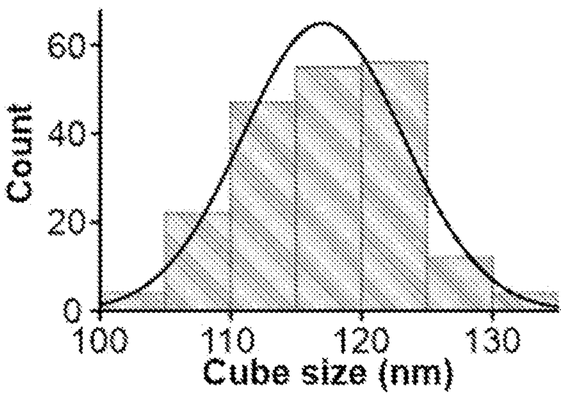
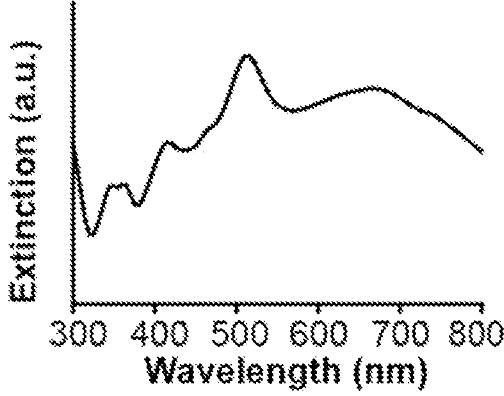

FIG. 13

Experimental spectrum

| | Peak 1: 1571 $cm^{-1}$ | Peak 2: 1582 $cm^{-1}$ | Peak 3: 1621 $cm^{-1}$ |
|---|---|---|---|
| MHA | 142.35 ± 18.39 | 252.04 ± 20.73 | 403.04 ± 7.61 |
| Control | 153.54 ± 12.67 | 254.98 ± 24.35 | 494.03 ± 7.96 |
| | **Peak 1 : Peak 2** | **Peak 1 : Peak 3** | **Peak 2 : Peak 3** |
| MHA | 0.56 | **0.35** | **0.63** |
| Control | 0.60 | 0.31 | 0.52 |
| Percentage change | 6.7% | **12.9%** | **21.2%** |

DFT simulated spectrum

| | Peak 1: 1598 $cm^{-1}$ | Peak 2: 1632 $cm^{-1}$ | Peak 3: 1665 $cm^{-1}$ |
|---|---|---|---|
| MHA | 684.21 | 197.25 | 618.82 |
| Control | 754.35 | 218.07 | 768.71 |
| | **Peak 1 : Peak 2** | **Peak 1 : Peak 3** | **Peak 2 : Peak 3** |
| MHA | 3.47 | **1.11** | **0.32** |
| Control | 3.46 | 0.98 | 0.28 |
| Percentage change | 0.3% | **13.3%** | **14.3%** |

FIG. 15C

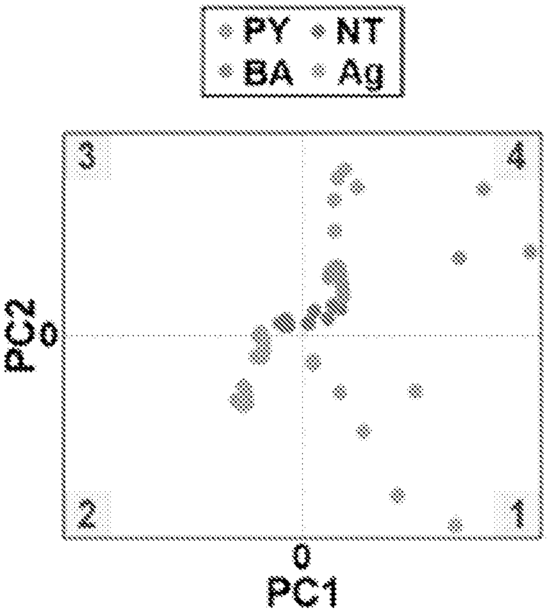

FIG. 15D

| Quadrant | Flavor | Receptor-Flavor interactions | | | Receptor wavenumber | Assignment |
|---|---|---|---|---|---|---|
| (i) 1 | MHA | PY-MHA | Ag-MHA | Electrostatic | PY 1000-1008 | Ring breathing |
| | | | | Ag-S bond | Ag 630-670 (broad) | $\pi_{OCO}$, $\delta_{HCO}$(MHA) |
| (ii) 2 | MH | PY-MH | Ag-MH | H-bond | PY 416-424 | Ring stretch + $\nu_{CS}$ |
| | | | | Ag-S bond | Ag 630-670 (broad) | $\nu_{CS}$(MH) |
| (iii) 3 | Menthol | PY-Menthol | NT-Menthol | H-bond | PY 702-710 | out-of-plane C-H def |
| | | | | van der Waals' | NT 630-638 | $\delta_{HCH}$ |
| (iv) 4 | Linalool | PY-Linalool | BA-Linalool | H-bond | PY 1008-1016 | in-plane C-H def |
| | | | | H-bond | BA 1350-1400 (broad) | $\nu_{OCO-}$ |
| | Limonene | BA-Limonene | NT-Limonene | π-π | BA 1584-1592 | $\nu_{CC(ring)}$ |
| | | | | π-π | NT 764-770 | Ring breathing |

(i) SERS Taster

| Actual (%) \ Predicted (%) | Water | Menthol | Linalool | Limonene | MHA | MH |
|---|---|---|---|---|---|---|
| Water | 100 | - | - | - | - | - |
| Menthol | - | 100 | - | - | - | - |
| Linalool | - | - | 100 | - | - | - |
| Limonene | - | - | - | 100 | - | - |
| MHA | - | - | - | - | 100 | - |
| MH | - | - | - | - | - | 100 |

(ii) Bare Ag

| Actual (%) \ Predicted (%) | Water | Menthol | Linalool | Limonene | MHA | MH |
|---|---|---|---|---|---|---|
| Water | 41.6 | - | 29.2 | 29.2 | - | - |
| Menthol | 25 | 33.3 | 16.7 | 25 | - | - |
| Linalool | 16.7 | - | 54.1 | 25 | - | 4.2 |
| Limonene | - | - | - | 37.5 | 25 | 37.5 |
| MHA | - | - | 16.7 | 8.3 | 70.8 | 4.2 |
| MH | - | - | - | - | 12.5 | 87.5 |

| | Ag surface only | SERS Taster |
|---|---|---|
| Average classification accuracy | 54.2% (78/144) | 100% |
| False negative | 6.9% (10/144) | 0% |
| False positive (for a single flavor molecule): | | |
| Menthol | 0% | 0% |
| Linalool | 10.4% (15/144) | 0% |
| Limonene | 14.6% (21/144) | 0% |
| MHA | 6.3% (9/144) | 0% |
| MH | 7.6% (11/144) | 0% |

| Artificial wine # | Actual [MHA] (μM) | Predicted [MHA] (μM) (% difference) SERS Taster | Predicted [MHA] (μM) (% difference) BA | Actual [MH] (μM) | Predicted [MH] (μM) (% difference) SERS Taster | Predicted [MH] (μM) (% difference) BA |
|---|---|---|---|---|---|---|
| 1 | 2 | 2.1 (+5%) | 2.4 (+20%) | 8 | 7.7 (−4%) | 6.9 (−14%) |
| 2 | 3 | 2.9 (−3%) | 3.3 (+10%) | 6 | 5.8 (−3%) | 5.2 (−13%) |
| 3 | 4 | 3.9 (−3%) | 3.3 (−18%) | 4 | 4.1 (+3%) | 3.4 (−15%) |
| 4 | 5 | 5.1 (+2%) | 4.5 (−10%) | 5 | 5.0 (0%) | 5.7 (+14%) |
| 5 | 6 | 6.0 (0%) | 6.6 (+10%) | 3 | 3.1 (+3%) | 3.4 (−13%) |
| 6 | 8 | 7.8 (−3%) | 7.1 (−11%) | 2 | 2.0 (0%) | 2.3 (+15%) |

| Potential interference | Molecular structure | Possible intermolecular interactions |
| --- | --- | --- |
| Glycerol | | Electrostatic interactions; Hydrogen bonding; van der Waals' forces |
| Tartaric acid | | Electrostatic interactions; Hydrogen bonding; van der Waals' forces |

FIG. 23
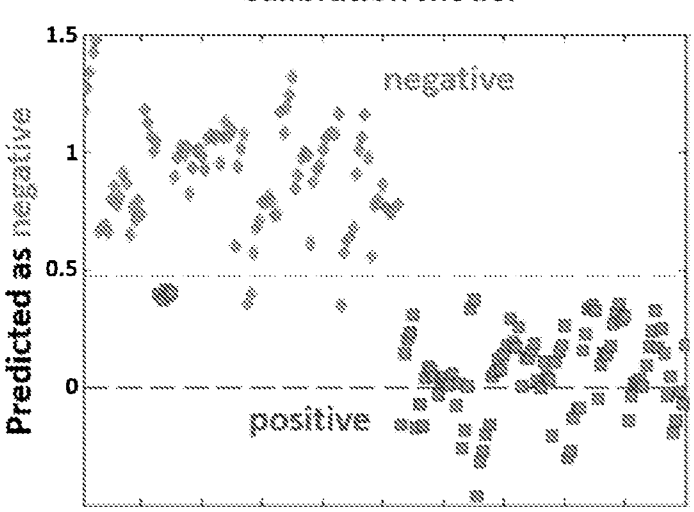
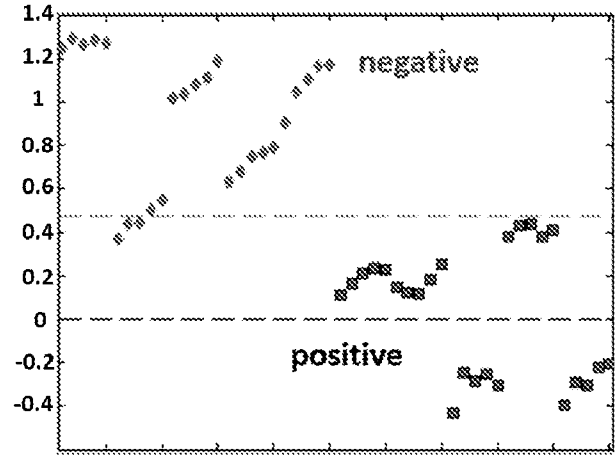
FIG. 24
| Predicted \ Actual | Positive | Negative |
|---|---|---|
| Positive | 5 | 1 |
| Negative | 0 | 4 |

FIG. 27
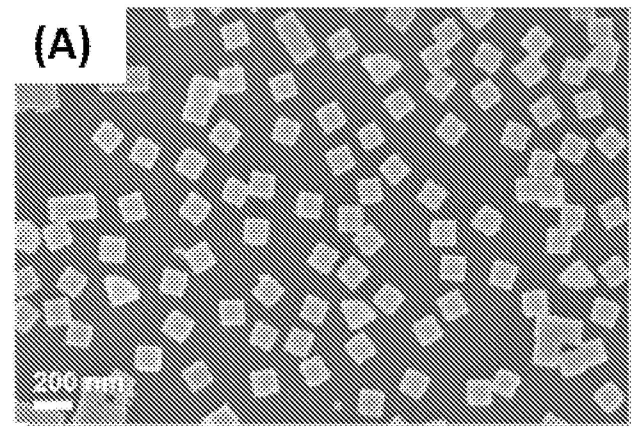
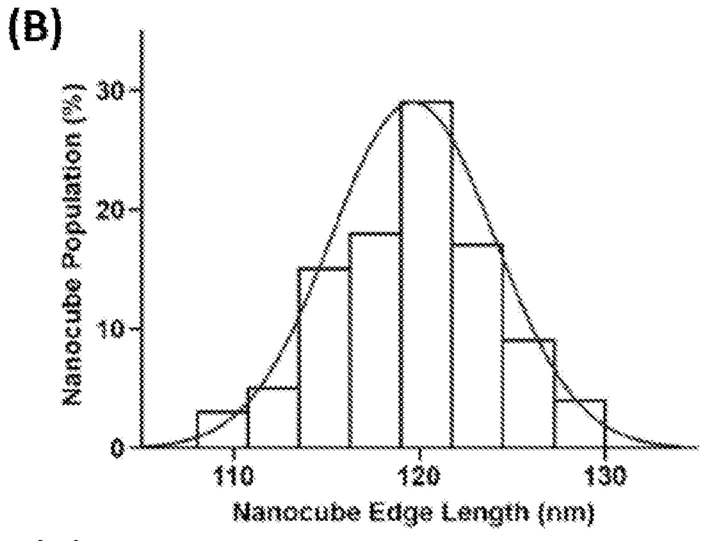
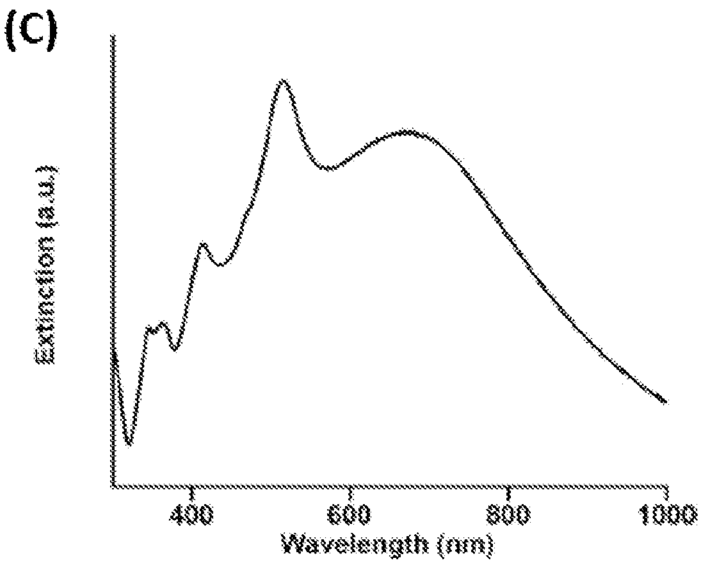

(B)

| Peak position | | Experimental ($cm^{-1}$) | Assignment |
|---|---|---|---|
| MPY | a | 714 | ν(C–S) |
| | b | 1014 | Ring breathing |
| | c | 1064 | δ(CH) |
| | d | 1100 | Ring breathing + ν(C–S) |
| | e | 1224 | β(CH) + δ(NH) |
| | f | 1586 | ν(C=C) *de-protonated pyridine |
| ATP | g | 1075 | ν(C=C) + ν(C-S) |
| | h | 1143 | β(C-H) + ν(C-N) |
| | i | 1186 | β(C-H) |
| | j | 1393 | ν(N=N) + ν(C-N) |
| | k | 1441 | ν(N=N) + β(C-H) |
| | l | 1580 | ν(C=C) |
| MBA | m | 521 | ν(C-S) |
| | n | 717 | γ(CCC) |
| | o | 842 | δ(COO-) |
| | p | 1077 | Ring breathing + ν(C–S) |
| | q | 1418 | ν(COO-) |
| | r | 1586 | ν(C=C) |

ν, stretching; δ, bending; ρ, rocking; β, X-H bending (where X is C, N, O); γ, out of plane bending

FIG. 31
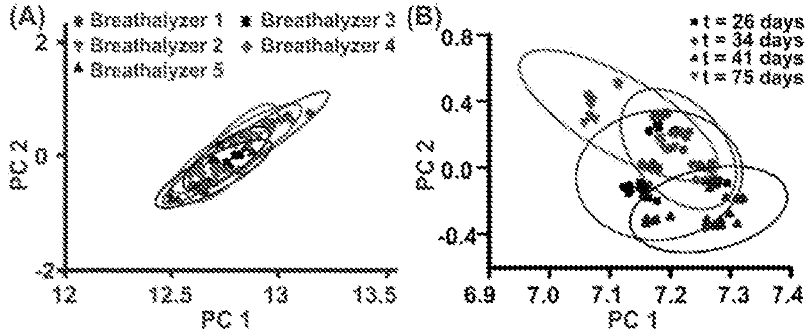
(C) t = 75 days
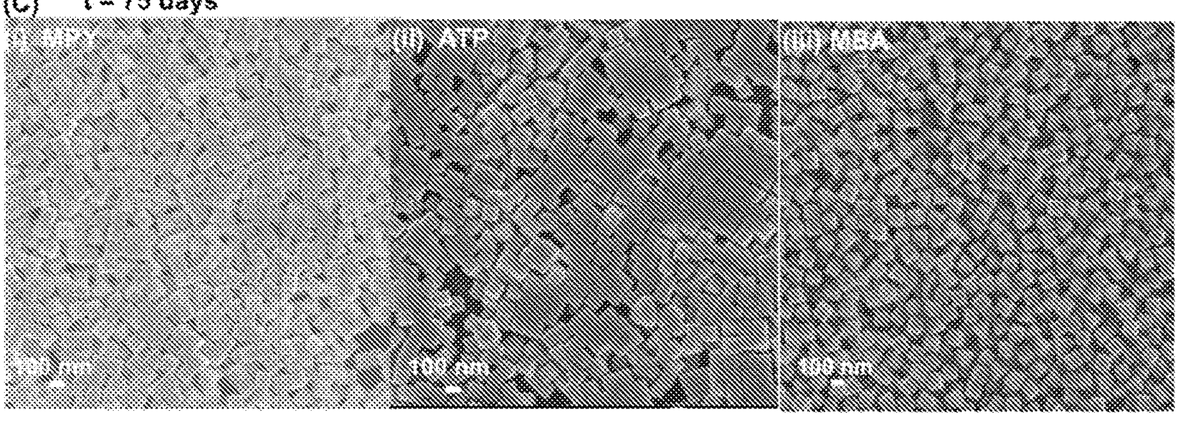
(D) After breath exposure
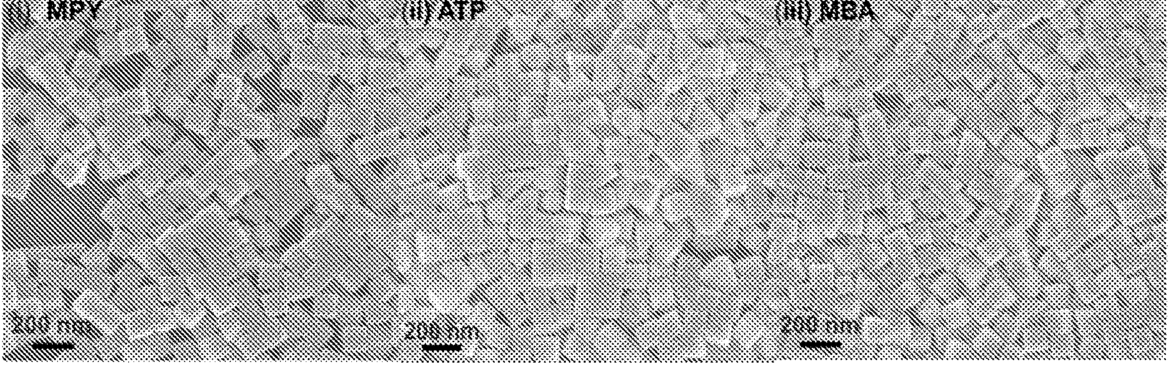

FIG. 35A

| Compound | MW ($g\ mol^{-1}$) | Saturated vapor pressure (Pa) | Saturated vapor concentration (ppm) |
|---|---|---|---|
| ethanal | 44.05 | 143,280 | 2465 |
| heptanal | 100.21 | 569 | 22 |
| octanal | 128.212 | 80 | 4 |
| acetone | 58.08 | 37,519 | 851 |
| methanol | 32.04 | 21,697 | 271 |
| water | 18.02 | 5,626 | 40 |

FIG. 35B

| Comparison | U | Z | Probability >\|U\| |
|---|---|---|---|
| MPY 1617 $cm^{-1}$ / 1586 $cm^{-1}$ | | | |
| Blank vs. COVID-negative | 0 | -18.15465 | $1.17973 \times 10^{-73}$ |
| Blank vs. COVID-positive | 0 | -11.83178 | $2.67425 \times 10^{-32}$ |
| COVID-positive vs. COVID negative | 4078 | -9.30333 | $1.36118 \times 10^{-20}$ |
| DMAB 1143 $cm^{-1}$ / 1075 $cm^{-1}$ | | | |
| Blank vs. COVID-negative | 29326 | -14.83242 | $9.04155 \times 10^{-50}$ |
| Blank vs. COVID-positive | 8771 | -2.67483 | 0.00748 |
| COVID-positive vs. COVID negative | 21821 | 4.79878 | $1.59638 \times 10^{-6}$ |
| DMAB 1186 $cm^{-1}$ / 1075 $cm^{-1}$ | | | |
| Blank vs. COVID-negative | 4021 | -16.44439 | $9.20048 \times 10^{-61}$ |
| Blank vs. COVID-positive | 1660 | -8.41441 | $3.94867 \times 10^{-17}$ |
| COVID-positive vs. COVID negative | 22441 | 8.2616 | $2.22045 \times 10^{-16}$ |
| DMAB 1393 $cm^{-1}$ / 1075 $cm^{-1}$ | | | |
| Blank vs. COVID-negative | 48708 | -16.49396 | $4.05455 \times 10^{-61}$ |
| Blank vs. COVID-positive | 12136 | -7.54075 | $4.67281 \times 10^{-14}$ |
| COVID-positive vs. COVID negative | 67632 | 4.20121 | $2.65494 \times 10^{-5}$ |
| DMAB 1441 $cm^{-1}$ / 1075 $cm^{-1}$ | | | |
| Blank vs. COVID-negative | 32088 | -13.89048 | $7.23536 \times 10^{-44}$ |
| Blank vs. COVID-positive | 7859 | -3.65652 | $2.55667 \times 10^{-4}$ |
| COVID-positive vs. COVID negative | 20555 | 3.67522 | $2.37645 \times 10^{-4}$ |
| MBA 521 $cm^{-1}$ / 1077 $cm^{-1}$ | | | |
| Blank vs. COVID-negative | 19015 | 5.71197 | $1.1678 \times 10^{-8}$ |
| Blank vs. COVID-positive | 4331 | 9.54477 | $1.125 \times 10^{-30}$ |
| COVID-positive vs. COVID negative | 16276 | 2.36422 | $1.807 \times 10^{-2}$ |

FIG. 35C

Experimental

| | Peak intensity (a.u.) | |
|---|---|---|
| | **ν(CS) at 521 cm⁻¹ / ring breathing at 1077 cm⁻¹** | **% Change with analyte incubation** |
| MBA only | 0.2451 ± 0.0318 | - |
| MBA-acetone | 0.2111 ± 0.0202 | -13.91 % |
| MBA-ethanal | 0.1601 ± 0.006 | -34.71 % |
| MBA-heptanal | 0.2445 ± 0.0170 | -0.28 % |
| MBA-octanal | 0.2160 ± 0.0109 | -11.91 % |
| MBA-MeOH | 0.2659 ± 0.0323 | +8.45 % |
| MBA-water | 0.3063 ± 0.0061 | +24.95 % |

DFT simulated

| | Peak intensity (a.u.) | | | |
|---|---|---|---|---|
| | **ν(CS) at 296 cm⁻¹** | **Ring breathing at 1099 cm⁻¹** | **ν(CS) / ring breathing** | **% Change with analyte** |
| MBA only | 648.8 | 4053.4 | 0.1600 | - |
| MBA-acetone | 35125.1 | 222790.5 | 0.1577 | -1.48 % |
| MBA-ethanal | 34160.4 | 216723.4 | 0.1576 | -1.50 % |
| MBA-heptanal | 38964.9 | 244067.1 | 0.1596 | -0.23 % |
| MBA-octanal | 25947.8 | 228943 | 0.1133 | -29.17 % |
| MBA-MeOH | 46121.9 | 218295.6 | 0.2113 | +32.03 % |
| MBA-water | 29796.6 | 167335.1 | 0.1781 | +11.27 % |

FIG. 38

| Receptors | Sensitivity | Specificity |
|---|---|---|
| MBA | 80.0% | 99.7% |
| MPY | 90.5% | 99.7% |
| ATP | 84.9% | 99.7% |
| MBA+MPY | 92.2% | 99.8% |
| MBA+ATP | 94.6% | 99.9% |
| MPY+ATP | 95.0% | 99.8% |
| MBA+MPY+ATP | 96.2% | 99.9% |

FIG. 43

| Model no. | Sensitivity (%) | Specificity (%) |
|---|---|---|
| 1 | 89.19 | 100 |
| 2 | 100 | 100 |
| 3 | 100 | 100 |
| 4 | 97.3 | 99.07 |
| 5 | 94.59 | 100 |
| 6 | 100 | 100 |
| 7 | 94.59 | 99.53 |
| 8 | 91.89 | 100 |
| 9 | 100 | 100 |
| 10 | 91.89 | 100 |
| 11 | 91.89 | 100 |
| 12 | 93.33 | 100 |
| 13 | 100 | 100 |
| 14 | 91.89 | 100 |
| 15 | 100 | 100 |
| 16 | 94.59 | 100 |
| 17 | 97.3 | 99.53 |
| 18 | 100 | 100 |
| 19 | 94.59 | 100 |
| 20 | 100 | 100 |
| 21 | 94.59 | 100 |
| 22 | 97.3 | 99.07 |
| 23 | 100 | 100 |
| 24 | 100 | 100 |
| 25 | 97.3 | 100 |
| 26 | 97.3 | 100 |
| 27 | 97.3 | 100 |
| 28 | 91.89 | 100 |
| 29 | 100 | 100 |
| 30 | 97.3 | 100 |
| 31 | 94.59 | 100 |
| 32 | 91.89 | 100 |
| 33 | 97.3 | 100 |
| 34 | 94.59 | 100 |
| 35 | 100 | 100 |
| 36 | 94.59 | 100 |
| 37 | 97.3 | 100 |
| 38 | 93.33 | 100 |
| 39 | 91.89 | 100 |
| 40 | 100 | 99.53 |
| 41 | 94.59 | 100 |
| 42 | 100 | 100 |
| 43 | 97.3 | 100 |
| 44 | 100 | 100 |
| 45 | 100 | 100 |
| 46 | 86.49 | 100 |
| 47 | 94.59 | 100 |
| 48 | 94.59 | 100 |
| 49 | 100 | 100 |
| 50 | 89.19 | 100 |

(A)

| | Actual positive | Actual negative | |
|---|---|---|---|
| Predicted positive | 71 (71.16) | 0 (0.28) | PPV = 99.6% (98.2-100%) |
| Predicted negative | 3 (2.84) | 427 (426.72) | NPV = 99.3% (98.6-100%) |
| | Sensitivity = 96.2% (91.8-100%) | Specificity = 99.9% (99.7-100%) | |

FIG. 46 (Continued)
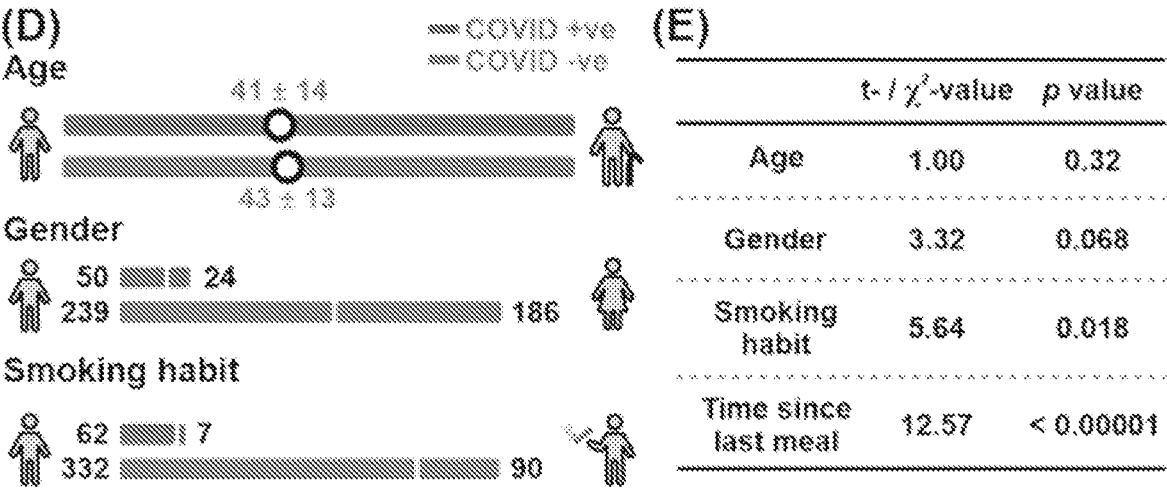
(E)
| | t- / $\chi^2$-value | $p$ value |
|---|---|---|
| Age | 1.00 | 0.32 |
| Gender | 3.32 | 0.068 |
| Smoking habit | 5.64 | 0.018 |
| Time since last meal | 12.57 | < 0.00001 |
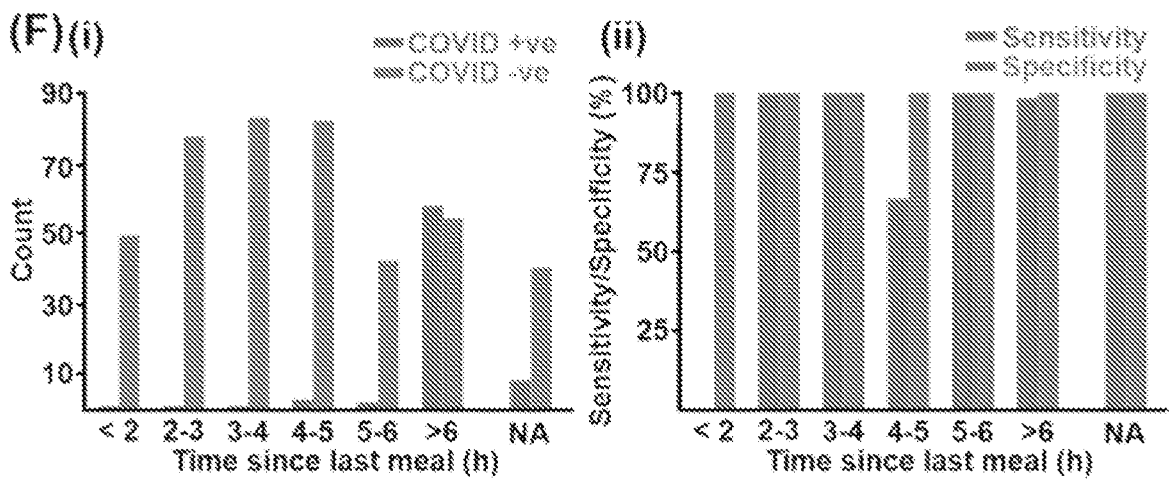

SURFACE-ENHANCED RAMAN SCATTERING (SERS) PLATFORM FOR ANALYSIS

CROSS-REFERENCE TO RELATED APPLICATION

This application claims the benefit of priority of Singapore Patent Application No. 10202101214P, filed 4 Feb. 2021, the content of it being hereby incorporated by reference in its entirety for all purposes.

TECHNICAL FIELD

The present disclosure relates to a surface-enhanced Raman scattering (SERS) chip for generating multiple SERS profiles simultaneously from one or more analytes suspected to be in a sample. The present disclosure also relates to a method of identifying one or more analytes suspected to be in a sample.

BACKGROUND

Surface-enhanced Raman scattering (SERS) has attracted emerging attention as an ultrasensitive sensing technique, owing to its ability to extract specific fingerprints at ultratrace detection limit within the ppm-ppb range. However, traditional SERS techniques tend to be restricted to lab-based direct detection of molecules with large Raman cross-sections, e.g. aromatic hydrocarbons or dye aerosols, in which the analytes' strong fingerprints may be easily observed. These traditional techniques tend to have limitations for practical applications, e.g. on-site gas sensing in real life environment. One limitation may be that direct SERS detection involve manual peak hunting, which is highly difficult for small gaseous molecules with low Raman cross-section, such as small greenhouse gases sulphur dioxide ($SO_2$), and nitrogen dioxide ($NO_2$), or small volatile organic compounds (e.g. aldehydes, ketones) that are typically presented in low concentration (<ppm) in complex matrices such as industrial exhausts, or human breath. It may be almost impossible to perform the multiplex analysis of such small gases in real matrices as the target peaks are masked by immensely complicated spectral features of other background components. Another limitation is that weak affinity of small gas molecules to SERS substrate surface negatively influences the selectivity towards the molecule of interest among the multi-component environment. These limitations, which likely affect liquid-based samples impede the development of SERS for on-site applications, one of which is the analysis of aforementioned greenhouse gases in exhausts for emission regulation enforcement, or multiplex metabolomic profiling of breath volatile organic compounds (BVOCs) for disease diagnosis.

In addition, the integration of machine-learning-driven chemometrics with surface-enhanced Raman scattering (SERS) presents significant potential in translating research-based SERS platforms for diverse applications. These applications demand SERS platforms to achieve ultratrace detection of multiple molecules with weak Raman scattering cross sections, via either direct detection or indirect analyte capturing with molecular receptors. Unfortunately, vibrational fingerprints resulting from direct detection of these molecules are often insignificant, whereas subtle changes in receptor fingerprints are difficult to pinpoint through manual visual inspection. More recently, chemometrics which involve statistical models have been employed to perform automated analyses of large SERS spectral data sets across entire spectral windows, potentially eliminating subjective judgements to attain improved accuracies. Chemometrics is just one example of machine learning algorithms which may help unveil intricate data patterns to enable predictive analytics for Raman/SERS-based applications. Despite these, there appears to be significant risk of over-relying on these algorithms to achieve desired outcomes without thoroughly understanding the underlying chemical interactions. The resulting models may be overfitted, which crumble when introducing new data or attempting to predict properties of an unknown sample. Consequently, a poor or incorrect correlation between chemical knowledge and chemometric model outputs may be undesirably established and the use of machine learning approaches in extracting and comprehending complex SERS fingerprints is not appropriately utilized.

There is thus a need for a solution that addresses one or more of the limitations mentioned above. The solution may involve the use of multiple molecular probes configured on a SERS substrate surface for selective capturing and detection of target analytes, in combination with artificial intelligence for automated spectral analysis with utmost accuracy. For example, the solution may involve the crafting of probes onto SERS substrate surface to provide for consistent and strong signals amidst complex multi-component environment, which may then be used as reference internal standards for indirect detection of analytes via interaction-induced peak shifts. The peak shifts may be analyzed with machine learning-based chemometric techniques for seamless and human error-free classification and multiplex quantification of the target analytes in various scenarios. The solution may involve more than one interaction probes to add more layers of the spectral information to the machine learning model, for more efficient molecular differentiation. The solution may be deemed a multi-probe detection and machine learning approach that utilizes the full potential of SERS and may render an upgraded dimension for SERS-based detection, promoting the development of a new-generation standard on-site detection.

SUMMARY

In a first aspect, there is provided for a surface-enhanced Raman scattering (SERS) chip for generating multiple SERS profiles simultaneously from one or more analytes suspected to be in a sample, the SERS chip includes:

one or more substrates; and one or more Raman probes formed on the one or more substrates, wherein each of the one or more Raman probes includes a SERS-active nanoparticle grafted with a receptor molecule, (i) wherein the receptor molecule on each of the one or more Raman probes on one substrate is different from the receptor molecule of the one or more Raman probes on another substrate, and/or (ii) wherein the one or more Raman probes include two or more Raman probes and wherein the receptor molecule on each of the two or more Raman probes on one substrate is different, wherein the receptor molecule includes a thiol group proximal to the SERS-active nanoparticle and a functional group distal to the SERS-active nanoparticle, wherein the functional group interacts with the one or more analytes to induce a change in molecular vibration of the receptor molecule which is identifiable by surface-enhanced Raman scattering for generating the multiple SERS profiles.

In another aspect, there is provided for a method of identifying one or more analytes suspected to be in a sample, the method includes:

contacting the surface-enhanced Raman scattering (SERS) chip described in various embodiments of the first aspect with a sample suspected to contain the one or more analytes;

collecting SERS signals from the surface-enhanced Raman scattering (SERS) chip which has contacted the sample;

constructing a combined-SERS profile from the SERS signals; and providing the combined-SERS profile to a device configured with a model trained to identify the one or more analytes from the combined-SERS profile.

In another aspect, there is provided for a device including the surface-enhanced Raman scattering (SERS) chip described in various embodiments of the first aspect for use in identifying:

one or more analytes in a gas and/or a liquid; and/or a subject infected with coronavirus disease.

In another aspect, there is provided for use of the surface-enhanced Raman scattering (SERS) chip described in various embodiments of the first aspect in the manufacture of a device for identifying:

one or more analytes in a gas and/or a liquid; and/or a subject infected with coronavirus disease.

BRIEF DESCRIPTION OF THE DRAWINGS

The drawings are not necessarily to scale, emphasis instead generally being placed upon illustrating the principles of the present disclosure. In the following description, various embodiments of the present disclosure are described with reference to the following drawings, in which:

FIG. 9 is a table showing the molecular structures of representative molecules for various wine flavors, their occurrence in various wines, along with possible interactions with receptor molecules.

FIG. 10A shows SEM image of the substrate surface showing the packing density of Ag nanocubes.

FIG. 10B shows (top left) a SEM image of the synthesized Ag nanocubes, (top right) a magnified SEM image showing packing density of Ag nanocubes after self-assembly using the Langmuir-Blodgett technique, (bottom left) edge length distribution of Ag nanocubes wherein the average edge length is 117±6 nm, and (bottom right) UV-vis extinction spectrum of colloidal Ag in ethanol. The peaks at 355, 415, 510 and 670 nm can be assigned to octupole (355 nm), quadrupole (415, 510 nm) and dipole (670 nm) resonances, respectively.

FIG. 12A shows PY—1220 $cm^{-1}$ peak intensifies and 1611 $cm^{-1}$ peak weakens.

FIG. 12B shows BA—1382 $cm^{-1}$ peak intensifies and the feature blue-shifts to 1390, 1418 and 1435 $cm^{-1}$, respectively.

FIG. 12C shows NT—1571 and 1582 $cm^{-1}$ peaks intensify relative to the 1621 $cm^{-1}$ peak.

FIG. 12D shows Ag surface-emergence of MHA peaks at 636, 663 $cm^{-1}$.

FIG. 13 shows comparison of experimental and DFT simulated peak intensities (a. u.) for the ring stretching modes of 2-naphthalenethiol (NT). Underlined values highlight the increase in peak intensity of peaks 1 and 2 relative to peak 3.

FIG. 14A shows PY—1278 $cm^{-1}$ peak (C—H def) intensifies and 1613 $cm^{-1}$ peak ($v_{CC/CN}$) weakens.

FIG. 14B shows BA—1390 $cm^{-1}$ peak ($v_{OCO-}$) intensifies, and blue-shift to 1395 $cm^{-1}$.

FIG. 14C shows NT—1598 and 1632 $cm^{-1}$ peaks (vCC) intensify while 1665 $cm^{-1}$ peak remains constant.

FIG. 14D shows emergence of MHA peaks at 670 and 760 $cm_{-1}$ ($\pi_{OCO}$; $\delta_{HCO}$). A brief discussion of the DFT simulated spectra in comparison to experimental results is provided in example 3D.

FIG. 15C is a PCA bi-plot of the first two principal components, which highlights key spectral regions where variations exert dominant influence over component scores. The specific spectral regions, their corresponding receptor-flavor interactions and vibrational assignment are summarized based on their influence in the flavor data cluster positions in each of the quadrants of the score plot: (i) quadrant 1, (ii) quadrant 2, (iii) quadrant 3, and (iv) quadrant 4.

FIG. 15D is a graphical representation of the PCA bi-plot.

FIG. 16A shows a principal component analysis (PCA) score plot for other receptor combinations with receptor number≤3. FIG. 16A specifically demonstrates for PY only.

FIG. 16B shows a PCA score plot for other receptor combinations with receptor number≤3. FIG. 16B specifically demonstrates for BA only.

FIG. 16C shows a PCA score plot for other receptor combinations with receptor number≤3. FIG. 16C specifically demonstrates for NT only.

FIG. 16D shows a PCA score plot for other receptor combinations with receptor number≤3. FIG. 16D specifically demonstrates for Ag+PY.

FIG. 16E shows a principal component analysis (PCA) score plot for other receptor combinations with receptor number≤3. FIG. 16E specifically demonstrates for Ag+BA.

FIG. 16F shows a PCA score plot for other receptor combinations with receptor number≤3. FIG. 16F specifically demonstrates for Ag+NT.

FIG. 16G shows a PCA score plot for other receptor combinations with receptor number≤3. FIG. 16G specifically demonstrates for Ag+PY+BA.

FIG. 16H shows a PCA score plot for other receptor combinations with receptor number≤3. FIG. 16H specifically demonstrates for Ag+PY+NT.

FIG. 16I shows a PCA score plot for other receptor combinations with receptor number≤3. FIG. 16I specifically demonstrates for Ag+BA+NT.

FIG. 20 compares between (i) the SERS taster and (ii) a single receptor (BA) platform.

FIG. 23 shows PLS-DA calibration model (top plot) and prediction results (bottom plot) of COVID-19 positive and negative subjects.

FIG. 24 is a confusion matrix showing the number of correctly predicted subjects.

FIG. 27A shows a SEM image of the Ag nanocubes.

FIG. 27B shows size distribution of the Ag nanocubes, with edge lengths of 120±5 nm.

FIG. 27C shows extinction spectra of the Ag nanocubes, exhibiting clear plasmonic resonances across the entire visible light region.

FIG. 31A shows a PCA score plot (PC 1 vs. PC 2) of 6 assembled breathalyzers. Close overlap of the individual clusters illustrates the high signal reproducibility across different SERS chips even after breathalyzer integration.

FIG. 31B shows a PCA score plot (PC 1 vs. PC 2) of five as-fabricated SERS sensor chips at different time durations (t=26, 34, 41 and 75 days) after initial fabrication. Close cluster overlap indicates that the functionalized Ag nanocubes remain chemically stable up to 2.5 months. It is of note that the measured 2.5 months is to affirm the utility of the SERS sensor chips for the duration of the clinical study and does not reflect the maximum shelf-life of the fabricated SERS chip.

FIG. 31C shows SEM images of sensor chips at t=75 days for each of the molecular receptors, namely (i) MPY, (ii) ATP and (iii) MBA.

FIG. 31D shows SEM images after breath exposure for each of the molecular receptors, namely (i) MPY, (ii) ATP and (iii) MBA. The nanocubes maintain their shape integrity with no signs of etching due to oxidation.

FIG. 33A shows PC scores vs. time elapsed after breath exhalation plots for one participant. Upon breath exposure, SERS spectra were measured at fixed time intervals of t=2, 5, 10, 15, 30, 60 and 90 mins. The SERS super-profiles at each time interval were analyzed using principal component analysis and compared with the blank super-profiles. Across all 3 runs in FIG. 33A to 33C, the change in PC 2 score assumes a logarithmic trend, with a distinct change after 2 mins of breath exposure and plateauing at about t=60 mins. The PC 1 scores of all breath samples remains relatively constant throughout, which suggests that breath-induced spectral variation is largely captured in the 2nd PC. Thus, 2 mins is established as the minimum incubation time.

FIG. 33B shows PC scores vs. time elapsed after breath exhalation plots for one participant. Upon breath exposure, SERS spectra were measured at fixed time intervals of t=2, 5, 10, 15, 30, 60 and 90 mins. The SERS super-profiles at each time interval were analyzed using principal component analysis and compared with the blank super-profiles. Across all 3 runs in FIG. 33A to 33C, the change in PC 2 score assumes a logarithmic trend, with a distinct change after 2 mins of breath exposure and plateauing at about t=60 mins. The PC 1 scores of all breath samples remains relatively constant throughout, which suggests that breath-induced spectral variation is largely captured in the 2nd PC. Thus, 2 mins is established as the minimum incubation time.

FIG. 33C shows PC scores vs. time elapsed after breath exhalation plots for one participant. Upon breath exposure, SERS spectra were measured at fixed time intervals of t=2, 5, 10, 15, 30, 60 and 90 mins. The SERS super-profiles at each time interval were analyzed using principal component analysis and compared with the blank super-profiles. Across all 3 runs in FIG. 33A to 33C, the change in PC 2 score assumes a logarithmic trend, with a distinct change after 2 mins of breath exposure and plateauing at about t=60 mins. The PC 1 scores of all breath samples remains relatively constant throughout, which suggests that breath-induced spectral variation is largely captured in the 2nd PC. Thus, 2 mins is established as the minimum incubation time.

FIG. 35A shows respective saturated vapor concentrations of each analyte.

FIG. 35B shows summary of test statistics for peak intensity changes among blanks, COVID-positive and COVID-negative.

FIG. 35C shows comparison of experimental and DFT simulated peak intensities for v(CS) mode relative to the ring breathing mode of MBA.

Figure 38:
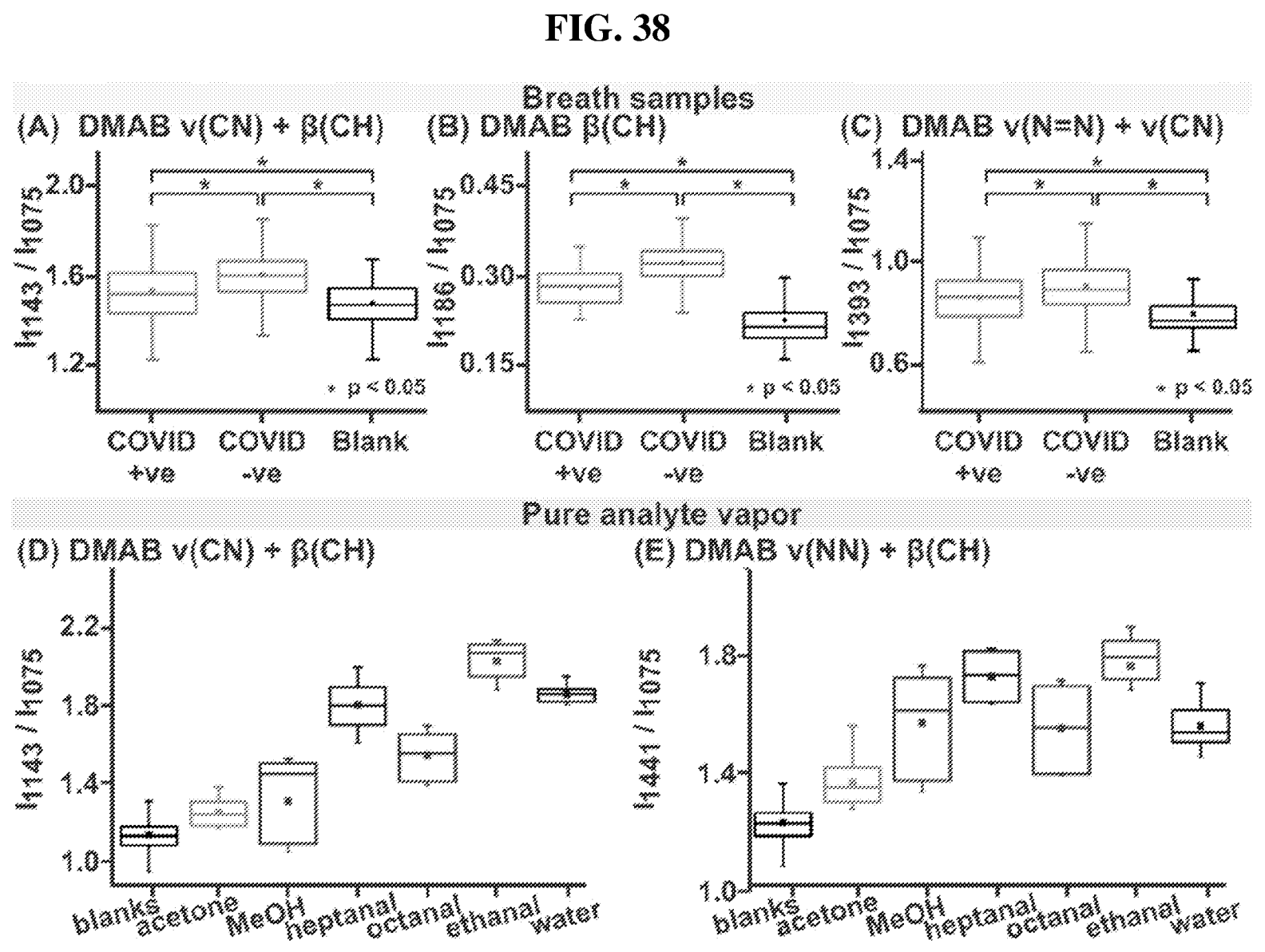

FIG. 38A shows a box plot comparing peak intensity ratios between blanks, COVID-positive and COVID-negative samples.

FIG. 38B shows a box plot comparing peak intensity ratios between blanks, COVID-positive and COVID-negative samples.

FIG. 38C shows a box plot comparing peak intensity ratios between blanks, COVID-positive and COVID-negative samples.

FIG. 38D shows a box plot comparing peak intensity ratios between blanks and the respective pure analyte vapor.

FIG. 38E shows a box plot comparing peak intensity ratios between blanks and the respective pure analyte vapor.

FIG. 43 is a table showing the sensitivity and specificity metrics for each of the 50 PLSDA iterations.

FIG. 46E is a summary table describing the statistical test results of potential confounding factors such as participants' age, gender, smoking habits, and time since the last meal using either the t test or $\chi^2$ test, with their corresponding p value.

FIG. 46F is an analysis of time since the last meal as a potential confounding factor based on (i) distribution of time since last meal of all participants (a small number of participants were unable to recall this information (denoted as NA) and (ii) the model sensitivity and specificity at each time range.

DETAILED DESCRIPTION

Figure 1:
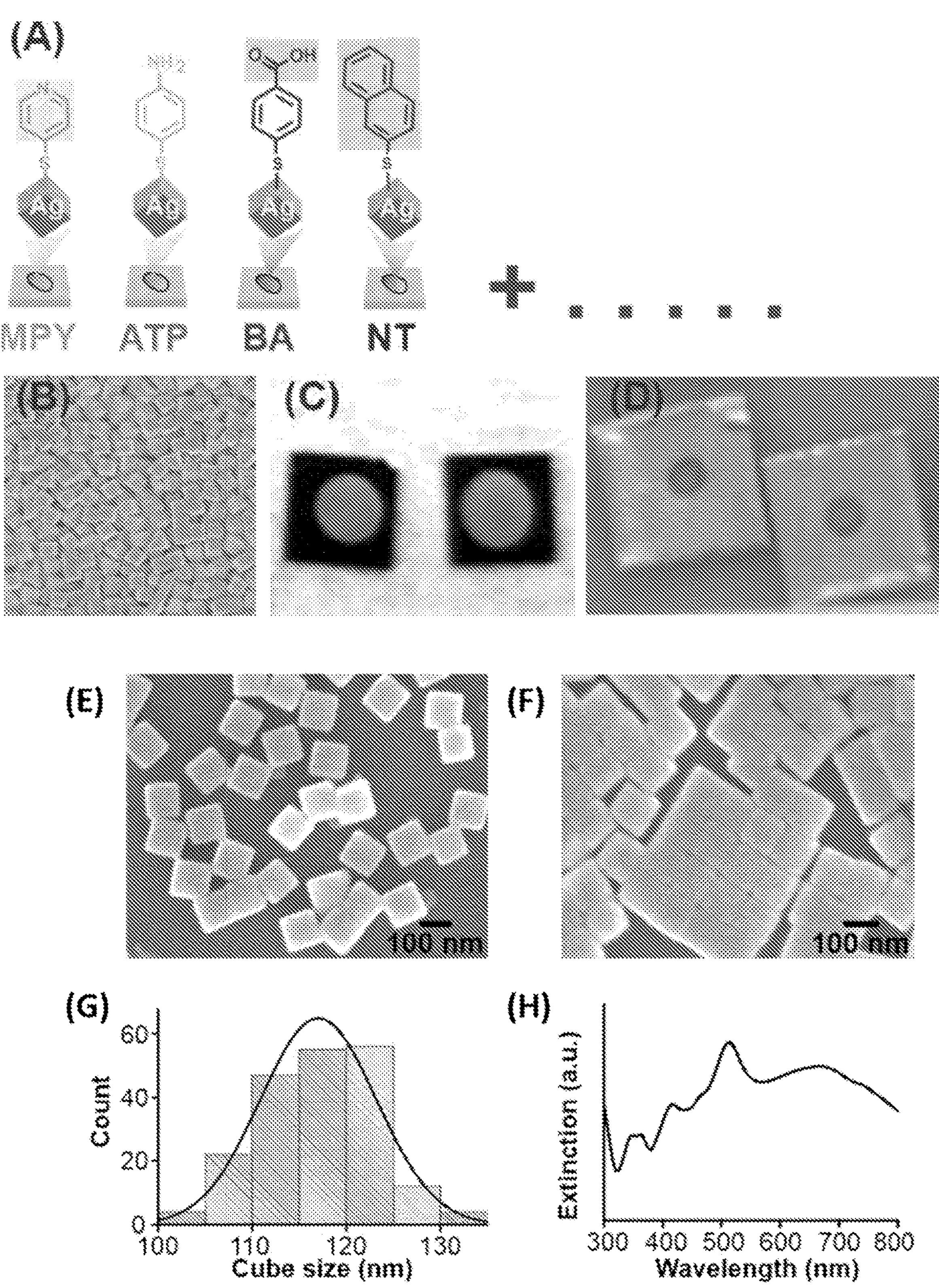
FIG. 1A shows a multiple-probe SERS platform of the present disclosure.
FIG. 1B shows a scanning electron microscopy (SEM) image of the 3D assembly of silver (Ag) nanocubes.
FIG. 1C is an image of the SERS chips on a silicon wafer.
FIG. 1D is an image of the SERS chips on an aluminum plate.
FIG. 1E is a SEM image of the synthesized Ag nanocubes. Scale bar denotes 100 nm.
FIG. 1F is a magnified SEM image showing packing density of Ag nanocubes after self-assembly using the Langmuir-Blodgett technique.
FIG. 1G is a plot of the edge length distribution of Ag nanocubes. The average edge length is 117±6 nm.
FIG. 1H is an UV-vis extinction spectrum of colloidal Ag in ethanol. The peaks at 355, 415, 510 and 670 nm can be assigned to octupole (355 nm), quadrupole (415, 510 nm) and dipole (670 nm) resonances.

The following detailed description refers to the accompanying drawings that show, by way of illustration, specific details and embodiments in which the present disclosure may be practised.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure, in a first aspect, describes a surface-enhanced Raman scattering (SERS) chip for generating multiple SERS profiles simultaneously from one or more analytes suspected to be in a sample. The SERS chip is advantageously versatile in that it can be used to identify chemicals in wine and substances in a gaseous mixture (e.g. greenhouse gas and/or toxic emissions profiling, breath analysis, identification of coronavirus diseases from the breath of a subject, identify a subject as a smoker or non-smoker from the subject's breath, etc.). In other words, the present SERS chip can be used to identify, simultaneously, more than one analyte from a multi-analyte mixture. The SERS chip of the present disclosure also provides better reliability (i.e. accuracy) for identifying an analyte. The multiple SERS profiles may include multiple of the same SERS profile for training a model to quantify and/or identify an analyte (e.g. machine learning purpose). The multiple SERS profiles may include different SERS profiles for training the model as well. Multiple of the same SERS profile may be generated using one Raman probe and/or one analyte. Multiple and different SERS profiles may be generated using more than one Raman probe and/or more than one analyte.

Details of various embodiments of the present SERS chip and advantages associated with the various embodiments are now described below. Where the advantages are demonstrated in the example section hereinbelow, they shall not be iterated for brevity.

In various embodiments, the SERS chip includes one or more substrates and one or more Raman probes formed on the one or more substrates. The SERS chip, which is operable with (i.e. and/or include) machine learning methods, may be termed herein a "plasmonic sniffer" when used to identify gaseous analyte(s), a "SERS taster" when used to identify analyte(s) in a liquid (e.g. wine), and a "SERS sensor" when used to identify a subject infected with, for example, coronavirus disease.

In various embodiments, each of the one or more Raman probes may include a SERS-active nanoparticle grafted with a receptor molecule, (i) wherein the receptor molecule on each of the one or more Raman probes on one substrate can be different from the receptor molecule of the one or more Raman probes on another substrate, and/or (ii) wherein the one or more Raman probes include two or more Raman probes and wherein the receptor molecule on each of the two or more Raman probes on one substrate can be different.

In various embodiments, the receptor molecule may include a thiol group proximal to the SERS-active nanoparticle and a functional group distal to the SERS-active nanoparticle.

In various embodiments, the functional group can interact with the one or more analytes to induce a change in molecular vibration of the receptor molecule which is identifiable by surface-enhanced Raman scattering for generating the multiple SERS profiles. The terms "SERS profile" and "SERS profiles" are herein used interchangeably to refer to a SERS spectrum and SERS spectra, respectively, generated from a Raman probe.

In various embodiments, the surface-enhanced Raman scattering (SERS) chip may further include a SERS-active nanoparticle, which is absent of the receptor molecule, formed on the one or more substrates. Non-limiting examples of such SERS-active nanoparticle include gold, silver, platinum, or palladium. The SERS-active nanoparticle may be a nanopolyhedra, a nanosphere, a nanowire, a nanorod, a nanobowl, or a nanoplate. The SERS-active nanoparticle can be porous or non-porous. Porous SERS-active nanoparticles may have very close hot spot and high hot spot densities, leading to desirable SERS signals that can be easily identified. The hot spot and high hot spot densities arise from having more receptor molecules and/or more analytes trapped in the porous cavities of the SERS-active nanoparticles. Non-porous SERS-active nanoparticles may rely on sharp edges and/or tips, and their interactions with neighboring SERS-active nanoparticles to achieve strong SERS signals.

As mentioned above, the receptor molecule may include a thiol group. In various embodiments, the receptor molecule may include an aromatic thiol or an alkanethiol. Non-limiting examples of the receptor molecule are demonstrated in the example section hereinbelow.

As mentioned above, the receptor molecule may include a functional group. The functional group may include, without being limited to, an amine, a boron, a hydroxyl, a carboxyl, a carbonyl, a phenyl, a pyridyl, a halogen, or a naphthalene. The receptor molecule may include any other functional group that can interact with an analyte to render a change in molecular vibration of the receptor molecule identifiable by surface-enhanced Raman scattering for identification of the analyte.

In various embodiment, the receptor molecule may include, as non-limiting examples, 4-mercaptopyridine, 4-aminodiphenyl disulfide, aminothiophenol, mercaptobenzoic acid, naphthalenethiol, mercaptophenylboronic acid, p-methylthiolbenzaldehyde, or bromothiophenol.

In various embodiments, the one or more substrates may include aluminum or silicon.

The present disclosure also describes a method of identifying one or more analytes suspected to be in a sample using the SERS chip. Embodiments and advantages described for the SERS chip of the first aspect can be analogously valid for the present method subsequently described herein, and vice versa. As the various embodiments and advantages have already been described above and demonstrated in the example section, they shall not be iterated for brevity.

In various embodiments, the method may include contacting the surface-enhanced Raman scattering (SERS) chip described in various embodiments of the first aspect with a sample suspected to contain the one or more analytes.

In various embodiments, the method may include collecting SERS signals from the surface-enhanced Raman scattering (SERS) chip which has contacted the sample. The term "SERS signal" herein refers to the SERS profile mentioned in various embodiments of the first aspect. The term "SERS signal" is used herein, as it may be more suitable over the terms "SERS profile" or "spectrum" to describe a signal collected in the present method via SERS. In any case, the "SERS signal" described in the aspect of the present method is a spectrum obtained via SERS. Understandably, each of the Raman probe described in embodiments of the first aspect generates a SERS signal (i.e. SERS profile).

In various embodiments, the method may include constructing a combined-SERS profile from the SERS signals. The term "combined-SERS profile" refers to a SERS spectrum formed from several SERS spectra. For example, one of the SERS spectra may have one end formed contiguously to one end of another one of the SERS spectra (i.e. the SERS spectra are "stitched horizontally"). In another example, the several SERS spectra may be added together to form an intensity-amplified SERS spectrum (i.e. the SERS spectra are added mathematically to form a SERS spectrum of the same length). Herein, the terms "combined-SERS profile", "super-fingerprint" and "super-profile" are used interchangeably. That is to say, a "super-fingerprint" refers to a SERS spectrum that is formed from a combination of SERS spectra.

In various embodiments, the method may include providing the combined-SERS profile to a device configured with a model trained to identify the one or more analytes from the combined-SERS profile. The device may be a computer operable to process a SERS signal and capable of machine learning. The device may also be operable to carry out any chemometric analysis of a spectrum obtained via SERS, including the SERS signal and the combined-SERS profile.

In various embodiments, collecting the SERS signals may include introducing the surface-enhanced Raman scattering (SERS) chip which has contacted the sample to a laser to generate the SERS signals, and collecting the SERS signals through a sensor. Any laser and sensor suitable co-operable to generate and collect a SERS signal may be used in the present method.

In various embodiments, constructing the combined-SERS profile may include (i) selecting a spectral range for a SERS signal, (ii) attributing the SERS signal to a receptor molecule which has undergone a change in molecular vibration, and repeating (i) and (ii) for another receptor molecule to generate multiple SERS profiles from each respective receptor molecule.

Figure 15A:
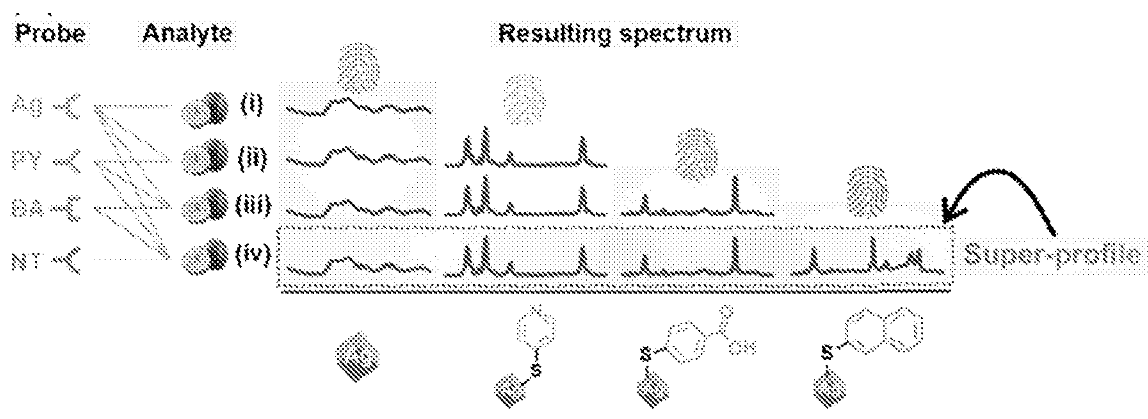
FIG. 15A is a scheme depicting the construction of a SERS superprofile by horizontally combining all four receptor spectra in series.

In various embodiments, constructing the combined-SERS profile may include connecting the multiple SERS profiles for each respective receptor molecule to form a continuous SERS spectrum as the combined-SERS profile. Examples 1H and 3E hereinbelow, as well as FIG. 15A row (iv), are non-limiting examples that illustrate this. Alternatively, constructing the combined-SERS profile may include adding the multiple SERS profiles within the spectral range selected to form an intensity-amplified SERS spectrum as the combined-SERS profile. In various embodiments, a combined-SERS profile may be generated specifically for (with respect to) an analyte suspected to be present in a sample using the various Raman probes. These embodiments shall not be reiterated for brevity, as the examples already describe or demonstrate this.

In various embodiments, connecting the multiple SERS profiles to form the combined-SERS profile may include arranging one SERS profile for one respective receptor molecule as a first SERS profile, adding a constant value to a second SERS profile for the one respective receptor molecule, and arranging the second SERS profile contiguously after the first SERS profile for forming the continuous SERS spectrum. Example 1H is a non-limiting example that demonstrates this.

In various embodiments, providing the combined-SERS profile to the device may include generating several of the combined-SERS profile for providing to the device, and training the device with the several combined-SERS profiles to update the model to identify the one or more analytes. As at least example 1J already describes this, such embodiments shall not be reiterated for brevity.

The present disclosure further relates to a device including the surface-enhanced Raman scattering (SERS) chip described in various embodiments of the first aspect for use in, for example, identifying one or more analytes in a gas and/or a liquid, and/or identifying a subject infected with coronavirus disease. The present disclosure further relates to use of the surface-enhanced Raman scattering (SERS) chip described in various embodiments of the first aspect in the manufacture of a device for, as non-limiting example, identifying one or more analytes in a gas and/or a liquid, and/or identifying a subject infected with coronavirus disease.

In various embodiments, the method may further include subjecting the combined-SERS profile to chemometric analysis. Example 1I describes a certain non-limiting statistical model that can be included for the chemometric analysis.

The word "substantially" does not exclude "completely" e.g. a composition which is "substantially free" from Y may be completely free from Y. Where necessary, the word "substantially" may be omitted from the definition of the present disclosure.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance (e.g. ±0.5%, ±1%, ±2%, ±5%, ±10%, or ±20%).

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

EXAMPLES

The present disclosure relates to a SERS chip and a detection method (using the chip) that operate via interaction-induced peak shifts for the identification and analysis of one or more analytes. The present method may identify and/or quantify an analyte, and/or analyze a multi-analyte mixture. The method may include (a) exposing the one or more analytes to at least two Raman probes, (b) collecting Raman spectrum/spectra of the at least two Raman probes, (c) combining the spectra collected using the at least two Raman probes into a collective spectrum, (d) inputting the entire collective spectrum to a trained learning model and obtaining the molecular identification of and/or quantifying the one or more analytes; and (e) wherein the trained learning model having been trained through machine learning techniques to predict the molecular identification and/or estimate the quantity of the one or more analytes and/or perform classification of a multi-analyte mixture.

Step (c) may be performed via horizontal stitching (combining spectra back to back to extend and form a spectrum) or vertical addition (mathematically adding intensity values of multiple spectra at same wavenumber, which produce same-length spectra as original spectra).

Step (d) may include further data processing such as baseline correction using the automatic weighted least squares method, normalization and/or median centering and/or variable alignment (and optional additional preprocessors such as extended multiplicative scatter correction, etc.). The pre-processors serve to perform standardization of all input spectra, in terms of wavenumber and intensity and also to transform spectroscopic features into more meaningful features.

The analysis and/or classification of a multi-analyte mixture may be analysing/classifying the overall profile of multiple analytes without identifying the components in the mixture (e.g. smoker vs. non-smoker in example 4).

The one or more analytes may include a gaseous, liquid or solid molecule. The method may be particularly advantageous for molecules with smaller Raman cross-sections, e.g. small gaseous molecules, and/or for identification of unknown analyte molecules in a matrix (e.g., multi-analyte mixture).

Each of the at least two Raman probes may include one or more plasmonic metal nanoparticles (e.g. as a layer). The plasmonic metal nanoparticles may be plasmonic gold nanoparticles, plasmonic silver nanoparticles, plasmonic platinum nanoparticles, and/or plasmonic palladium nanoparticles. The nanoparticles may be in the form of a nanopolyhedra (e.g. having four or more faces such as nanocubes and nanooctahedra), nanospheres, nanowires, nanorods, nanobowls, and nanoplates, and optionally nanoporous.

The plasmonic metal nanoparticles (e.g. as a layer) may be bonded with one or more thiol-based organic molecules. Any thiol-based organic molecules may be used (e.g. aromatic thiols or alkanethiols). The thiol-based organic molecules may or may not include functional groups and/or elements that interact with the analytes to result in interaction-induced peak shifts. For example, the interaction can be a covalent bond formation (via reaction), hydrogen bond interaction, electrostatic interaction or Van der Waals interaction. Preferably, the thiol-based organic molecules include aromatic rings for enhancement of the interaction-induced peak shifts. Examples of suitable thiol-based organic molecules include, but are not limited to, 4-mercaptopyridine (MPY), 4-aminodiphenyl disulfide (APDS), aminothiophenol (ATP), mercaptobenzoic acid (MBA), naphthalenethiol (NT), mercaptophenylboronic acid (MPBA), p-methylthiolbenzaldehyde (MTBH), bromothiophenol (BTP). The thiol-based organic molecules may be provided as a monolayer of thiol-based organic molecules on each plasmonic metal nanoparticle.

The at least two Raman probes may include, for example, 2 to 10 different Raman probes. Preferably, the at least two Raman probes may be selected such that a range of interactions occur between the probes and the analyte. For instance, when —OH containing analytes are present, the at least two Raman probes may include (i) Raman probe having only plasmonic metal nanoparticles (e.g. bare non-thiol-grafted Ag nanoparticles) and (ii) Raman probe having plasmonic metal nanoparticle bonded to a MPBA. The Raman probe in (i) may have no/weak interactions with the —OH-containing analytes while the Raman probe in (ii) may have strong interactions with the —OH-containing analytes. With a multi-analyte mixture, more Raman probes having different thiol-based organic molecules (or without) may be used to allow different types of interactions with the different analytes.

The plasmonic metal nanoparticles, optionally bonded with the thiol-based organic molecules, may be coated on a substrate to form a surface-enhanced Raman scattering (SERS) chip. The SERS chip may include multiple layers of the plasmonic metal nanoparticles, optionally bonded with the thiol-based organic molecules. The number of layers may range from 1 to 15 layers.

The present chip and method are described in further details, by way of non-limiting examples, as set forth below.

Example 1A: General Discussion of the SERS Platform

A non-limiting example of the SERS platform may include multiple SERS chips, each having, for example, Ag nanocubes grafted with a specific thiol-based molecular probe, dispensed on either aluminum or silicon wafer as substrate. The thiol probe can be selected from 4-mercaptopyridine (MPY), 4-aminodiphenyl disulfide (APDS), aminothiophenol (ATP), mercaptobenzoic acid (MBA), naphthalenethiol (NT), mercaptophenylboronic acid (MPBA), p-methylthiolbenzaldehyde (MTBH), bromothiophenol (BTP). The number of SERS probes can range, for example, from 2 to 10 (FIG. 1A).

For the fabrication of the SERS platform, Ag nanocube was first synthesized using a polyol method. The as-synthesized Ag nanocubes are then chemically-modified to graft a self-assembled monolayer of thiolated molecules onto the particle surface to function as a SERS reporter molecule as well as a capturing agent for gaseous species. The chemically-modified Ag nanocubes are subsequently drop-cast onto a silicon (Si) wafer to form an example of the SERS platform, which includes a multilayered, 3D nanoparticle array of about 1-5 mm in diameter (FIGS. 1B and 1C). Formation of the 3D SERS platform provides for the SERS activity due to plasmonic coupling, minimizes experimental error due to laser misfocusing, and ensures reproducible SERS read-out. Example 1B describes in more detail the synthesis and characterization of the Ag nanocubes.

Example 1B: Synthesis and Purification of Ag Nanocubes

Ag nanocubes were synthesized with high yield using a polyol reduction method. 20 mL of 1,5-pentanediol was added to a 100 mL round-bottom flask and heated to 190° C. for 10 mins. Aliquots of 250 μL of poly(vinylpyrrolidone) and 500 μL of $AgNO_3$ precursor solutions were then added in an alternate manner to the reaction flask until the reaction mixture turned reddish-brown. The reaction mixture was repeatedly washed with ethanol and centrifuged before being subjected to vacuum filtration using polyvinylidene fluoride filter membranes with pore sizes of 5 μm, 0.65 μm, 0.45 μm and 0.22 μm to remove impurities.

Example 1C: Self-Assembly of Ag Nanocubes Using Langmuir-Blodgett Technique

Oxygen plasma (FEMTO SCIENCE, CUTE-MP/R, 100 W) was used to clean Si substrates for 5 mins before immersing into the Langmuir-Blodgett trough (KSV NIMA, KN1002). The surface pressure was zero-ed prior to the addition of Ag nanocubes. 700 μL of purified Ag nanocubes were dispersed in 1050 μL of chloroform and carefully added to the surface of the water. The mechanical barrier was then gradually adjusted at a fixed compression rate of 2 mm/s till the surface pressure reached 16 mN/m. The substrate was then lifted at a fixed rate of 2 mm/s while maintaining the surface pressure. Example 5F also introduces an approach for assembling the nanocubes on an aluminum substrate.

Example 1D: Surface Functionalization of Ag Nanocubes

Each receptor (NT, MBA, MPY) solution was prepared as separate 10 mM solutions in 1:1 ethanol/2-propanol. The substrates were then immersed in 5 mL of a single receptor solution for at least 12 hours. The substrates were removed and carefully washed with ethanol. To prepare the unfunctionalized Ag surface, the substrate was immersed in 10 mL of 0.5 M KI for 30 minutes. The substrate was then removed, washed and used for SERS measurements immediately.

Example 1E: Platform Characterization

Scanning electron microscopy (SEM) was performed using a JEOL-JSM-7600F microscope at an accelerating voltage of 5 kV. UV-vis spectroscopy was performed using a Cary 60 UV-vis spectrometer. SERS measurements were performed using x-y imaging mode of the Ramantouch microspectrometer (Nanophoton Inc., Osaka, Japan) with a 532 nm excitation laser (power=0.4 mW). A 50× (N.A.=0.55) objective lens was used with 10 s acquisition time for data collection. All SERS spectra were obtained by averaging at least 120 individual SERS spectra within the SERS image.

Example 1F: SERS Measurements of Flavors

The functionalized substrates were individually immersed in 200 μL of aqueous analyte and measured separately. SERS measurements were performed using a hyperspectral x-y imaging mode with an acquisition time of 10 s per line and a laser power of 0.4 mW.

Example 1G: Density Functional Theory (DFT) Simulations

The DFT simulations were carried out using the unrestricted B3LYP exchange-correlation functional in the Gaussian 09 computational chemistry package. The LANL2DZ basis set was used for Ag while the 6-31G(d,p) basis set was used for all other atoms. The Ag surface was modeled using a reported triangle comprising six Ag atoms. The triangular Ag cluster was first geometrically optimized before placing each receptor molecule (NT, MBA, MPY) at the vertex. The whole system was then relaxed with all Ag atoms fixed. Finally, the analyte molecule was placed near the receptor before allowing the whole system to relax with all Ag atoms fixed again.

Example 1H: Constructing SERS Super-Profiles

The spectral range selected for analysis ranged from 250 to 2000 $cm^{-1}$ for a single SERS spectrum. Two SERS spectra were horizontally combined by arithmetically adding a constant value of 2000 to the wavenumber values of the second spectra. This is repeated up to four SERS spectra. The wavenumbers of the compound spectrum can be correlated back to the original wavenumber values by subtracting the constant value added. The gap between each SERS spectrum (0-250 $cm^{-1}$) is ignored in the analysis.

24 SERS spectra were collected for each flavour per receptor, totalling to 576 SERS spectra for 5 flavours+1 flavourless control and 4 receptors (24×6×4). These spectra are then combined to form 144 SERS super-profiles (576÷4).

Example 1I: Chemometric Analysis

Chemometric analyses (PCA, SVM-DA, SVM-R) were conducted using SOLO v8.8 (Stand Alone Chemometrics Software, Eigenvector Research, Inc.). For all models, a standardized set of pre-processing methods which include baseline correction using the automatic weighted least squares method, extended multiplicative scatter correction, normalization, and median centering, were applied. All models were cross-validated using venetian blinds, with 10 splits and a blind thickness of 1. SVM-DA denotes for support vector machine discriminant analysis, which is a machine learning method involving discriminant analysis. SVM-R denotes for support vector machine regression, which is a machine learning method based on the search for boundaries to separate two classes.

Example 1J: Multiplex Flavor Quantification

Figure 3:
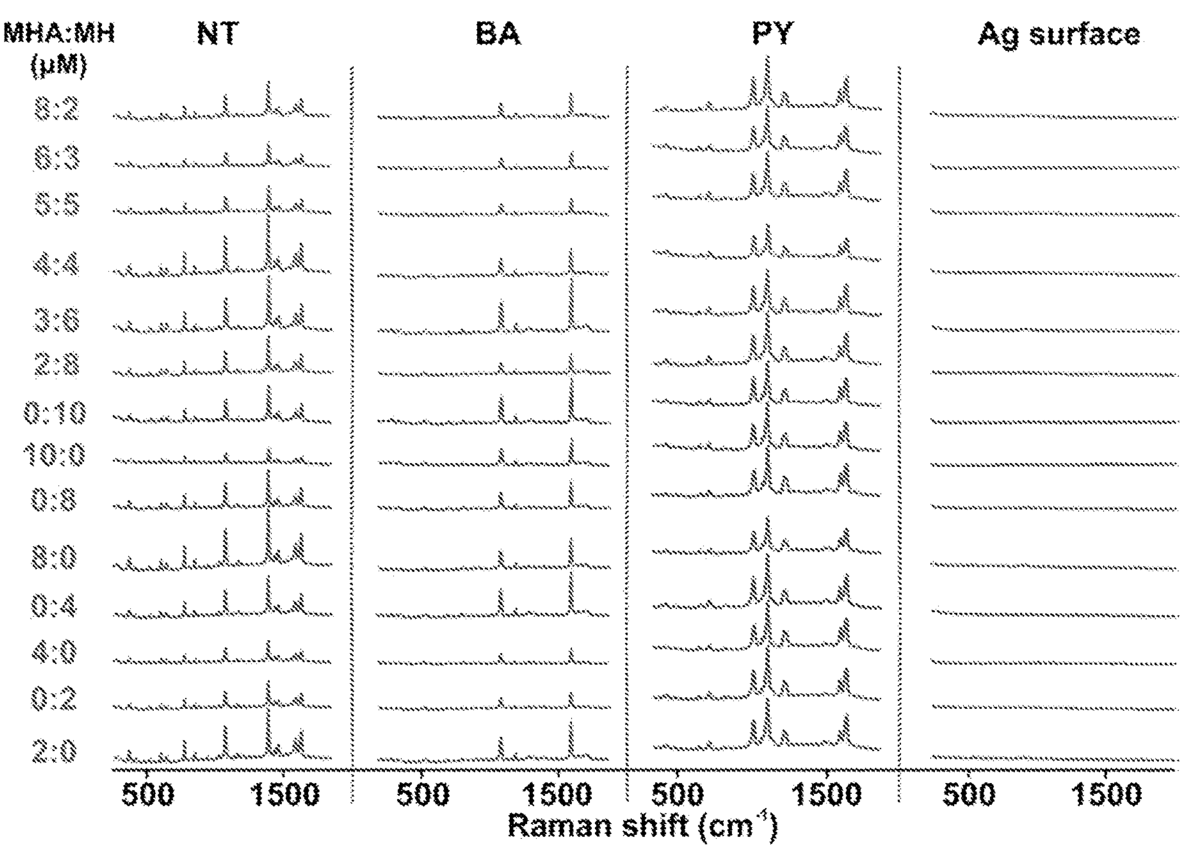
FIG. 3 shows SERS spectra involving varying concentrations of MHA and MH within artificial wine used to construct calibration curves using SVM-R.

The artificial wine matrix contains 86% water, 12% ethanol, 1% glycerol (to represent sugars) and 1% tartaric acid (to represent acids). A total of 14 different combinations of flavor concentrations were tested (shown in FIG. 3). For each artificial wine sample, 16 SERS super-profiles were constructed, totaling 224 SERS super-profiles. This data set is then split into a calibration set comprising 142 SERS super-profiles (or SERS spectra for the single receptor) and a validation set comprising 82 SERS super-profiles. Finally, 8 SERS super-profiles were individually constructed for 6 'unknown' artificial wine samples as the test data set.

Figure 2:
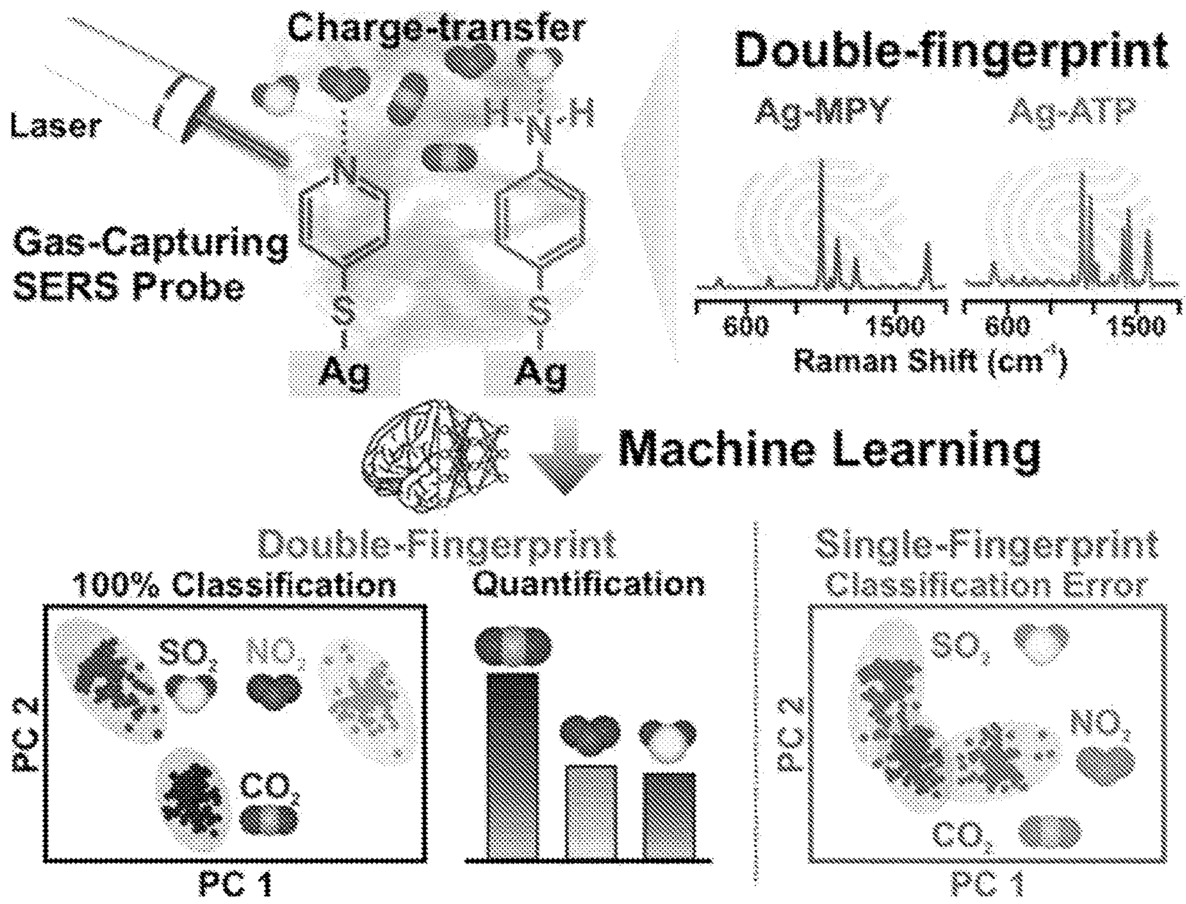
FIG. 2 is a schematic of the super-fingerprinting platform of the present disclosure for detecting and differentiating small toxic gases at the molecular level. Gas analytes include sulfur dioxide ($SO_2$), carbon dioxide ($CO_2$) and nitrogen dioxide ($NO_2$). The present strategy utilizes two molecular probes, 4-mercaptopyridine (MPY) and 4-aminothiophenol (ATP), to capture gas analytes near the plasmonic surfaces for strong SERS enhancement. The two SERS signatures obtained can be further combined into a super-fingerprint which, when coupled with machine learning, enables 100% classification accuracy and quantification of gases. "PC" denotes principal component.

Example 2A: Greenhouse Gas Profiling and Multiplex Gas Mixture Analysis with Double-Fingerprinting Plasmonic Sniffer In this example, a SERS 'plasmonic sniffer' containing dual probes that can profile various acidic gaseous pollutants ($CO_2$, $NO_2$ and $SO_2$) by forming multiple primary and secondary interactions to magnify the structural differences among the gases (FIG. 2). The present chip and method involve a dual-probe strategy that combines the two probe fingerprints to provide a multi-facet profiling of the gases and achieve unequivocal molecule recognition because each gas analyte interacts differently with each probe. In this example, the surface of Ag nanocubes was modified with 4-mercaptopyridine (MPY) and 4-aminothiophenol (ATP) probes that strongly capture the targeted analytes via charge-transfer interaction due to their nitrogen moiety, bringing the targeted molecules close to the probe. Consequently, such close proximity may activate a secondary interaction whereby the oxygen atoms of the acidic gases are close enough to form strong hydrogen bonds with the aromatic hydrogen atoms of the probe, forming 5-membered and 6-membered ring complexes with MPY and ATP, respectively. Using SERS, insights into the probe molecule vibrational changes induced by the as-described interactions were obtained, and corroborated with density functional theory (DFT) and chemometric algorithms to affirm the mechanism behind the selective analytes capturing of the platform and rationalize the changes in SERS spectra upon analyte binding. Additionally, chemometric analysis enables the present plasmonic sniffer to accurately resolve the spectroscopic changes upon analyte binding to attain excellent classification of gases with high structural similarity at unprecedented accuracy of 100%. In addition, $SO_2$ and $NO_2$ were simultaneously quantified with a high accuracy of more than 90% even in the artificial exhaust matrix, consisting of multiple interferences such as excessive $CO_2$, particulate matters and water vapor.

Example 2B: Machine Learning Details—Classification of $CO_2$, $SO_2$ and $NO_2$ The substrate was exposed to each gas at flow rate 44.7 μmol/s for 15 seconds before being subjected for SERS measurement. Raman spectra obtained were extracted between 300 and 1800 $cm^{-1}$ and pre-processed with baseline correction and normalization (area=1). For the construction of principal component analysis (PCA) score plot using individual molecular probes, the spectra were further pre-processed using Extended Scatter Correction (EMSC, order=2) and mean centering before subjected to principal components analysis. Super-fingerprints were obtained by stitching the pre-processed Ag-ATP spectra after the pre-processed Ag-MPY spectra, and then further pre-processed using EMSC and mean centering before performing principal component analysis.

For model training, a minimum of 15 super-fingerprints representing each sample are fed as training data with assignment. For prediction, a minimum of 15 super-fingerprints representing each new sample are used.

Example 2C: Machine Learning Details—Quantification of $SO_2$, $NO_2$ and $CO_2$ The substrate was exposed to each gas at a flow rate varying from 0 to 44.7 μmol/s for 15 seconds. The processes of spectra collection, pre-processing, super-fingerprints generation and super-fingerprints pre-processing were repeated to obtain the platform's super-fingerprints upon exposure to individual gas at various flow rates. The calibration curves were then obtained using partial least squares (PLS) regression.

For model training, a minimum of 15 super-fingerprints representing each sample are fed as training data with assignment. For prediction, a minimum of 15 super-fingerprints representing each new sample are used.

Example 2D: Machine Learning Details—Multiplex Quantification of $SO_2$ and $NO_2$ in the Artificial Exhaust In order to simulate complex composition of exhaust, excessive $CO_2$, water vapour and smoke from combustion were introduced. High flow rate of $CO_2$ (894 μmol/s) was mixed with $SO_2$ and $NO_2$ using the mass flow controller. Water vapour was introduced by heating a water bath at 90° C. In addition, a burning joss stick was used to generate smoke that mimics complicated composition of the exhaust. In a typical multiplex detection, the platform was held 20-25 cm above the heating water bath, approximately 45 degree from the vertical. The burning joss stick was placed 5-10 cm above the heating water bath. Simultaneously, the gas mixture included $SO_2$, $NO_2$ from 0-44.7 μmol/s and $CO_2$ at 894 μmol/s was directed perpendicularly to the platform for 15 seconds. 100 spectra were collected for each combination of gas flow rate. The spectra were split into 70:30 calibration: validation set. Spectra obtained were analyzed with support vector machine (SVM) regression to construct the calibration curve. The validation results for each different flow rate were averaged to compare the quantification accuracy between the super-fingerprint and traditional single fingerprint platform.

For model training, a minimum of 15 super-fingerprints representing each sample were fed as training data with assignment. For prediction, a minimum of 15 super-fingerprints representing each new sample were used.

Figure 4:
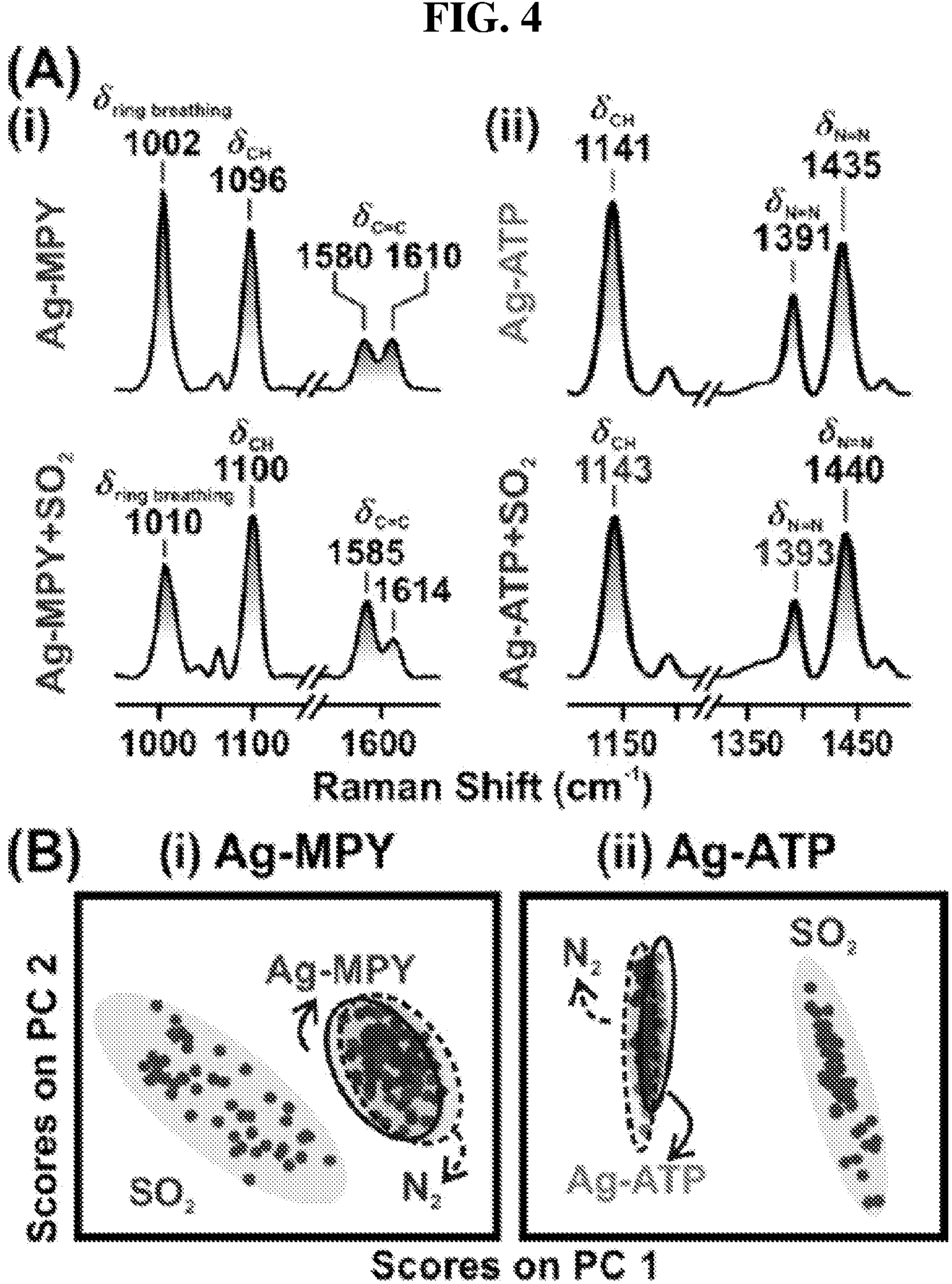
FIG. 4A shows experimental SERS spectra of (i) Ag-MPY and (ii) Ag-ATP before and after exposure to $SO_2$ gas.
FIG. 4B shows PCA score plots involving (i) Ag-MPY and (ii) Ag-ATP SERS probe molecules under various experimental conditions.

Example 2E: Discussion for Examples 2A to 2D—$SO_2$ Sensing with Ag-MPY and Ag-ATP To differentiate $SO_2$, $NO_2$ and $CO_2$ gases, the present SERS method is integrated with machine learning to boost detection accuracy, reduce analysis time, and minimize potential human judgement errors. The present analytical framework includes three main steps, involving (1) SERS measurements and subsequent use of chemometric tools to (2) classify molecular vibrational fingerprints and (3) locate key spectral changes. $SO_2$ was chosen as the first model analyte because of its high toxicity to humans and adverse environmental impacts such as acid rain. In one example of detection, gas flows are controlled at 44.7 μmol/s and impinged onto the present SERS platforms (<1 cm separation) for a short duration of 15 seconds. The SERS responses were then measured across the entire platform to give a representative dataset (>50 spectra) for subsequent building of machine learning models. For instance, as-fabricated Ag-MPY platform exhibits four characteristic SERS bands at 1002, 1096, 1580 and 1610 $cm^{-1}$ indexed to ring breathing, CH bending, asymmetric and symmetric C═C stretching (FIG. 4A, plot (i)), respectively. Upon subsequent exposure to $SO_2$ gas, these Ag-MPY vibrational modes blue-shift to 1010, 1100, 1585 and 1614 $cm^{-1}$, respectively. Conversely, Ag-MPY platform under inert $N_2$ environment displays negligible spectral change. This control experiment affirms that the Ag-MPY spectral changes when exposed to $SO_2$ are due to their chemical interactions rather than laser-induced processes.

Principal component analysis (PCA) was utilized to classify the SERS vibrational signatures recorded from (1) as-fabricated Ag-MPY, (2) Ag-MPY exposed to $SO_2$ (Ag-MPY-$SO_2$), and Ag-MPY exposed to $N_2$ (Ag-MPY-$N_2$). PCA is apt for spectral classification because it reduces multi-dimensional datasets into their principal components (PCs) to facilitate comparisons among different datasets. Using PCA, the Ag-MPY and Ag-MPY-$SO_2$ SERS spectra are notably separated into two distinct data clusters along the first principal component (PC 1) at 95% confidence interval (FIG. 4B, plot (i)). In contrast, the Ag-MPY and Ag-MPY-$N_2$ datasets overlap and are thus statistically similar. These findings highlight that the Ag-MPY platform is selective towards $SO_2$ analyte and does not bind to omnipresent $N_2$ gas, a major gas interference that constitutes ~78% of air.

More importantly, the present analytical framework is versatile and can be extended to the second Ag-ATP platform for gas detection (FIG. 4A, plot (ii)). It is demonstrated that Ag-ATP indeed captures gas analytes. Using similar PCA and loading plot analyses, it can be observed (1) Ag-ATP SERS also features blue-shift upon interaction with $SO_2$ gas and (2) major spectral changes are located in three Raman shift regions of 1135-1150 $cm^{-1}$, 1388-1400 $cm^{-1}$, and 1430-1446 $cm^{-1}$ (FIG. 4*a*, plot (ii)). It is again affirmed that these spectral changes are due to Ag-ATP and $SO_2$ interaction because control Ag-ATP platform demonstrates consistent SERS signatures when exposed to $N_2$ gas. The automated spectral analyses clearly excel over traditional peak hunting because it analyzes the full SERS spectrum to give comprehensive, molecular-level insights that cannot be otherwise achieved using a single or few vibrational modes. Identifying the molecular probes' vibrational changes herein serves as the fundamental basis to systematically investigate into probe-gas chemical interactions.

Example 2F: Discussion for Examples 2A to 2D—Classification of Structure-Like Gases by Combining Individual Spectra Having demonstrated the molecular probes' ability to capture $SO_2$, the present plasmonic sniffer is extended to detect other major gas pollutants such as $NO_2$ and $CO_2$.

Figure 5:
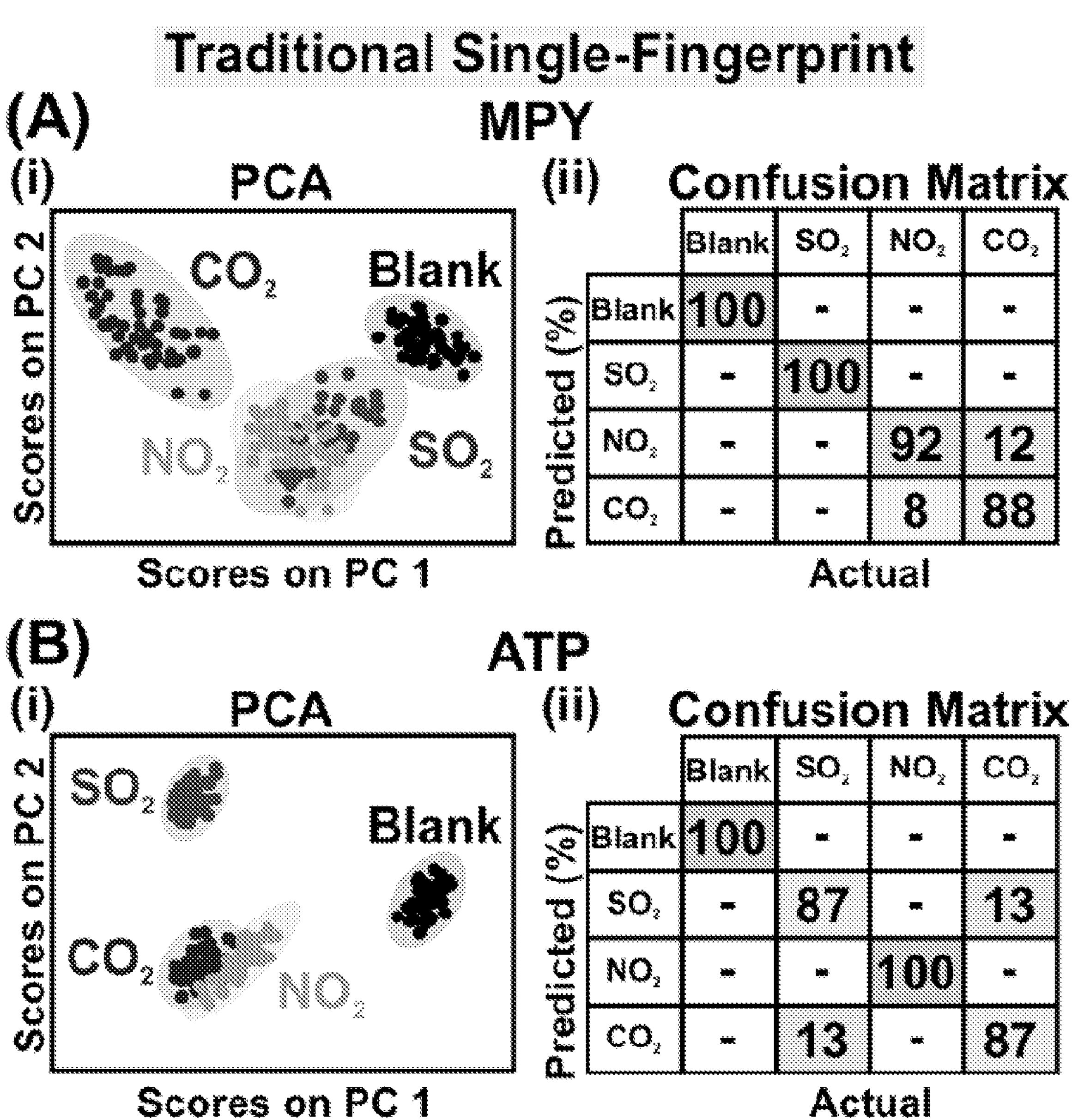
FIG. 5A shows chemometric analyses on traditional single fingerprints obtained from Ag-MPY, wherein (i) is a PCA score plot and (ii) is a confusion matrix obtained using supported vector machine-discriminant analysis (SVM-DA) on respective SERS platforms.
FIG. 5B shows chemometric analyses on traditional single fingerprints obtained from Ag-ATP, wherein (i) is a PCA score plot and (ii) is a confusion matrix obtained using supported vector machine-discriminant analysis (SVM-DA) on respective SERS platforms.
FIG. 5C shows the super fingerprint obtained by combining individual Ag-MPY and Ag-ATP spectra into a collective spectrum which boosts classification accuracy to 100%, wherein (i) is a PCA score plot and (ii) is a confusion matrix obtained using supported vector machine-discriminant analysis (SVM-DA) on respective SERS platforms.
FIG. 5D shows PLS calibration curves of neat $SO_2$ and $SO_2$ in $CO_2$ matrix. $CO_2$ flow rate was standardized at 1200 sccm.
FIG. 5E shows PLS calibration curves of neat $NO_2$ and $NO_2$ in $CO_2$ matrix. $CO_2$ flow rate was standardized at 1200 sccm.
Figure 5:
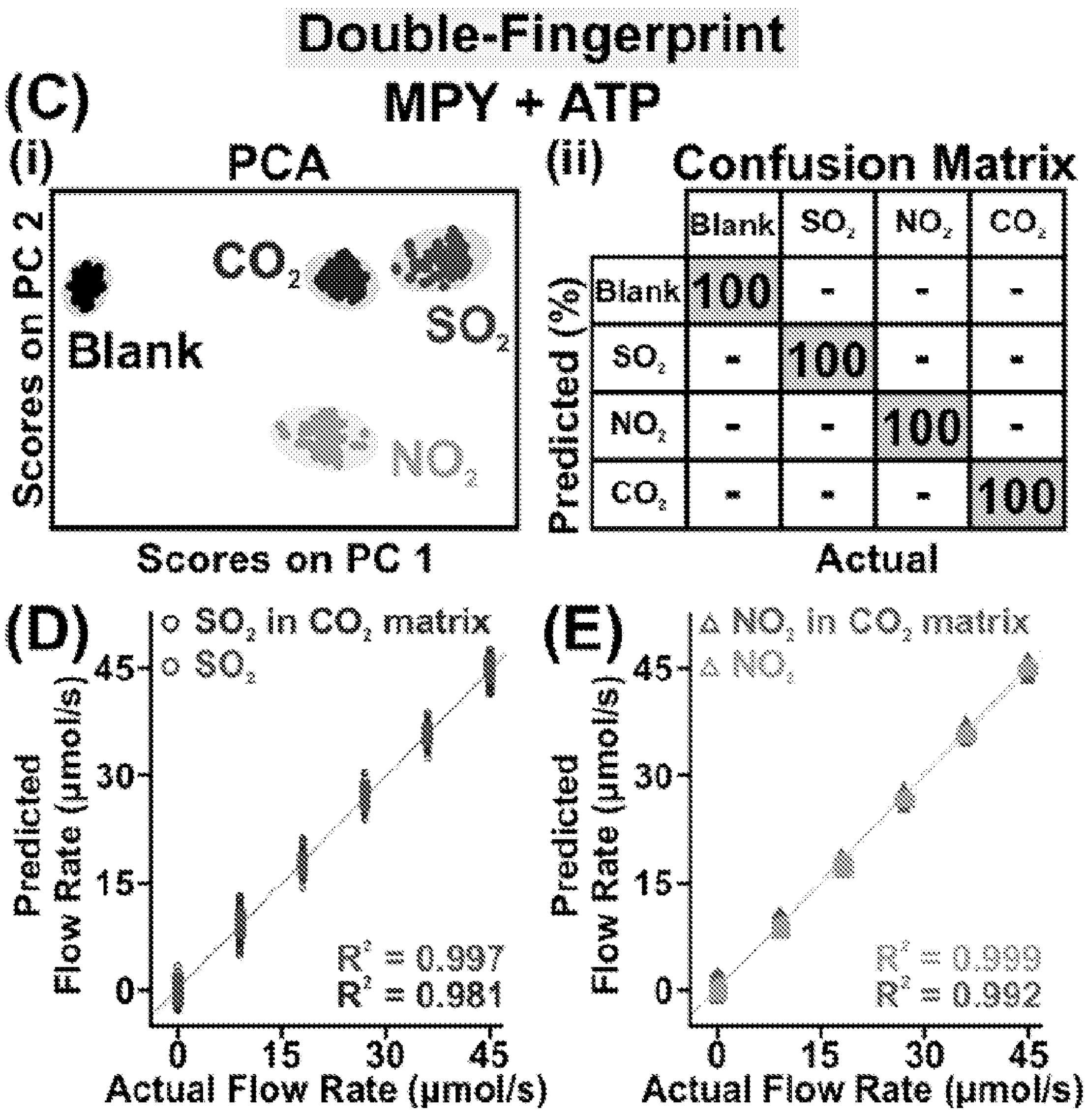

Notably, both the SERS platforms are able to detect the three gas analytes. This observation highlights that Ag-MPY and Ag-ATP potentially utilize different intermolecular interactions for the three gas pollutants, which is expected because their central atoms are different, which can alter electron distribution and the probe-analyte interactions. There are also minor overlaps between the confidence ellipses of $CO_2/SO_2$ and $CO_2/NO_2$ pairs in the PCA score plots of Ag-MPY and Ag-ATP platforms, respectively (FIG. 5A plot (i) and FIG. 5B plot (i)). These overlaps indicate that while Ag-MPY can differentiate $CO_2$ from $SO_2$ and $NO_2$, it cannot distinguish between $SO_2$ from $NO_2$. Likewise, the Ag-ATP separates $SO_2$ from $NO_2$ and $CO_2$ but is unable to resolve $NO_2$ from $CO_2$. The datasets overlap consequently reduces classification accuracy to <90% which could potentially lead to false positive/negative results (FIG. 5A plot (ii) and FIG. 5B plot (ii)).

Figure 6:
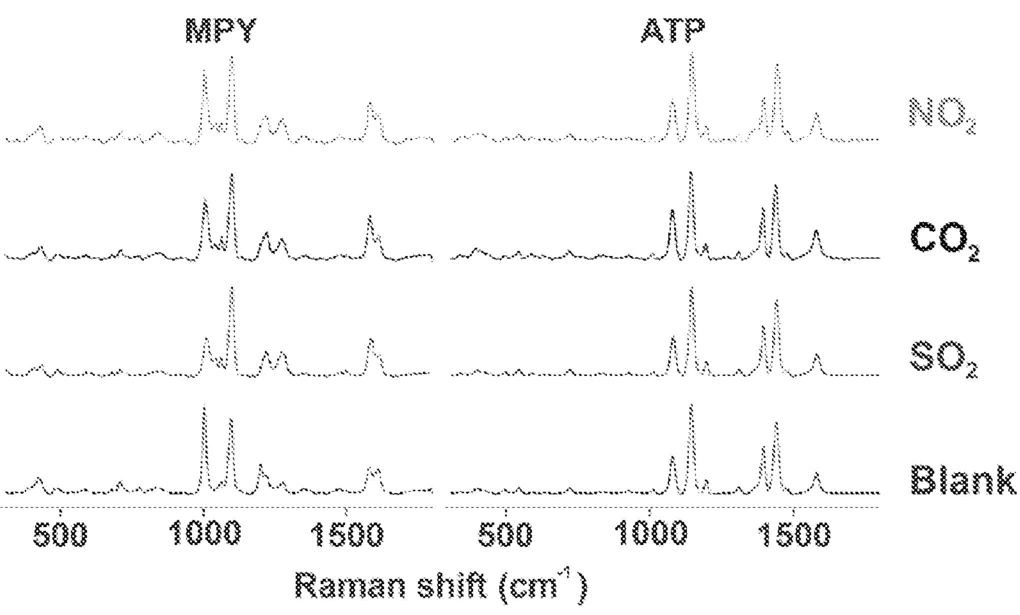
FIG. 6 shows normalized super-fingerprint spectra recorded from the SERS platforms before and after exposure to various gas analytes. The grey-shaded portions indicate the regions of large spectral changes upon interactions with different gases.

To improve detection accuracy, an advantageous molecular "double-fingerprinting" by artificially stitching individual Ag-MPY and Ag-ATP SERS spectra into a collective SERS spectrum containing enriched chemical information on the probe-analyte interactions is introduced. This approach is based on observations that Ag-MPY and Ag-ATP provide complementary information to distinguish between different gas analytes; Ag-MPY separates $CO_2$ from $SO_2$ and $NO_2$, while Ag-ATP separates $SO_2$ from $NO_2$ and $CO_2$. In this approach, Ag-MPY and Ag-ATP SERS spectra between 300 and 1800 $cm^{-1}$ are first pre-processed and subsequently combined into a single collective spectrum for further chemometric analysis (FIG. 6). Principal components analysis on the resulting double-fingerprints clearly separates all analyte datasets with no overlap in their confidence ellipses (FIG. 5C plot (i)), thus achieving 100% classification accuracy of $SO_2$, $CO_2$ and $NO_2$ (FIG. 5C plot (ii)).

This example therefore demonstrates the first univocal identification of gas molecules, which is a huge challenge when using standard detection methods (e.g. electrochemistry) and traditional SERS approaches that utilize a single molecular fingerprint with limited chemical information. Hereon, further discussions may be based on the aforesaid unique concept of SERS super-fingerprint or double-fingerprint where at least two probes are used.

By exploiting the 100% classification accuracy of the present plasmonic sniffer, it is further demonstrated that the quantification of the three target gases in both individual and multiplex detections can be achieved. Partial linear squares (PLS) regression analysis was employed to construct a calibration curve correlating the spectral changes to the gas flow rates (0-44.7 μmol/s) for subsequent machine learning. For individual detections, it is observed that the predicted gas flow rates match the actual flow rates at a high quantification accuracy of ~95% for both $SO_2$ and $NO_2$ gases (FIG. 5D to 5E). More importantly, detections of $SO_2$ or $NO_2$ in ~100-fold higher $CO_2$ concentration still allows analyte quantification at 81% and 91% accuracy, respectively, and closely tally with the calibration curves obtained during individual gas detections. These findings highlight that $CO_2$ does not interfere with the gas detections. The high quantification accuracy towards $SO_2$ and $NO_2$ arises from the integration of molecular double fingerprint with machine learning to clearly distinguish and classify various gas molecules. Achieving accurate quantification of target gas analytes in the presence of excessive $CO_2$ gas is important because the latter is often present in gas exhausts at 30 to 40-fold higher concentrations.

Figure 7:
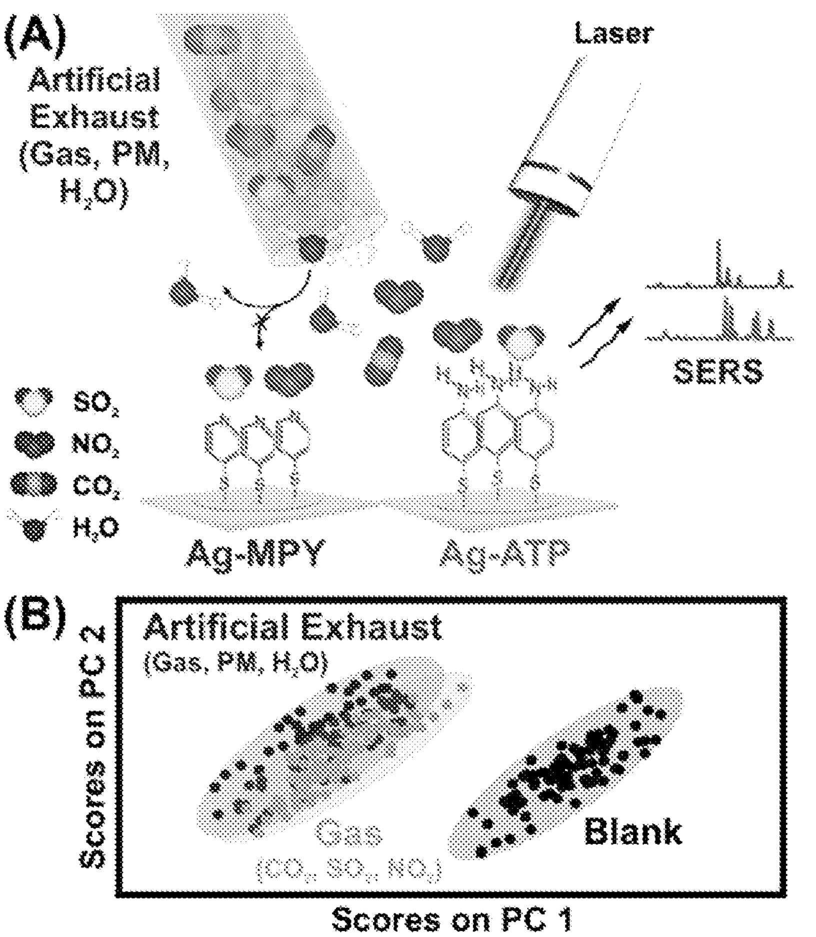
FIG. 7A is a scheme illustrating the multiplex detections of $NO_2$ and $SO_2$ in artificial exhaust containing $CO_2$, $H_2O$ and particulate matter (PM) as potential interferences.
FIG. 7B is a PCA score plot highlighting the present platform can selectively detect target gases in artificial exhaust.
FIG. 7C shows calibration curves obtained for $SO_2$ in artificial exhaust.
FIG. 7D shows calibration curves obtained for $NO_2$ in artificial exhaust.
FIG. 7E is a plot for comparison of the $SO_2$ quantification accuracies obtained from the super-fingerprint method and traditional single-fingerprint approach.
FIG. 7F is a plot for comparison of the $NO_2$ quantification accuracies obtained from the super-fingerprint method and traditional single-fingerprint approach.
Figure 7:
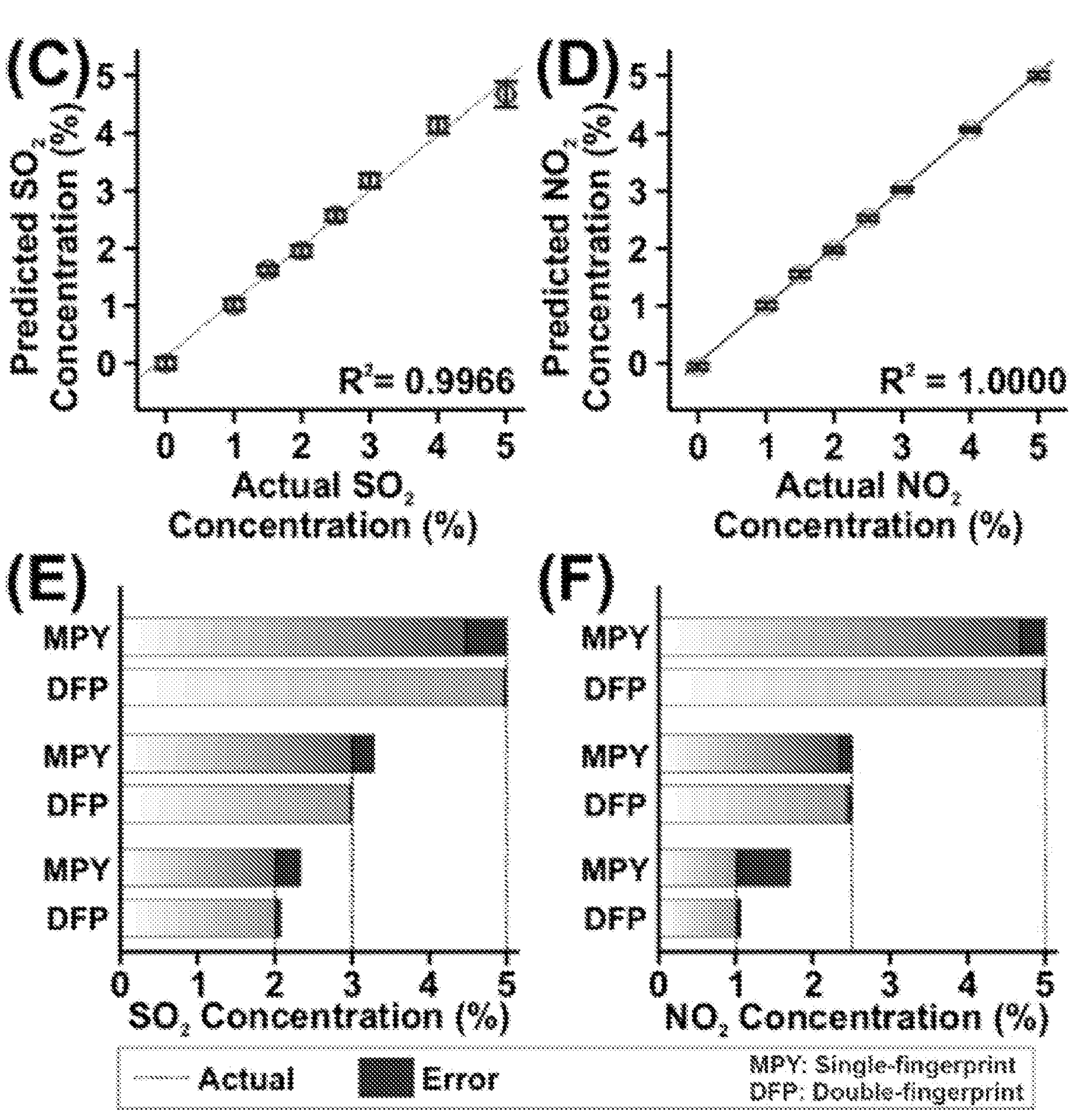

Example 2G: Discussion for Examples 2A to 2D—Quantification of $SO_2$ and $NO_2$ in the Presence of Interferences The present machine learning-assisted SERS approach notably enables accurate quantification of multiple gas pollutants (e.g. $SO_2$ and $NO_2$) in highly complex artificial exhaust. In a detection set-up, the plasmonic sniffer was exposed to a gas flow containing the three gas analytes (e.g. $SO_2$, $NO_2$ and $CO_2$) and potential interferences such as water vapor and fine particulate matter (FIG. 7A). Notably, these molecular and particulate interferences have no effect on the SERS spectra. There is clearly a great overlap between the confidence ellipses when greenhouse gas detections are performed with or without the presence of interferences (FIG. 7B), affirming that the present SERS probes mainly interact with the target chemicals of interests, and not interfered by common environmental interferences such as water and particulate matters. Furthermore, the plasmonic sniffer is able to accurately differentiate target $SO_2$ and $NO_2$ gases from interferences. This is due to the selective charge-transfer complex formation between nitrogen-containing functional group and doubly oxygen-bonded electron-deficient atoms ($XO_2$, in which X═S, N, C), which are not present in water and the solid particulate. The ability of the plasmonic sniffer to differentiate $SO_2$ and $NO_2$ from interferences clearly enables the multiplex quantifications of these highly toxic gas pollutants down to 1% (% v/v) in the artificial exhaust matrices (FIGS. 7C and 7D). It is again highlighted the importance of using SERS double-fingerprints to achieve near perfect (92% and 91%) quantification accuracy towards target $SO_2$ and $NO_2$ gases, respectively, as compared to the relatively poorer accuracy (90% and 87%) when using individual SERS probe (FIGS. 7E and 7F). The integration of the plasmonic sniffer with machine learning thus allows multiplex detection of target gases directly in a complex matrix without the need for sample pretreatment, eliminating the need for sample pretreatment is vital to minimize the time and cost required for gas detections which is otherwise necessary for IR-based gas sensors.

Example 3A: Multiplex Profiling of Wine Flavors with Plasmonic Taster

Figure 8:
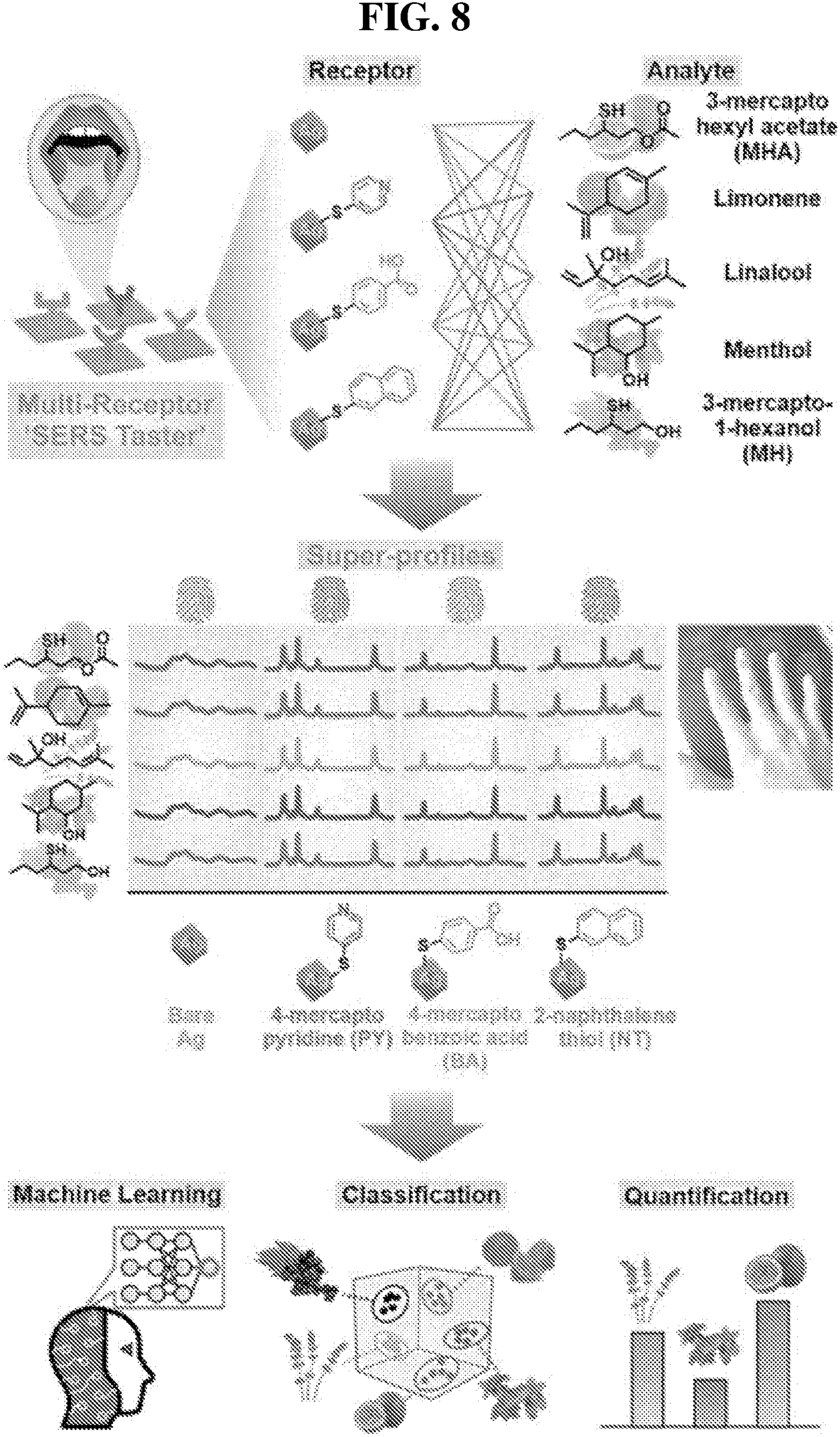
FIG. 8 shows a multi-receptor SERS taster to construct SERS super-profiles for machine-learning-driven identification and quantification of wine flavour molecules. The SERS taster includes four independent SERS substrates with unique molecular receptors (bare Ag, 4-mercaptopyridine (PY), 4-mercaptobenzoic acid (BA), 2-naphthalenethiol (NT)) to distinguish wine flavour compounds (menthol, linalool, limonene, 3-mercaptohexyl acetate (MHA), 3-mercapto-1-hexanol (MH)). Through specific receptor-flavour chemical interactions, the SERS super-profiles were constructed for each flavour molecule by strategically combining all receptor SERS spectra in series. Analysis of these super-profiles using machine-learning-driven chemometric models enable enhanced identification and quantification of flavour molecules.

Using the present SERS chip, a machine learning-driven 'SERS taster' capable of achieving multiplex profiling of five wine flavor molecules with 100% accuracy at parts-per-million levels was also developed (FIG. 8). The present strategy employs multiple carefully designed receptor-flavor chemical interactions to capture all active chemical functionalities within flavor molecules and to build a more complete vibrational spectroscopic profile of every flavor molecule. Each receptor-flavor interaction provides useful vibrational information of the target flavor. By serially combining the various receptor-flavor spectra into a 'SERS super-profile' (super-fingerprints, as described hereinabove, i.e. the term 'super-profile' is merely used in this example to avoid confusion with examples 2A to 2G in terms of probe numbers), all active chemical functionalities within the flavor molecule were captured and to construct a more complete spectroscopic profile for each molecule. These compound SERS super-profiles are comprehensively analyzed using machine learning-driven chemometric models, thereby enabling unambiguous identification and multiplex quantification of wine flavors.

The key strategy of the SERS taster is constructing a more complete fingerprint profile of the selected flavor molecules, achieved by introducing multiple targeted receptors which can capture all active chemical functionalities present via a host of chemical interactions (FIG. 15D). 4-mercaptopyridine (PY), 4-mercaptobenzoic acid (MBA), 2-naphthalenethiol (NT) and a bare Ag surface were selected as smart receptors for the SERS taster. The chosen receptors comprise specific functional groups to promote electrostatic interactions, hydrogen bonding, π-π interactions, van der Waals' forces and Ag-thiolate bonding with a myriad of chemical functionalities present on target flavor molecules. In addition, apart from the bare Ag surface, these receptors comprise a free thiol group which forms a self-assembled monolayer on Ag nanocubes. Through these chemical interactions, flavor molecules are confined to the plasmonic surface and produce characteristic receptor SERS spectral changes in the form of new peaks, peak shifts and/or peak intensity differences.

Next, five representative wine flavors were selected, including higher aliphatic alcohols (menthol), terpenes (linalool, limonene) and sulfur-containing compounds (3-mercaptohexyl acetate (MHA) and 3-mercapto-1-hexanol (MH)). These flavour molecules have weak Raman scattering cross sections and are challenging to detect even with advanced chromatographic techniques (FIG. 9). The interactions between individual receptor-flavour pairs produce SERS spectral variations that corroborate both experimentally and in silico. These variations were further amplified by combining individual SERS spectra into a compound SERS super-profile for every flavour. Principal component analyses (PCA) of these super-profiles achieve complete flavour identification, enabling even the discrimination of alcohols with varying degrees of substitution. Support vector machine discriminant analysis (SVM-DA) to quantitatively classify all flavours was employed with 100% accuracy. In contrast, flavour classification accuracy drops dramatically to 33% with single receptors. Finally, the present SERS taster achieves perfect accuracy in the multiplex quantification of wine flavours in an artificial wine matrix despite potential interferences. The SERS taster overcomes current limitations in wine flavour profiling as a highly sensitive SERS platform that requires minimal sample pre-treatment and provides ease of multiplex detection. Collectively, the findings pave the way in the development of innovative SERS sensors for flavour chemistry and a myriad of applications extending beyond.

Importantly, multiple molecular receptors were deliberately selected to interact with various chemical functionalities that are present on the target flavors. These receptor-flavor interactions enable us to create a complete vibrational profile which accentuates differences in molecular structures among different flavor molecules. The receptors also contain aromatic rings which exhibit large Raman cross sections, thereby amplifying spectral changes upon interacting with target flavor molecules.

In summary, the present example demonstrates for a machine-learning-driven "SERS taster" to simultaneously harness useful vibrational information from multiple receptors for enhanced multiplex profiling of five wine flavor molecules at parts-per-million levels. The receptors employ numerous non-covalent interactions to capture chemical functionalities within flavor molecules. By strategically combining all receptor-flavor SERS spectra, comprehensive "SERS superprofiles" can be constructed for predictive analytics using chemometrics. Molecular-level interactions in flavor identification are elucidated and further demonstrate the differentiation of primary, secondary, and tertiary alcohol functionalities. The SERS taster also achieves perfect accuracies in multiplex flavor quantification in an artificial wine matrix.

Example 3B: Methods and Machine Learning Details of Example 3A

Examples 1A to 1J already discussed the various methods of characterization and machine learning in detail, which may be applied for example 3A. As such, for brevity, the characterization and machine learning details are summarised in this example.

Constructing SERS super-profiles—the spectral range selected for analysis ranged from 250 to 2000 $cm^{-1}$ for a single SERS spectrum. Two SERS spectra (obtained with different smart receptor) were horizontally combined by arithmetically adding a constant value of 2000 to the wavenumber values of the second spectra. This is repeated up to four SERS spectra, each spectrum obtained with either 4-mercaptopyridine (MPY), 4-mercaptobenzoic acid (MBA), 2-naphthalenethiol (NT) or a bare Ag surface as the smart receptor, individually. The wavenumbers of the compound spectrum can be correlated back to the original wavenumber values by subtracting the constant value added. The gap between each SERS spectrum (0-250 $cm^{-1}$) is ignored in the analysis. 24 SERS spectra were collected for each flavour per receptor, totalling to 576 SERS spectra for 5 flavours+1 flavourless control and 4 receptors (24×6×4). These spectra are then combined to form 144 SERS super-profiles (576÷4).

Chemometric analysis—chemometric analyses (PCA, SVM-DA, SVM-R) were conducted using SOLO v8.8 (Stand Alone Chemometrics Software, Eigenvector Research, Inc.). For all models, a standardized set of pre-processing methods was applied, which include baseline correction using the automatic weighted least squares method, extended multiplicative scatter correction, normalization and median centering.

Multiplex flavour quantification—the artificial wine matrix includes 86% water, 12% ethanol, 1% glycerol (to represent sugars) and 1% tartaric acid (to represent acids). A total of 14 different combinations of flavor concentrations were tested. For each artificial wine sample, 16 SERS super-profiles were constructed, totalling 224 SERS super-profiles. This data set is then split into a calibration set comprising 142 SERS super-profiles (or SERS spectra for the single receptor) and a validation set comprising 82 SERS super-profiles. Finally, 8 SERS super-profiles were individually constructed for 6 'unknown' artificial wine samples as the test data set.

Example 3C: Results and Discussion of Example 3A—Overview of SERS Taster

The present SERS taster incorporates multiple molecular receptors grafted onto Ag nanocube surfaces to capture and confine target flavour molecules close to the SERS platform for enhanced signals. To begin, densely packed Ag nanocube arrays were prepared using the Langmuir—Blodgett technique (edge length=117±6 nm; particle density=32 nanocubes/$\mu m^2$; FIG. 10A, FIG. 10B). The combination of strong electromagnetic enhancement from the sharp edges of Ag nanocubes and inter-particle plasmonic coupling gives rise to a high SERS enhancement of $1.9\times10^6$ using 4-mercaptopyridine (MPY) as the receptor molecule. The SERS enhancement factor (EF) calculations are illustrated below.

To determine the SERS performance of the SERS platform, the Ag nanocube arrays were functionalized with a self-assembled monolayer of 4-mercaptopyridine (PY) receptor. By examining two well-defined peaks at 1098 $cm^{-1}$ (C—S stretch) and 1622 $cm^{-1}$ (aromatic C—C/C—N stretch), the EF was estimated as follows.

Peak assignments for 4-mercaptopyridine (MPY) are indicated in the table below.

| Peak wavenumber ($cm^{-1}$) | Vibrational mode |
|---|---|
| 1098 | C—S stretching |
| 1622 | C—C/C—N stretching of pyridine ring |

$$SERS\ EF = \frac{I_{SERS}}{I_{Raman}} \times \frac{N_{Raman}}{N_{SERS}}$$

In solution, the following was as calculated:

$$\text{Confocal laser volume, } V_{laser} = \pi \times \frac{x}{2} \times \frac{y}{2} \times z = 9.55 \times 10^{9}\ \text{nm}^3 = 9.55 \times 10^{-18}\ \text{m}^3$$

where x=910 nm, y=680 nm, z=4320 nm, are measured confocal resolution in x, y and z dimensions in solution.

$$N_{Raman} = V_{laser} \times C_{Receptor} \times \text{Avogadro's no.} = 9.55 \times 10^{-18}\ \text{m}^3 \times 10\ \text{mol/m}^3 \times 6.02 \times 10^{23}\ \text{molecules/mol} = 1.26 \times 10^{7}\ \text{molecules}$$

On substrate, the following was as calculated:

$$\text{Area of laser spot, } A_{laser} = \pi \times \frac{x}{2} \times \frac{y}{2} = 1.55 \times 10^{5}\ \text{nm}^2\ \text{(in air)}$$

where x=520 nm, y=380 nm are measured confocal resolution in x and y dimensions in air. Estimated particle density, $P_{cubes}$=32 nanocubes μm$^2$.

No. of Ag nanocubes within laser spot, $N_{cubes}=P_{cubes}\times A_{cubes}$=4.97 nanocubes Exposed surface area of Ag nanocubes, $S_{cubes}=N_{cubes}\times A_{cubes}$=4.97×(1172)=6.80×104 nm$^2$, where $A_{cubes}$ is the surface area of the nanocubes exposed to receptor molecules (top facet).

$N_{SERS}=S_{cubes}\times D_{receptors}$=6.80×10$^4$ nm$^2$×0.329 molecules nm$^2$=2.24×10$^4$ molecules, where $D_{receptors}$=3.29×10$^{13}$ molecules/cm$^2$.

For the 1098 $cm^{-1}$ peak:

$$SERS\ EF = \frac{14988.1}{4.5} \times \frac{1.26 \times 10^{7}}{2.24 \times 10^{4}} = 1.9 \times 10^{6}$$

For the 1622 $cm^{-1}$ peak:

$$SERS\ EF = \frac{11132.7}{4.2} \times \frac{1.26 \times 10^{7}}{2.24 \times 10^{4}} = 1.5 \times 10^{6}$$

Figure 11A:
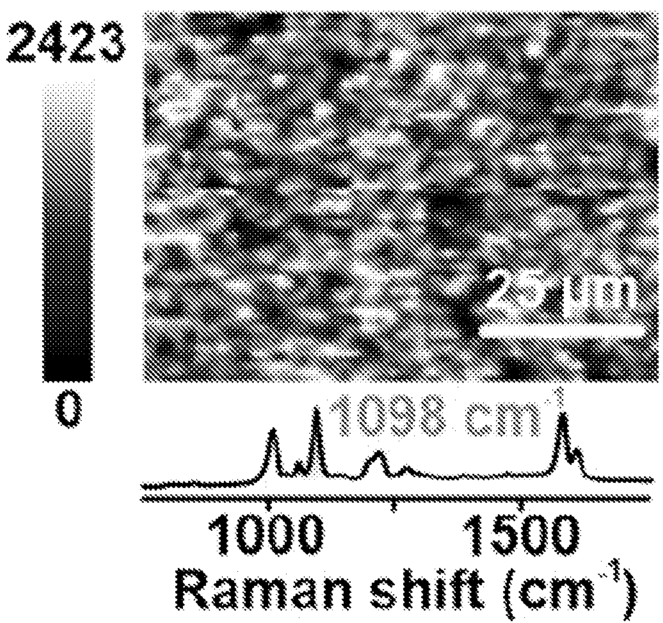
FIG. 11A shows hyperspectral SERS map generated using the well-defined C—S stretching mode at 1098 $cm^{-1}$.
Figure 11B:
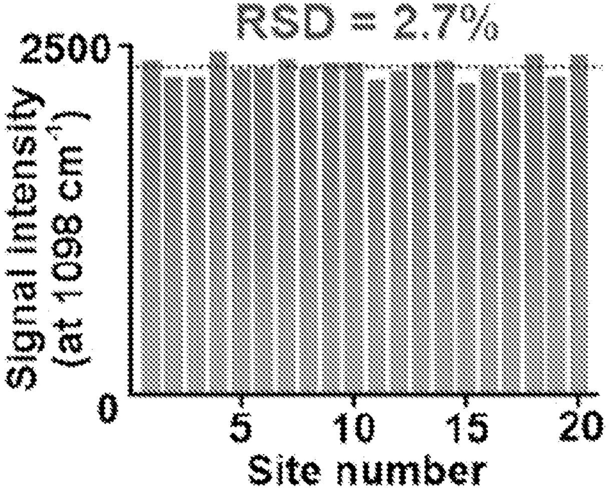
FIG. 11B shows the relative standard deviation of the 1098 $cm^{-1}$ peak across selected spectra, showing high signal homogeneity of the platform. The red dotted line indicates the mean signal intensity.
Figure 11C:
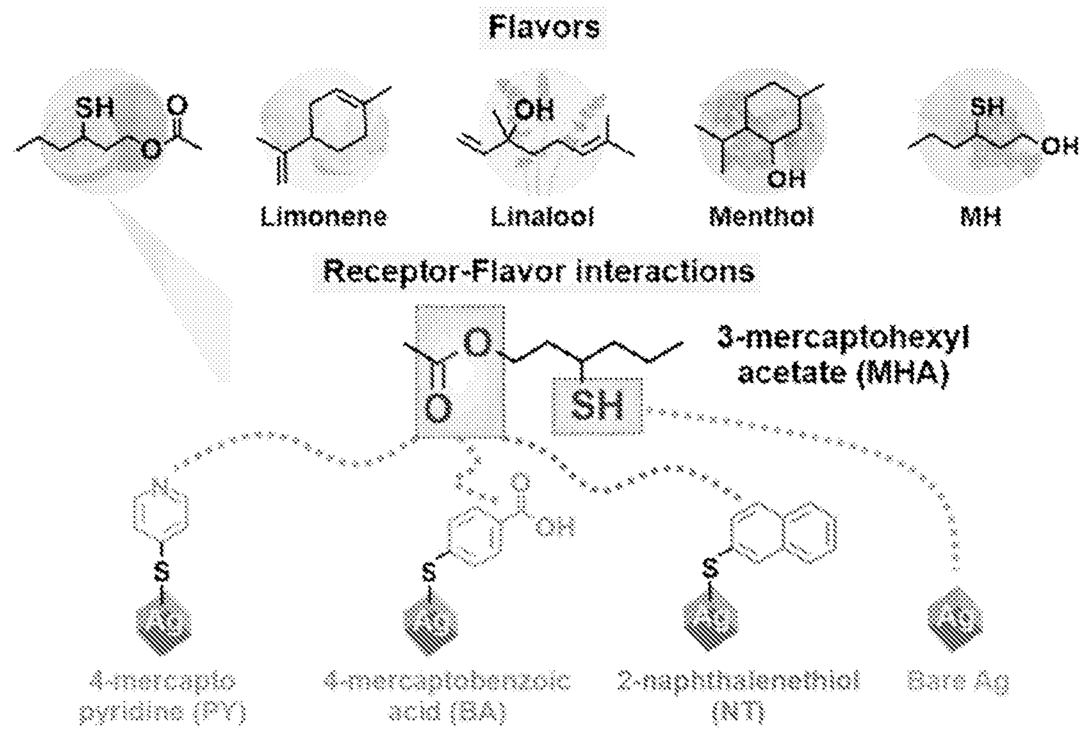
FIG. 11C is a scheme depicting MHA exposure to each receptor platform, forming receptor-flavor interactions.

The hyperspectral SERS map exhibits highly consistent signal intensities across an approximate area of 5 mm$^2$, with a relative standard deviation of 2.7%, indicating homogeneous enhancement capabilities (FIGS. 11A and 11B). The high SERS enhancement and low intensity variation indicate a robust and homogeneous SERS platform, which helps to successfully detect flavour molecules with weak Raman scattering cross sections. The key strategy of the SERS taster involves constructing a more complete spectroscopic profile of each flavour molecule. This is achieved by introducing multiple receptors to promote interactions with various active chemical functionalities on flavour molecules (FIG. 11C). In the SERS taster, 4-mercaptopyridine (MPY), 4-mercaptobenzoic acid (MBA), 2-naphthalenethiol (NT), and a bare Ag surface were selected as receptors. These receptors promote electrostatic interactions, hydrogen bonding, π-π interactions, van der Waals' forces, and Ag-thiolate bonding with flavour chemical functionalities such as alcohols and esters. These chemical interactions confine flavour molecules near the taster surface, producing characteristic receptor SERS spectral changes. Apart from bare Ag, these thiolated receptors allow the formation of self-assembled monolayers on Ag nanocubes. They also contain aromatic rings that exhibit larger Raman cross sections, thereby amplifying spectral changes upon interaction.

Example 3D: Results and Discussion of Example 3A—Profiling Passionfruit Flavour (MHA) Using SERS Taster Using MHA as a model wine flavour, it was demonstrated that the characteristic spectral variations observed with the SERS taster corroborates with density functional theory (DFT) simulations. MHA is a passion fruit flavour commonly found in wines such as cabernet sauvignon and merlot with dominant influence on the eventual wine flavour.

Figure 11D:
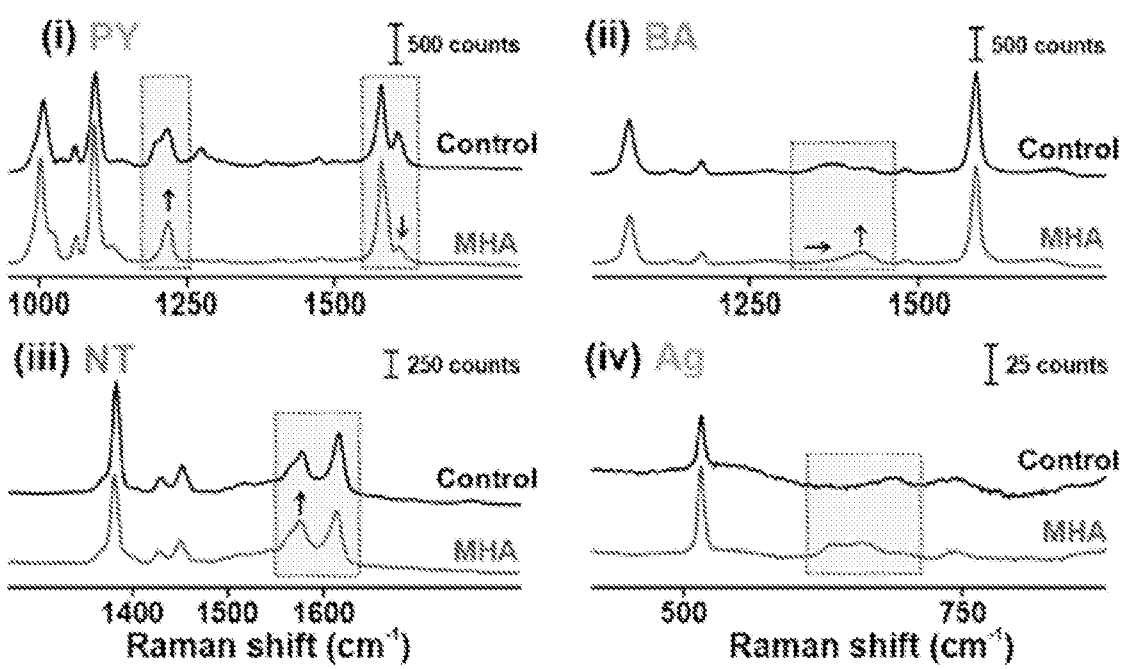
FIG. 11D shows experimental SERS spectra obtained for each receptor in the presence of MHA (red) and absence of MHA with an aqueous background (gray): (i) PY, (ii) BA, (iii) NT, and (iv) Ag.
Figure 11E:
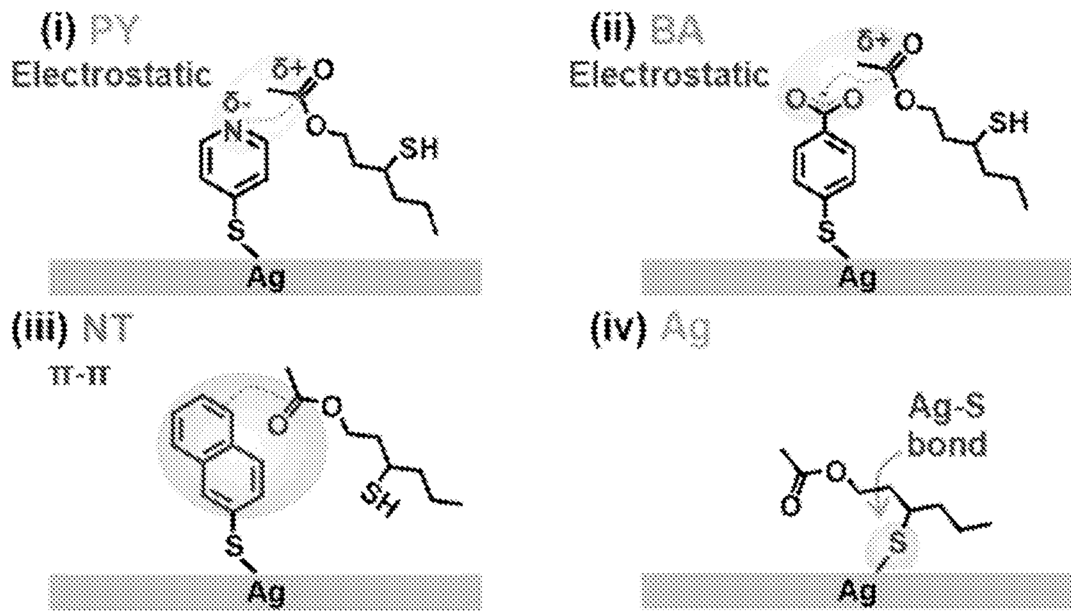
FIG. 11E shows a scheme depicting receptor-flavor interactions at the molecular level, including the type of interaction, and interacting sites for (i) PY, (ii) BA, (iii) NT, and (iv) Ag.

The experimental SERS spectra obtained using MPY, MBA, NT, and bare Ag before and after exposure to aqueous MHA (1×10$^{-3}$ M) was examined, assigning key vibrational modes using DFT. In control experiments without MHA, MPY exhibits characteristic twin in-plane C—H deformations at 1201, 1220 $cm^{-1}$ and twin C—C/C—N pyridine ring stretching ($v_{CC/CN}$) at 1583, 1611 $cm^{-1}$, respectively (FIG. 11D plot (i)), FIG. 12A). The presence of MHA intensifies the 1220 $cm^{-1}$ peak and weakens the 1611 $cm^{-1}$ peak. Formation of electrostatic interactions between the MPY nitrogen and MHA oxygen polarizes the aromatic C—H bonds in PY, lowering the energy requirement for C—H bond vibration and restricting $v_{CC/CN}$ within the aromatic ring (FIG. 11E plot (i)).

Figure 12:
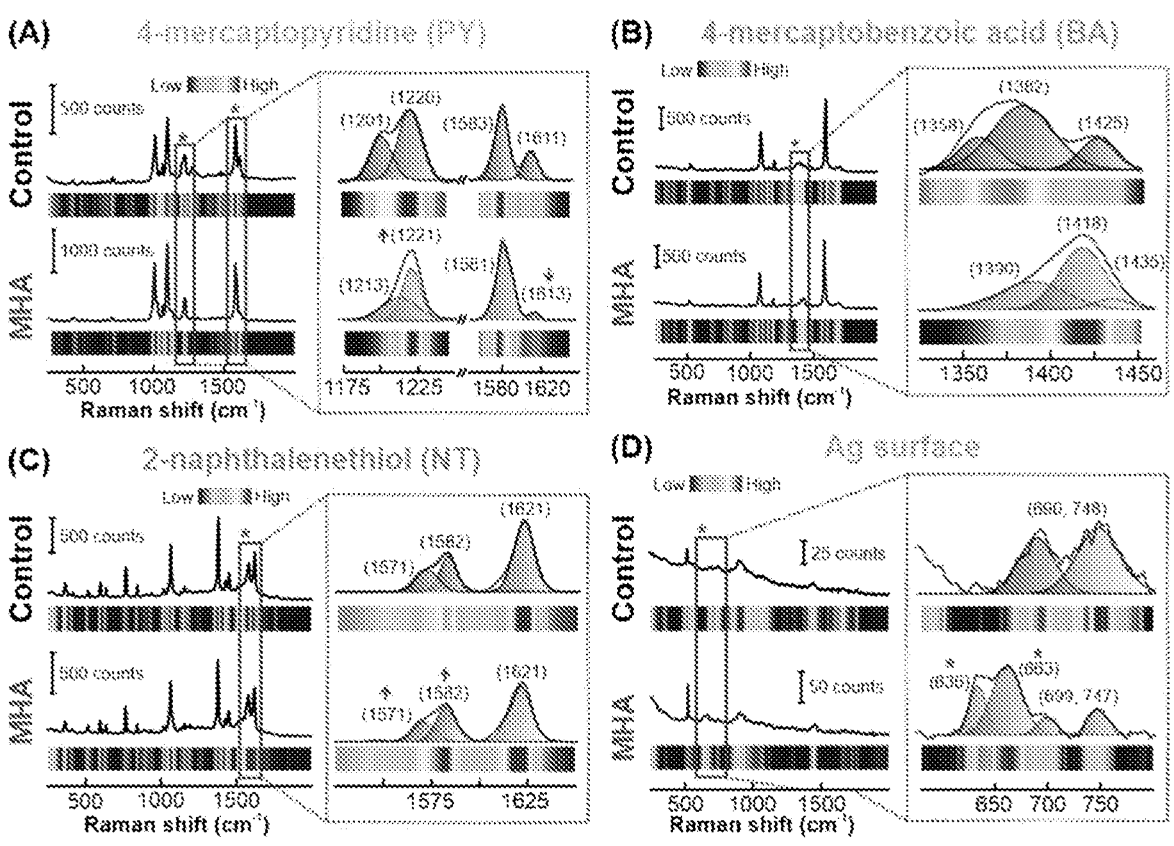
FIG. 12A shows in-depth analysis of spectral differences through peak deconvolution. The colour bar (denoted by different shades of grey) represents the relative peak intensity.
FIG. 12B shows in-depth analysis of spectral differences through peak deconvolution. The colour bar (denoted by different shades of grey) represents the relative peak intensity.
FIG. 12C shows in-depth analysis of spectral differences through peak deconvolution. The colour bar (denoted by different shades of grey) represents the relative peak intensity.
FIG. 12D shows in-depth analysis of spectral differences through peak deconvolution. The colour bar (denoted by different shades of grey) represents the relative peak intensity.

For MBA, a broad feature including peaks at 1358, 1382, and 1425 $cm^{-1}$ are indexed to symmetric carboxylate stretching ($v_{OCO-}$) (FIG. 11D plot (ii), FIG. 12B). Interactions with MHA intensify the 1382 $cm^{-1}$ peak with a concomitant blue-shift of the feature to 1390, 1418, and 1435 $cm^{-1}$, respectively. Electrostatic interactions between the carboxylate group and MHA's acetate carbon lowers electron density within the carboxylate moiety, reducing the energy required for $v_{OCO-}$ (FIG. 11E plot (ii)).

For NT, the twin peak at 1571 and 1582 $cm^{-1}$ and a peak at 1621 $cm^{-1}$ are indexed to asymmetric and symmetric C—C ring stretching ($v_{CC}$), respectively (FIG. 11D plot (iii), FIG. 12C). The presence of MHA increases the twin peak intensity relative to the 1621 $cm^{-1}$ peak (FIG. 13). π-π interactions between the naphthalene ring and MHA's carbonyl results in polarization of NT's aromatic C—C bonds, leading to a decrease in energy requirement for asymmetric $v_{CC}$ (FIG. 11E plot (iii)).

Finally, for the bare Ag surface, the addition of MHA results in an emergence of two additional peaks at 636 and 663 $cm^{-1}$, indexed to acetate wagging ($\pi_{OCO}$) and bending ($\delta_{HCO}$) modes of MHA (FIG. 11D plot (iv), FIG. 12D). The formation of a strong Ag-thiolate bond between Ag and the MHA thiol group brings MHA in proximity of the strong electromagnetic enhancement provided by the Ag nanocubes, leading to the observation of these signals (FIG. 11E plot (iv)). These receptor-flavour chemical interactions occurring at the molecular level and vibrational mode assignments are supported by DFT simulations (FIG. 14A to 14D).

Figure 14:
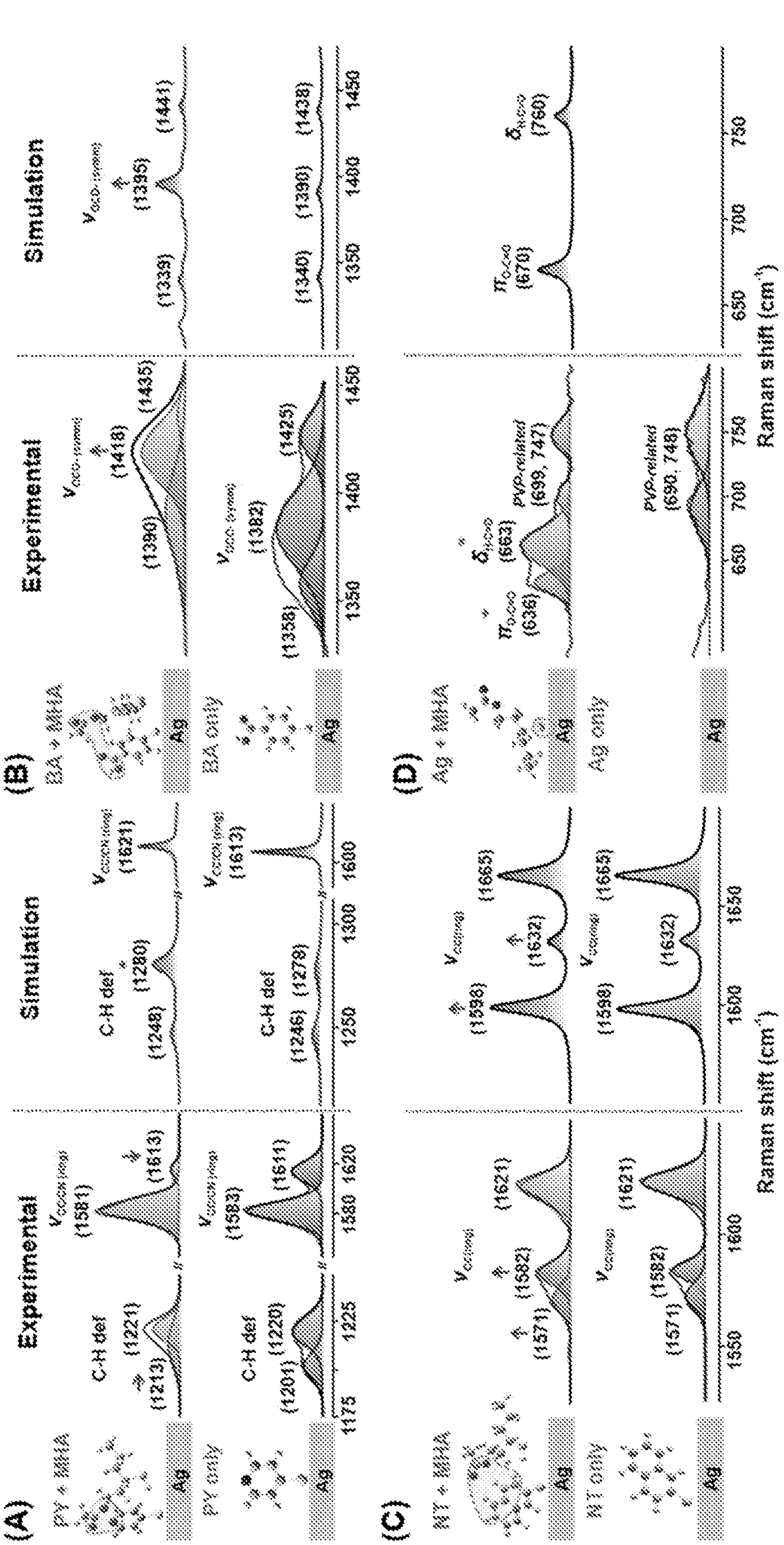
FIG. 14A shows experimental SERS spectra compared to density functional theory (DFT) simulations of the receptors in the presence and absence of MHA.
FIG. 14B shows experimental SERS spectra compared to density functional theory (DFT) simulations of the receptors in the presence and absence of MHA.
FIG. 14C shows experimental SERS spectra compared to density functional theory (DFT) simulations of the receptors in the presence and absence of MHA.
FIG. 14D shows experimental SERS spectra compared to density functional theory (DFT) simulations of the receptors in the presence and absence of MHA.

Discussion of the DFT simulated spectra in comparison to experimental results is as follows. For MPY, the twin peak at 1246 and 1278 $cm^{-1}$ can be indexed to in-plane C—H deformation while the peak at 1613 $cm^{-1}$ can be indexed to $V_{CC/CN}$ (FIG. 14A). In the presence of MHA, the 1278 $cm^{-1}$ peak intensifies relative to the 1246 $cm^{-1}$ peak while the 1613 $cm^{-1}$ peak weakens relative to both the 1246 and 1278 $cm^{-1}$ peaks.

For MBA, the peaks at 1340, 1390 and 1438 $cm^{-1}$ can be indexed to symmetric $v_{OCO-}$. Upon addition of MHA, the 1390 $cm^{-1}$ peak intensifies significantly relative to the 1340 and 1438 $cm^{-1}$ peaks (FIG. 14B). The 1340 and 1438 $cm^{-1}$ peaks do not show significant increase in intensity as the symmetric $v_{OCO}$ contribution from these two peaks are lesser.

For NT, the peaks at 1598, 1632 and 1665 $cm^{-1}$ can be indexed to $v_{CC}$ of the naphthalene ring (FIG. 14C). In the presence of MHA, the intensity of peaks at 1598 and 1632 $cm^{-1}$ increases relative to the 1665 $cm^{-1}$ peak. This quantifies the increase by comparing the peak ratios in both the experimental and simulated spectra, designating the peaks 1 to 3 by ascending wavenumbers (FIG. 13). In both cases, peaks 1 and 2 show an increase in intensity relative to peak 3. While all three peaks account for different $v_{CC}$, only peak 3 involves $v_{CC}$ that is symmetric about the $C_2$ axes of the naphthalene ring.

For the non-functionalized Ag surface, presence of MHA induces the emergence of SERS peaks at 670 and 760 $cm^{-1}$ that are indexed to the acetate wagging ($\pi_{OCO}$) and bending modes ($\delta_{OCO}$) of MHA (FIG. 14D).

Collectively, the DFT simulated SERS spectra show strong corroboration to the experimental SERS spectra. The computationally optimized molecular structures provide critical insight to the receptor-flavour chemical interactions occurring at the molecular level.

Importantly, the ability of individual receptors to interact with different functional groups of a single flavour molecule that collectively contribute to the reconstruction of its chemical profile is demonstrated.

Example 3E: Results and Discussion of Example 3A—Constructing SERS Super-Profiles for Flavour Identification Leveraging the useful vibrational information conferred by each receptor, a SERS super-profile was strategically constructed for MHA through horizontal combination (FIG. 15A row (iv)). The resulting super-profile includes all spectral variations arising from receptor-MHA interactions with MPY, MBA, NT, and Ag. In contrast, using a single receptor limits interactions to a single flavour functional group (FIG. 15A row (i)). Hence, distinct SERS spectral changes with a single receptor merely describes a partial profile of the flavour chemical structure. SERS super-profiles were subsequently constructed for four additional flavour molecules (menthol, linalool, limonene, and MH) present in a large variety of red, white, and rosé wines, where they contribute to specific sensory attributes that constitute the overall wine flavour.

Figure 15B:
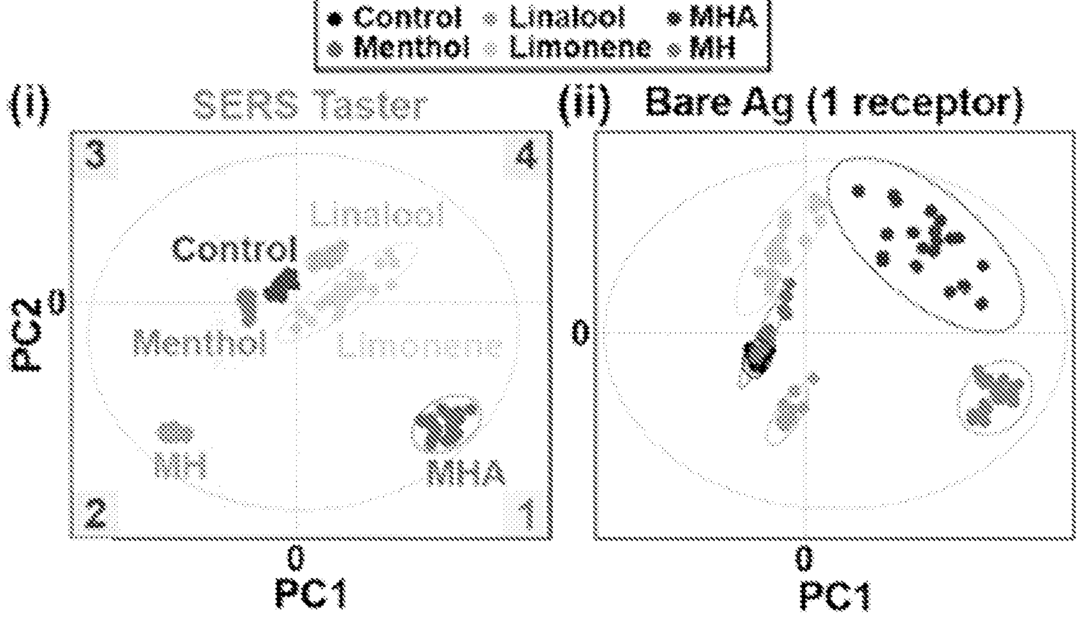
FIG. 15B shows PCA score plots of the first two principal components showing the relative flavor data cluster separation using the SERS taster.
Figures 15E, 16:
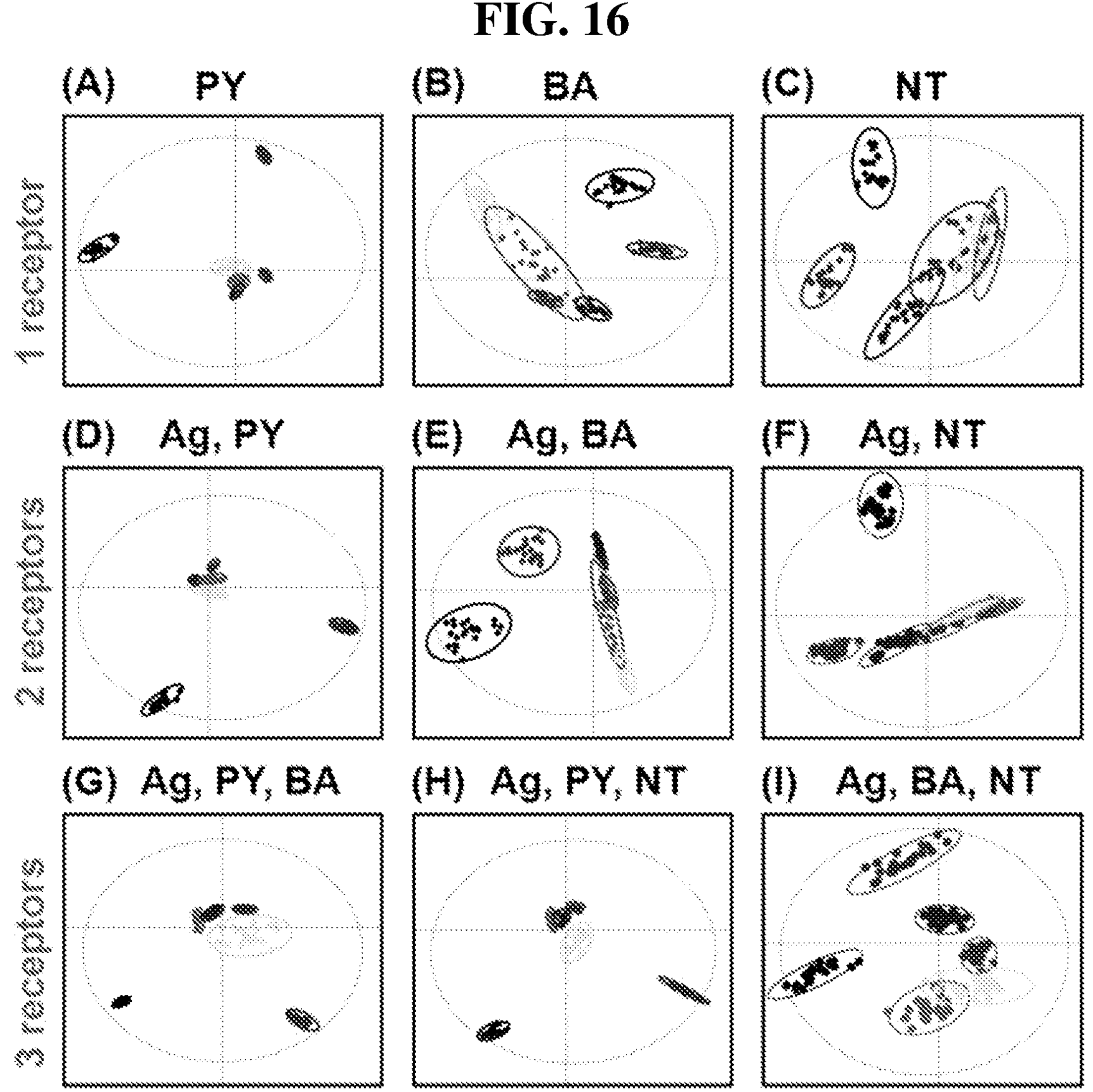
FIG. 15E shows confusion matrices obtained using SVM-DA for (i) the SERS taster and (ii) a bare Ag surface.

To illustrate the superiority of the SERS super-profiles in identifying and classifying wine flavours, PCA was employed to distinguish between super-profiles of different flavour molecules. PCA offers unparalleled accuracy in scrutinizing the full spectral information including the control. Each data cluster is encapsulated within a 95% confidence ellipse. The clear separation between these confidence ellipses indicates that the SERS taster effectively differentiates all five flavour molecules. In contrast, as the number of receptors decreases, the relative ability to separate these data clusters diminishes (FIG. 16). The use of a single receptor (Ag) results in overlaps between the confidence ellipses of menthol, limonene, and the control (FIG. 15B plot (ii)). This overlap shows that the single receptor model cannot differentiate flavours because of insufficient SERS spectral variances. In addition, the larger confidence ellipses signify high intra-cluster variance. This comparison highlights the advantage of the SERS super-profiles over single receptor-flavour interactions for distinct flavour identification.

To further elucidate the underlying chemical meaning behind the PCA scores, the PCA bi-plot (FIGS. 15C and 15D) was scrutinized. The bi-plot features key receptor spectral regions that drive the separation of each flavour data cluster to different quadrants of the PCA score plot. The bi-plot was first deconstructed into four quadrants (FIG. 15C) and these spectral regions were related to specific receptor-flavour interactions causing the variation. First, PCA classifies MHA in the first quadrant of the score plot (FIG. 15B plot (i), lower right). In this quadrant, electrostatic interactions of MHA with MPY result in significant spectral variations in MPY's pyridine ring breathing mode at the 1000-1008 $cm^{-1}$ region (FIG. 15C quadrant 1, FIG. 18 row (i)). The proximity of MHA with the bare Ag surface also amplifies MHA's $\pi_{OCO}$ and $\delta_{OCO}$ at the 630-670 $cm^{-1}$ region.

Figure 17:
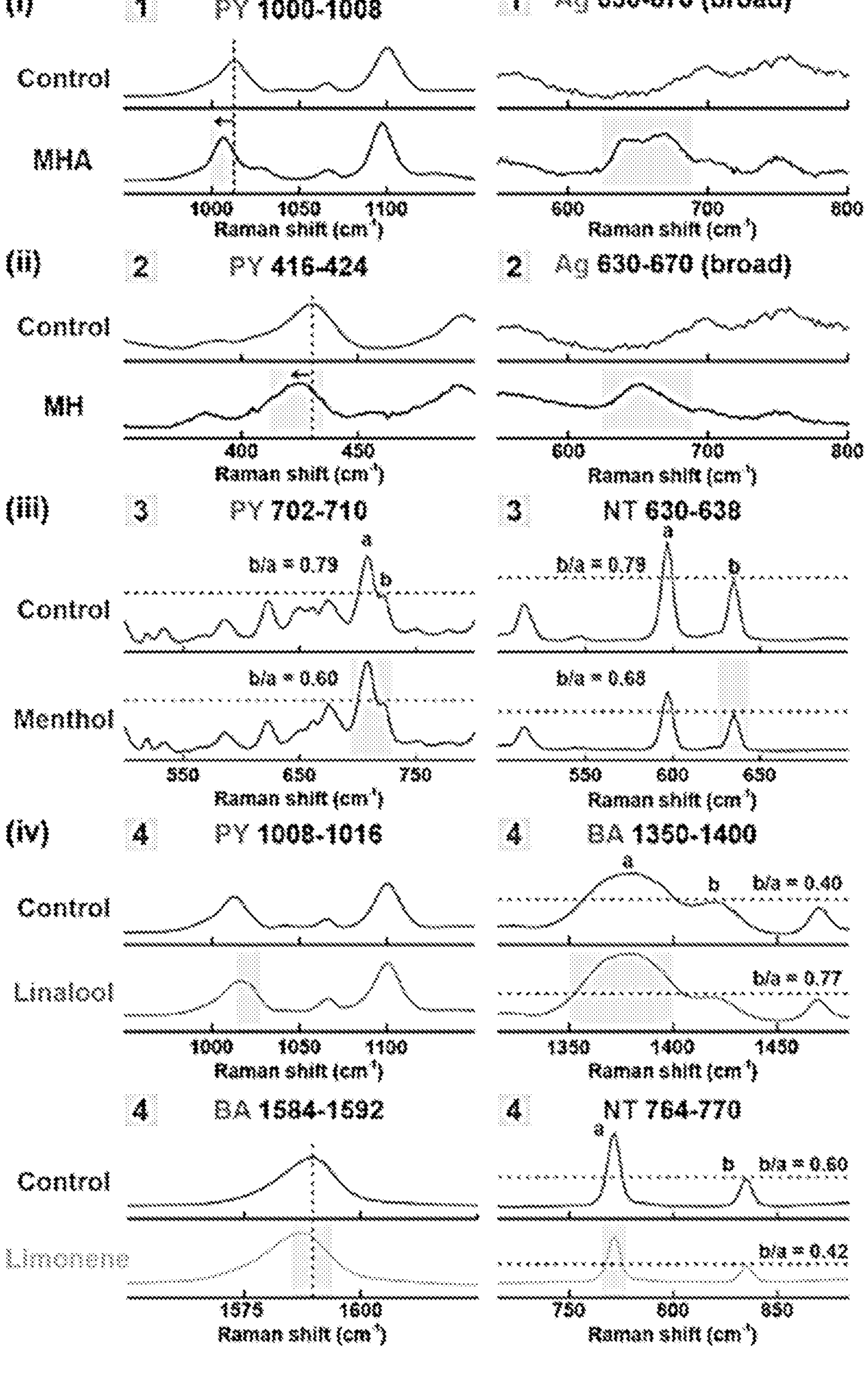
FIG. 17 shows experimental SERS spectra for key spectral regions highlighting critical spectral variations in the PCA bi-plot. The spectra are arranged according to the flavor separated within the labelled quadrants—(i) quadrant 1 (ii) quadrant 2 (iii) quadrant 3 (iv) quadrant 4—respectively.

MH lies in the second quadrant of the score plot, at the opposing end of the PC 1 axis compared to MHA (FIG. 15B plot (i), lower left). Two reasons contribute to this classification. First, hydrogen bonding between MH and MPY influences MPY's concurrent pyridine ring stretch and C—S stretching ($v_{CS}$) mode at the 416-424 cm−1 region (FIG. 15C quadrant 2, FIG. 17 row (i)). Next, Ag-thiolate interactions between MH and Ag magnifies MH's $v_{CS}$ in the 630-670 $cm^{-1}$ region. In this region, the Ag-MH spectrum is different from the Ag-MHA spectrum because of inherent differences in molecular structure and interactivity with the Ag surface. These unique peak shape changes promote the classification of MH in the opposing quadrant of MHA.

Menthol positions itself between the second and third quadrant of the score plot (FIG. 15B plot (i), upper left). Importantly, hydrogen bonding between menthol and MPY causes peak ratio change for MPY's out-of-plane C—H deformation mode at the 702-710 cm—1 region (FIG. 15C quadrant 3, FIG. 17 row (iii)). In addition, van der Waals' interactions between menthol and NT renders a subtle decrease in peak intensity of the C—H bending ($\delta_{HCH}$) mode of NT in the 630-638 $cm^{-1}$ region. These variations differentiate menthol from the flavourless control.

Finally, linalool and limonene emerge as separate clusters within the fourth quadrant of the score plot (FIG. 15B plot (i), upper right). For linalool, hydrogen bonding between linalool and MPY increases the peak intensity of MPY's in-plane C—H deformation mode in the 1008-1016 $cm^{-1}$ region (FIG. 15C quadrant 4, FIG. 17 row (i)). Concurrently, hydrogen bonding between linalool and MBA results in a distinct peak ratio change involving MBA's $v_{OCO-}$ in the 1350-1400 $cm^{-1}$ region. For limonene, π-π interactions between limonene and MBA result in a red shift of BA's $v_{CC}$ at the 1584-1592 $cm^{-1}$ region (FIG. 15C quadrant 4, FIG. 17 row (iv)). π-π interactions between limonene and NT also result in a decrease in peak intensity of NT's ring breathing mode in the 764-770 $cm^{-1}$ region. Collectively, these differences drive the cluster separation of linalool and limonene from the flavourless control. Notably, it has been demonstrated that the SERS taster distinguishes primary (MH), secondary (menthol), and tertiary (linalool) alcohols by classifying them in different quadrants with distinct SERS spectral changes. This successful classification is driven by the information-rich SERS super-profiles, which amalgamate and magnify all spectral variance arising from individual receptor-flavour interactions.

By examining the PCA bi-plot, the knowledge of chemical interactions occurring at the molecular level was relied on to unravel how the chemometric model classifies different flavours as distinct clusters. This bridges the gap between SERS spectral inputs and chemometric model outputs, ensuring the model is built upon valid receptor-flavour spectral variation and not meaningless background variations.

To quantitatively evaluate the predictive capability of the SERS taster, confusion matrices using SVM-DA was constructed (FIG. 15E). SVM-DA is a supervised machine learning model that allows us to predict the identity of flavour molecules by examining their SERS super-profiles with a high degree of flexibility and robustness. In the first model, super-profiles used in the PCA earlier were introduced. In the second model, SERS spectra derived by exposing flavour molecules only to bare Ag were introduced. Other models that can be utilized with the SERS chip in machine learning may include, without being limited to, random forest/tree-based models such as XGBoost, neural networks, and t-SNE. These models can be used with the SERS chip to identify the one or more analytes in various applications (gas profiling, liquid profiling, detecting a subject with a disease, etc.).

Figures 18, 19:
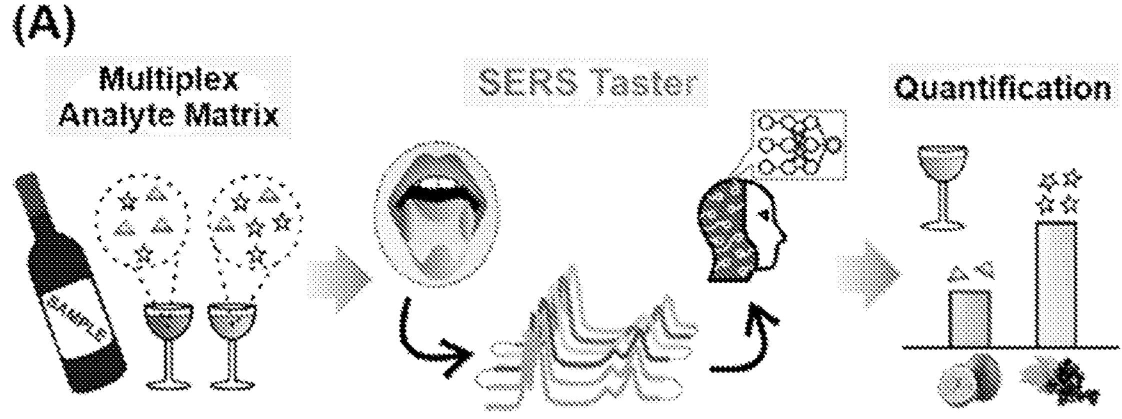
FIG. 18 is a summary table for the overall classification accuracy, rate of false positives and false negatives. False negative refers to a data point that belongs to a flavor molecule but is incorrectly classified as a control data. False positive (for a single flavor molecule) refers to a data point belonging to another flavor molecule incorrectly classified as itself.
Figure 19:
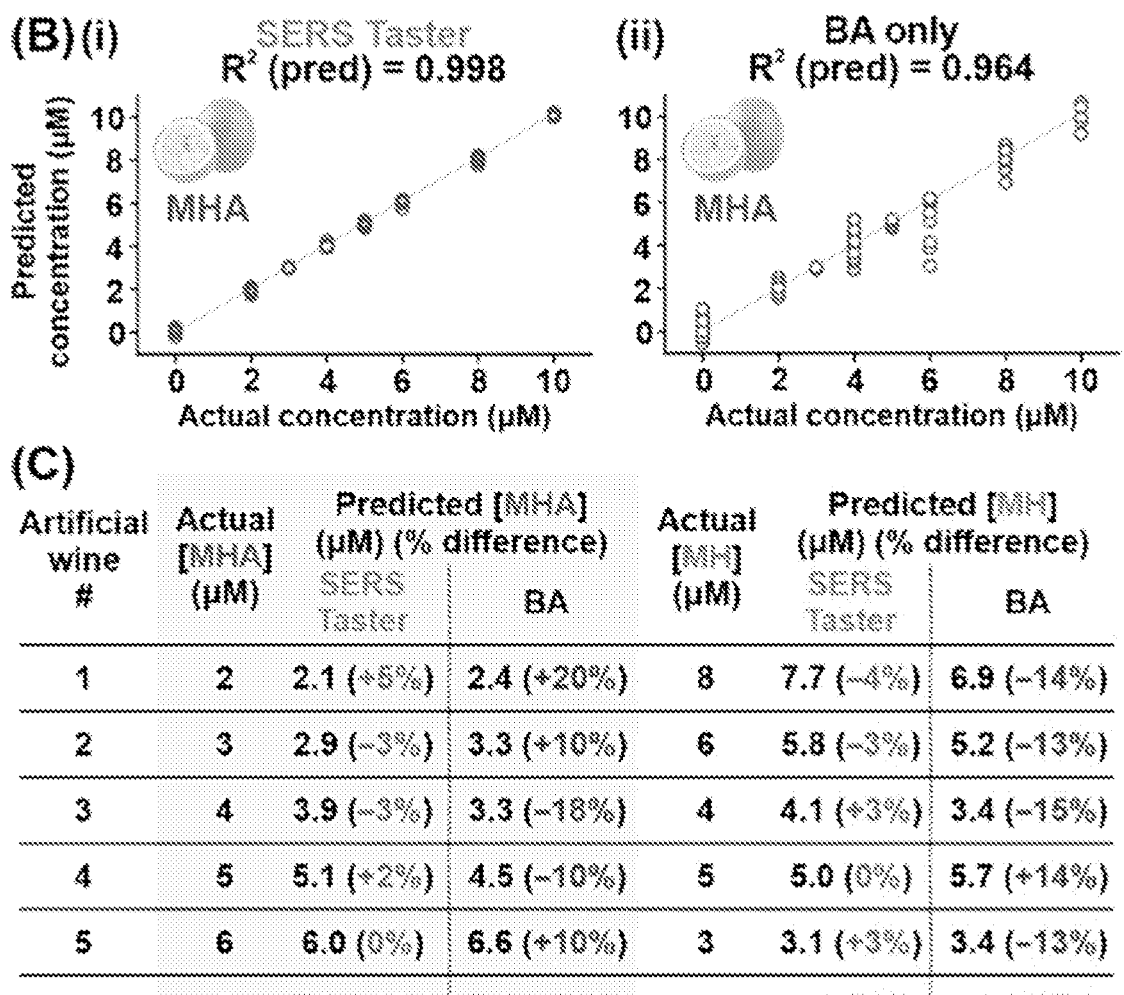
FIG. 19A is a scheme depicting multiplex quantification of flavors using the SERS taster.
FIG. 19B shows calibration curves obtained using SVM-R for MHA using (i) the SERS taster and (ii) a single receptor platform (BA).
FIG. 19C shows a comparison of quantification accuracy between the SERS taster and a single receptor (BA) platform using six artificial wine samples with varying concentrations of MHA and MH. For each sample, the predicted flavor concentration, and its deviation from the actual concentration (% difference) is shown.

From the resulting confusion matrices, it was affirmed that the SERS taster achieves 100% accuracy in the classification of all flavours, including the control (FIG. 15E plot (i), FIG. 18). Conversely, bare Ag shows a wide accuracy range of 33.3-87.5% (FIG. 15E plot (ii), FIG. 18). Notably, the Ag surface classifies thiolated flavour molecules (MHA, MH) with higher accuracy because of the formation of the strong Ag-thiolate bond bringing them close to the plasmonic surface for SERS enhancement. In contrast, non-thiolated flavour molecules (menthol, linalool, limonene) do not interact well with the Ag surface and are prone to misclassification. These prediction outcomes demonstrate that the SERS taster effectively predicts the identity of an unknown flavour molecule with high accuracy through analysis of its SERS super-profile.

Example 3F: Results and Discussion of Example 3A—Multiplex Flavor Quantification To enhance the applicability of the SERS taster in actual flavour analysis, ability of the SERS taster to simultaneously quantify two flavour molecules in an artificial wine matrix was demonstrated (FIG. 19A to 19C). MHA and MH were selected, as both are sulfur-containing molecules that exhibit intense fruity notes concurrently found in many wine types, such as sauvignon blanc and cabernet sauvignon.

Figure 20:
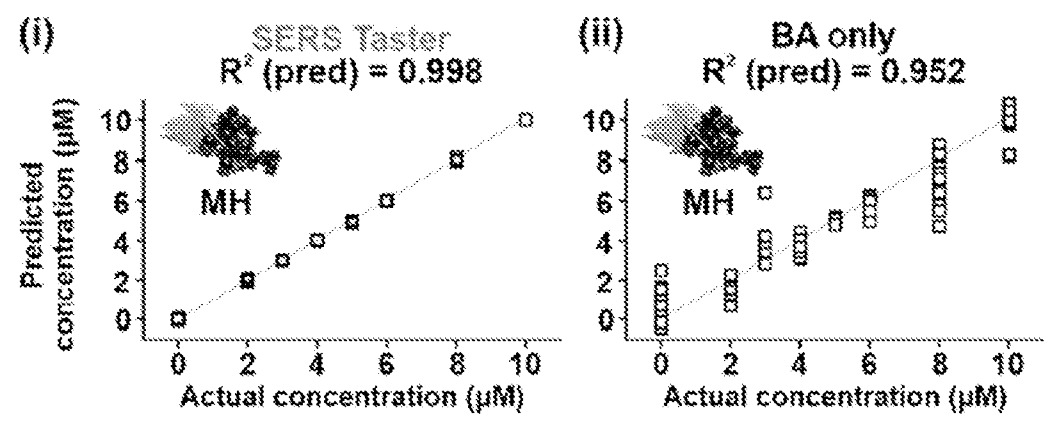
FIG. 20 shows calibration curves for MH obtained using SVM-R.

Using SVM regression (SVM-R), calibration curves were constructed to compare the quantification accuracy of the SERS taster and a single receptor platform (BA). The flavour concentrations range from 2-10 μM (approximately 0.2-2 ppm, FIG. 3). For the SERS taster, the calibration curves show near ideal linearity with high prediction coefficients of 0.998 for both MHA and MH (FIG. 19B plot (i), FIG. 20 plot (i)). In contrast, using only MBA yields prediction coefficients of 0.964 and 0.952 for MHA and MH respectively (FIG. 19B plot (ii), FIG. 20 plot (ii)).

Next, six artificial wine samples were prepared with varying concentrations of both flavours and expose them to both platforms. Using the calibration curves, the SERS taster showed excellent quantification accuracies for both flavours, ranging from to 100% (FIG. 19C). Notably, the difference between actual and predicted flavour concentrations in the artificial wine samples was 0-0.3 μM. In contrast, lower quantification accuracies of 80-90% using only MBA was observed. The large range also indicates higher inconsistencies arising from the model's inability to pick up minute spectral changes. The predicted concentrations also exhibit larger deviations of 0.3-1.1 μM. Crucially, it was showed that the SERS taster exhibits enhanced sensitivity to fluctuations in flavour concentrations as opposed to conventional single receptor platforms.

Figures 21, 22:
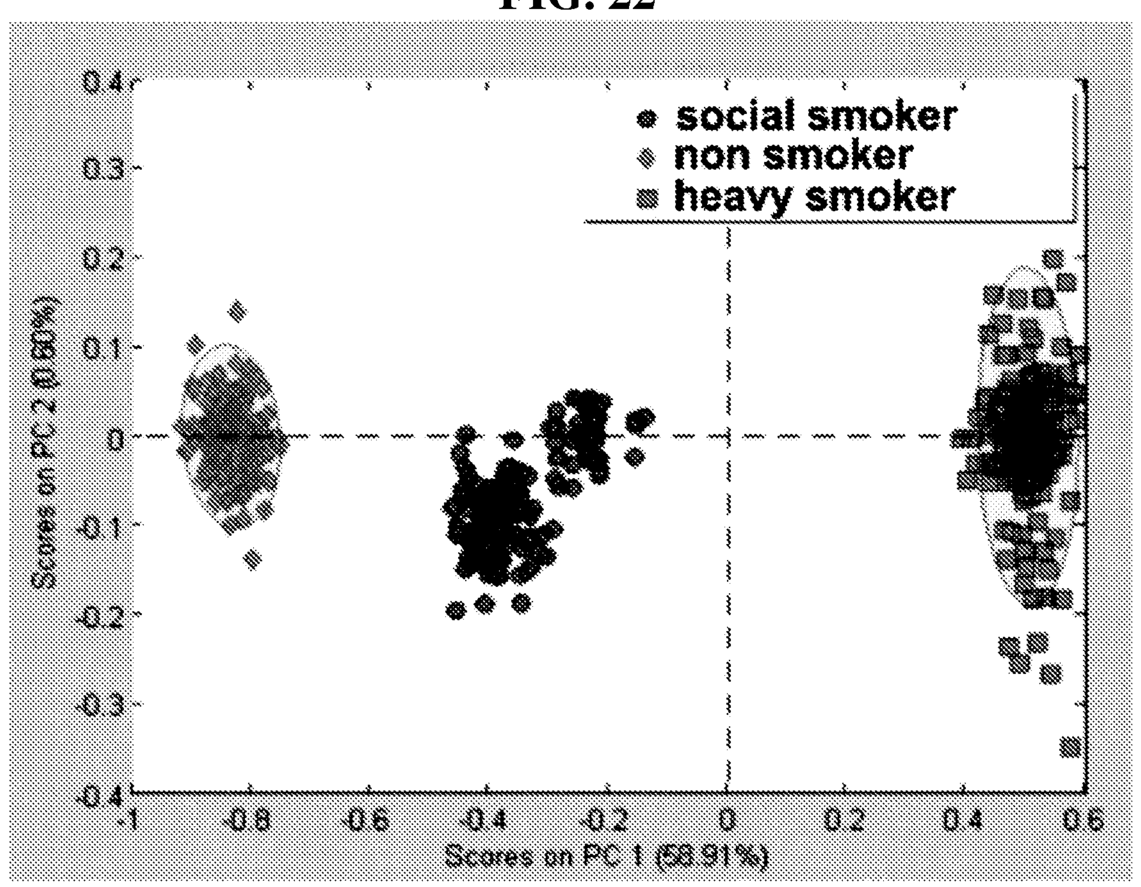
FIG. 21 is a table showing the molecular structure of potential interferences in an artificial wine matrix, with their possible interactions with receptor molecules.
FIG. 22 is a PCA model showing the classification of smoker, social smoker and non-smoke breaths, and the individual biomarkers.

Collectively, these results reiterate the capability of the multi-receptor SERS taster to precisely quantify flavours in samples, even in the presence of potential matrix interferences. Notably, glycerol and tartaric acid do not skew the predictive outcomes, even though they have multiple hydroxyl groups that can potentially interfere with the chemical interactions that occur between a receptor-flavour pair (FIG. 21). Overall, the promising potential of the SERS taster in conducting multiplex quantification of flavour molecules, in addition to providing qualitative results, has been demonstrated.

Example 3G: Summary of Discussion of Examples 3A to 3F

In conclusion, a machine-learning-driven multi-receptor SERS taster that enables multiplex profiling of five wine flavours with 100% accuracy at the parts-per-million level has been demonstrated. Notably, the two-pronged approach utilizes multiple molecular receptors to generate rich SERS spectral variances and machine learning-driven chemometric models to extract these variances with unparalleled precision. First, the use of four targeted receptors effectively captures a more complete spectroscopic profile of each flavour molecule through unique receptor-flavour chemical interactions that induce distinct spectral variations. By strategically combining all receptor SERS spectra, compound SERS super-profiles encompassing these interactions that collectively aid in the reconstruction of a flavour chemical profile were constructed. Next, using PCA and SVM-DA, the importance of the multi-receptor approach where only the SERS taster achieves unambiguous identification of all five flavours is exemplified. The complex PCA scores were elucidated by examining the PCA bi-plot, establishing a robust correlation of the chemometric output with the knowledge of chemical interactions occurring at the molecular level. Importantly, ability of the SERS taster in distinguishing primary, secondary, and tertiary alcohols was demonstrated. The promising potential of the SERS taster in achieving multiplex quantification of wine flavours within an artificial wine matrix with potential interferences was highlighted, showcasing high quantification accuracies up to 100%. A comparison of these results with platforms using only a single receptor clearly illustrates the superiority of the SERS taster in identifying and quantifying wine flavours. The combination of SERS with machine-learning-driven chemometrics thus renders a rapid and highly sensitive analytical approach for multiplex detection of small molecules. The SERS taster tackles current limitations faced in chemical analysis of flavour compounds, providing a potential paradigm shift for food-related studies and a myriad of applications extending beyond.

Example 4: Present SERS Chip and Method for Classification of Breath Profiles from Smokers/Non-Smokers Human breath containing volatile organic compounds offers rich information on the chemistries occurring within the body, which are often linked to the health. For instance, small chemical molecules, such as formaldehyde, butane, isoprene, pentane and >20 BVOCs have been used as recognition biomarkers for many diseases including tuberculosis, and colorectal and lung cancers. Subjects belonging to certain disease group may display a different BVOCs composition in their breath. Without analysing the content of individual gas in the breath, multiple SERS probes were used to record the collective interactions from all the gases. Using the super-fingerprinting method from 3 SERS chips with 3 different probes, in combination with above described machine-learning strategy, to analyse gas mixtures from human breath, the platform is able to classify of the test subjects into non-smoker, smoker and even social smoker based on their breath profiles (FIG. 23).

Example 5A: Present SERS Chip and Method for Diagnosis of COVID-19 Using Super-Fingerprint SERS Breathalyzer The present example demonstrates the SERS chip and method of the present disclosure for use in non-invasive and point-of-care SERS-based breathalyzer for mass screening of coronavirus disease 2019 (COVID-19) in a short period of time (e.g. under 5 mins).

Population-wide surveillance of COVID-19 requires tests to be quick and accurate to minimize community transmissions. The detection of breath volatile organic compounds presents a promising option for COVID-19 surveillance but is currently limited by bulky instrumentation and inflexible analysis protocol. Herein, a hand-held surface-enhanced Raman scattering-based breathalyzer was developed to identify COVID-19 infected individuals in under 5 mins, achieving >95% sensitivity and specificity across 501 participants regardless of their displayed symptoms. The SERS-based breathalyzer harnesses key variations in vibrational fingerprints arising from interactions between breath metabolites and multiple molecular receptors to establish a robust partial least squares discriminant analysis model for high throughput classifications. Spectral regions influencing classification show strong corroboration with reported potential COVID-19 breath biomarkers, both through experiment and in silico. The present strategy strives to spur the development of next-generation, non-invasive human breath diagnostic toolkits tailored for mass screening purposes.

As an initial study, the super-fingerprinting method was carried out with 5 probes (MPY, BTP, ATP, MTBH, MBA) and machine-learning classification method (partial least squares discriminant analysis—PLS-DA), which was successfully carried out for prediction of coronavirus disease (e.g. COVID-19) in infected subjects. Upon building a model with breath samples from 20 PCR-tested COVID-19 positive and 20 PCR-tested COVID-19 negative subjects, it was demonstrated that the present SERS chip and method can accurately predict 5/5 COVID-19 positive (specificity=100%) and 4/5 COVID-19 negative subjects (sensitivity=80%) (FIGS. 23 and 24)—affirmed with PCR results. The false-positive is predicted as a borderline case (FIG. 23), and this can be attributed to the bad respiratory symptoms of the subject which produces a similar BVOCs to COVID-19 positive subjects. Such ambiguity can be solved as the machine-learning model is further trained with more patient data.

From the results, it can be inferred that the SERS chips are able to capture the BVOCs and their combined SERS fingerprints offer rich information to identify the BVOC profiles specific to COVID-19 patients. This small-cohort demonstration showcases the immense potential of machine-learning driven analysis based on SERS super-fingerprinting technique to perform rapid breath-based diagnosis—which is highly advantageous as a non-invasive screening method in the current pandemic context.

Example 5B: Introductory Discussion of Example 5A

One of the key strategies to curb COVID-19 transmissions may be to develop rapid and accurate mass screening tools to identify infectious yet asymptomatic individuals for isolation. These screening tools complement polymerase chain reaction (PCR) tests as they play a critical role in filtering out most healthy individuals from the general population and avoid overloading of PCR testing facilities which can otherwise retard pandemic response. An emerging solution is the non-invasive breath test, where breath volatile organic compounds (BVOCs) function as COVID-19 specific biomarkers. Notably, recent studies have shown that the coronavirus-induced immune responses and metabolic changes can alter concentrations of BVOCs such as aldehydes, ketones, and alcohols, enabling the identification of COVID-positive individuals regardless of their symptoms.

Gas chromatography coupled mass spectrometry (GC-MS) may be a traditional standard used for concurrent separation and identification of key compounds in the human breath. However, these instruments are typically costly and bulky, making it less ideal to upscale and integrate as a mass screening tool for on-site deployment. In addition, the need to exhale directly into the instrument creates a bottleneck in analysis time where multiple breath collections and subsequent analyses cannot be done in parallel. Hence, there is an urgent need to develop a simple, portable, and inexpensive mass screening tool that can analyze COVID-19 related BVOCs.

Figure 25:
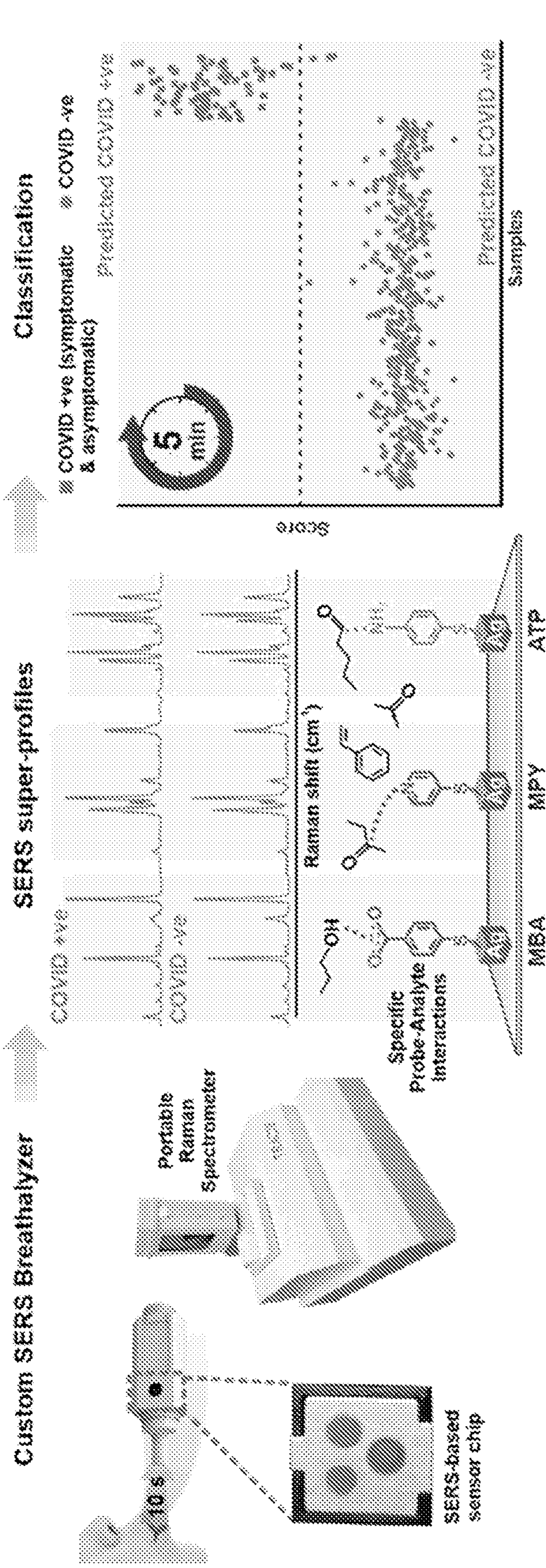
FIG. 25 shows an overview of s SERS-based strategy to identify COVID-positive individuals using their breath volatile organic compounds (BVOCs).
Figure 26:
FIG. 26 shows digital images illustrating the participant recruitment workflow, which includes briefing the participant, breath sample collection, breathalyzer disinfection, SERS measurement and obtaining the prediction outcome.

Herein, a SERS-based breathalyzer to distinguish BVOC profiles of COVID-positive individuals was developed, achieving >95% sensitivity and specificity across 501 participants from clinical case-control studies conducted in Singapore (FIG. 25). The breathalyzer encompasses a SERS sensor that is nested within a custom made, hand-held, single-use breath chamber to facilitate the safe collection of breath samples, with measurements performed onsite using a portable Raman spectrometer. Participants are simply required to blow continuously into the breath chamber for 10 s and can receive their test result within 5 mins, since there is no need for any sample pretreatment (FIGS. 25 and 26). Upon exposure to breath, molecular receptors with various active chemical functionalities on the SERS sensor form complementary receptor-BVOC interactions such as ion-dipole interactions or hydrogen bonding with the diverse range of BVOCs present. These interactions elicit specific spectral variations, which can be serially combined as a SERS "super-profile" to accentuate minute differences in BVOC compositions between COVID-positive and COVID-negative individuals. Scrutiny of their respective SERS super-profiles reveal key spectral regions that are consistent with experimental and in silico spectral changes observed when the sensor is exposed to pure VOC vapors of potential COVID-19 biomarkers. Crucially, it is herein demonstrated that these spectral differences are independent of displayed COVID-19 symptoms and other potential confounding factors such as participants' age, gender, smoking habits, and time since their last meal. For high throughput spectral analyses, a classification model was constructed using partial least-squares discriminant analysis (PLSDA) that can be seamlessly incorporated with most Raman measurement software to provide instantaneous results. In addition, the present workflow features decoupled sample collection and measurement to allow maximum deployment flexibility in practice. Overall, the present example showcases the promising potential of utilizing SERS-based sensors in the analysis and differentiation of breath metabolites among infected and noninfected people to achieve rapid and noninvasive disease detection. It signifies a decisive step forward in the practical application of SERS for next-generation, point-of-care diagnostic toolkits of other respiratory and non-respiratory diseases, not limited to COVID-19.

Example 5C: Materials and Methods for Example 5A—Chemical

Silver nitrate, 1,5-pentanediol (PD), poly-(vinylpyrrolidone) (PVP; Mw ~55,000), 4-mercatopyridine (MPY), 4-mercaptobenzoic acid (MBA), 4-aminothiophenol (ATP), ethanal, heptanal, and octanal were purchased from Sigma-Aldrich. Copper(II) chloride was purchased from Alfa Aesar. Ethanol (ACS, ISO, Reag. Ph Eur) was obtained from Merck. Methanol (≥99.8%, Reag. Ph Eur, gradient grade for HPLC) was obtained from VWR Chemicals. Milli-Q water (>18.0 MΩcm) was purified with a Sartorius Arium 611 UV ultrapure water system. All reagents were used without further purification.

Example 5D: Materials and Methods for Example 5A—Synthesis and Purification of Silver Nanocubes Ag nanocubes were synthesized via the polyol method. Briefly, 0.50 g of silver nitrate and 0.86 μg of copper(II) chloride were dissolved in PD in a scintillation vial. Separately, 0.25 g of PVP was dissolved in PD. Using a temperature-controlled silicone oil bath, 20 mL of PD was heated for 10 min. The two precursor solutions were then injected into the hot reaction flask at different rates: 500 μL of silver nitrate solution every minute and 250 μL of PVP solution every 30 s. This addition was stopped once the solution turned ochre. The Ag nanocubes were purified via several rounds of centrifugation and subsequently stored in ethanol. Scanning electron microscopic (SEM) imaging was carried out using JEOL-JSM-7600F electron microscope at an accelerating voltage of 5 kV.

Example 5E: Materials and Methods for Example 5A—Thiophenol Functionalization of Ag Nanocubes Functionalization of Ag nanocube surfaces was performed through individual ligand exchange reactions. A 50 μL aliquot of 10 mM thiophenol solution (MPY, MBA, ATP) was separately added to 1 mL of Ag nanocubes, and the mixture was allowed to stir overnight. The functionalized Ag nanocubes were then purified via centrifugation and dispersed in 1 mL ethanol.

Example 5F: Materials and Methods for Example 5A—Sensor Chip and Breathalyzer Fabrication An automated liquid dispensing system (Y&D 7300N Smart Robot; Y&D Technology Co. Ltd.) was used to dispense the functionalized Ag nanocubes. The functionalized Ag nanocubes were first dispersed in aqueous solutions, carefully loaded into the dispensing system, and then precisely dispensed onto an aluminum plate. The dispensed Ag nanocubes were then allowed to dry under controlled conditions (24° C. with relative humidity of 40%). SERS signals of the dried droplets were measured to ensure sensor chip signal reproducibility and consistency before they were individually assembled into a breathalyzer. The assembled breathalyzer and an accompanying cap were vacuum-sealed prior to its usage during clinical trials.

Example 5G: Materials and Methods for Example 5A—Breath Sample Collection

Participants aged between 18 and 99 were recruited at multiple study sites for clinical trials, including the National Center for Infectious Diseases and Changi International Airport in Singapore. All recruitment protocols were covered according to a protocol. Study participants were adequately briefed regarding the research goals and aims, and their consent was sought prior to sample collection (FIG. 26). All breathalyzers were de-identified from the study participants with the use of specialized subject identification numbers. During sample collection, a sealed vacuum package containing the breathalyzer was handed to the participant. The participant was directed to blow gently and continuously into the breathalyzer mouthpiece for 10 s before affixing the safety cap. The breathalyzer was then disinfected with 70% ethanol before SERS measurement. Each breathalyzer is fitted with medical grade HEPA filter at the outlet to isolate any pathogens present within the breath chamber and prevent escape into the external environment. Each participant exhaled into a breathalyzer that is assigned to them.

Example 5H: Materials and Methods for Example 5A—SERS Measurement of Breath Samples SERS measurements were conducted using the portable Metrohm Raman spectrometer (Mira DS) with an excitation wavelength of 785 nm, laser power of 50 mW and an acquisition time of 0.05 s. Each SERS spectrum is the average of 5 raster scans (2.5 mm raster scan size), to collect SERS spectra over a large interrogation area. The spectral window of 400-1800 $cm^{-1}$ was used for data analyses. Spectral preprocessing includes baseline correction using the adaptive iteratively reweighted penalized least-squares (airPLS) algorithm and min-max normalization. The processed SERS spectra from all three receptors were then concatenated into a SERS superprofile representing the breath profile of a participant. A total of 501 superprofiles were collected—1 from each participant.

Example 5I: Materials and Methods for Example 5A—Model Building

The partial least-squares discriminant analysis (PLSDA) models were constructed using the Python-based scikit-learn package. In one iteration, data were first split into a 80% train and 20% test set using random state=1. The train set was optimized and cross-validated using a k-fold cross-validation algorithm, with k=10. Root-mean-squared errors resulting from the train set classification and averaged cross-validation classifications were derived and used to determine the number of latent variables selected for a PLSDA model. The test set was then used to assess the outcome of the classification model through calculating its sensitivity and specificity. This process was then repeated for an additional 49 iterations using random states 2-50 to derive the averaged sensitivity and specificity of the SERS sensor.

Example 5J: Materials and Methods for Example 5A—SERS Measurement of Pure Analyte Vapor The SERS sensor is incubated separately with 200 μL of a target analyte at 35° C. in an enclosed 20 mL vial. SERS detection was performed after 6 hrs of incubation using the same spectrometer system, measurement parameters and data preprocessing. Equilibrium vapor concentrations are calculated as shown below.

Each SERS sensor is incubated separately with 200 μL of target analyte at in an enclosed 20 mL vial. SERS detection was performed after 6 hrs of incubation to allow vaporization to reach an equilibrium state. The saturated vapor concentration (g $cm^{-3}$) is calculated using the ideal gas equation:

$$PV=nRT$$

where P is the saturated vapor pressure at 35° C. (Pa), V is volume of enclosed vial ($cm^3$), R is the universal gas constant (8.314×106 $cm^3$ Pa $K^{-1}$ $mol^{-1}$) and T is the incubation temperature (K). Rearranging the equation, $$\text{Saturated concentration } (\text{g cm}^{-3}) = \frac{V}{RT} \times MW$$

The saturated concentration can be converted from g $cm^{-3}$ to ppm by the following relationship, saturated concentration (ppm)=Saturated concentration (g $cm^{-3}$)×$10^6$.

For detection at low VOC concentrations, a vapor generator (Vertical Owlstone Vapor Generator, Owlstone Medical) is used to supply a constant, controlled VOC flow at ppb levels.

Example 5K: Materials and Methods for Example 5A—Participant Statistics

Participant statistics for categorical variables such as age and gender were presented as number (%). Continuous variables such as intensity ratios were presented as mean±standard deviation. The statistical significance of each variable between blanks and COVID-positive, blanks and COVID-negative, and COVID-positive and COVID-negative were assessed with the Mann-Whitney rank sum test. All tests were two-tailed with $p<0.05$ as the significance threshold. Calculations were performed using the OriginPro 9.0 software. The statistical significance of each confounding factor on the classification was assessed using either a t test (for continuous variable) or a $\chi^2$ test (categorical variable). The choice of statistical test depends on several parameters including the variable type (categorical/continuous) and distributions (normal/non-normal).

Example 5L: Materials and Methods for Example 5A—Density Functional Theory (DFT) Simulations The calculations on the interaction of the Ag surface with various target analyte molecules were carried out using the unrestricted B3LYP exchange-correlation functional, as implemented in the Gaussian 09 computational chemistry package. The 6-31G(d,p) basis set was used for all atoms except Ag, for which the LANL2DZ basis set was employed. The Ag surface was modeled using a reported triangle consisting of 6 Ag atoms. After geometry optimization of the triangular Ag cluster, each target analyte molecule was then placed near the Ag cluster (<2 Å) and the entire system was reoptimized before obtaining the simulated spectra.

Example 5M: Materials and Methods for Example 5A—Characterization

Scanning electron microscope (SEM) imaging was performed using JEOL-JSM-7600F microscope. UV-vis spectra were measured using SHIMADZU UV-3600 UV-vis-NIR spectrophotometer.

Figure 28:
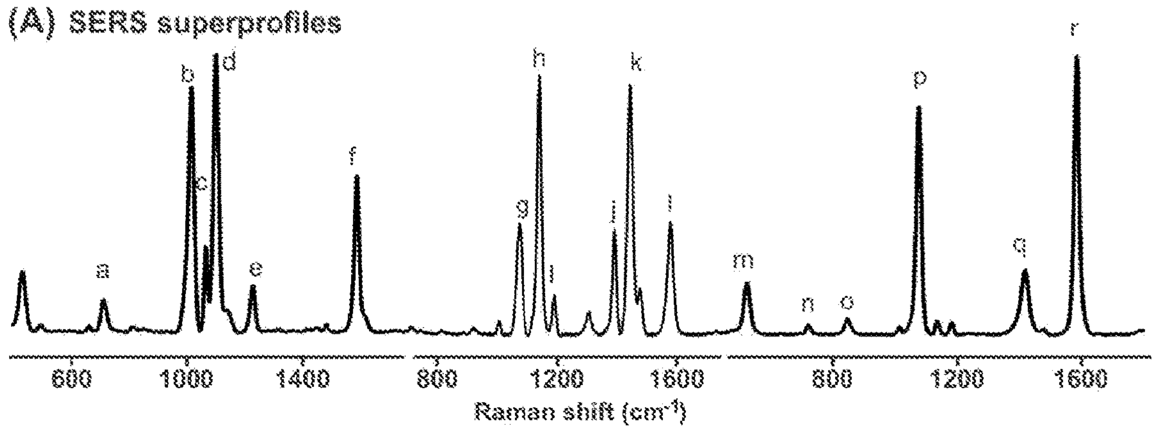
FIG. 28A shows a representative SERS super-profile.
FIG. 28B shows vibrational mode assignments for key fingerprints in the super-profile.
Figure 29:
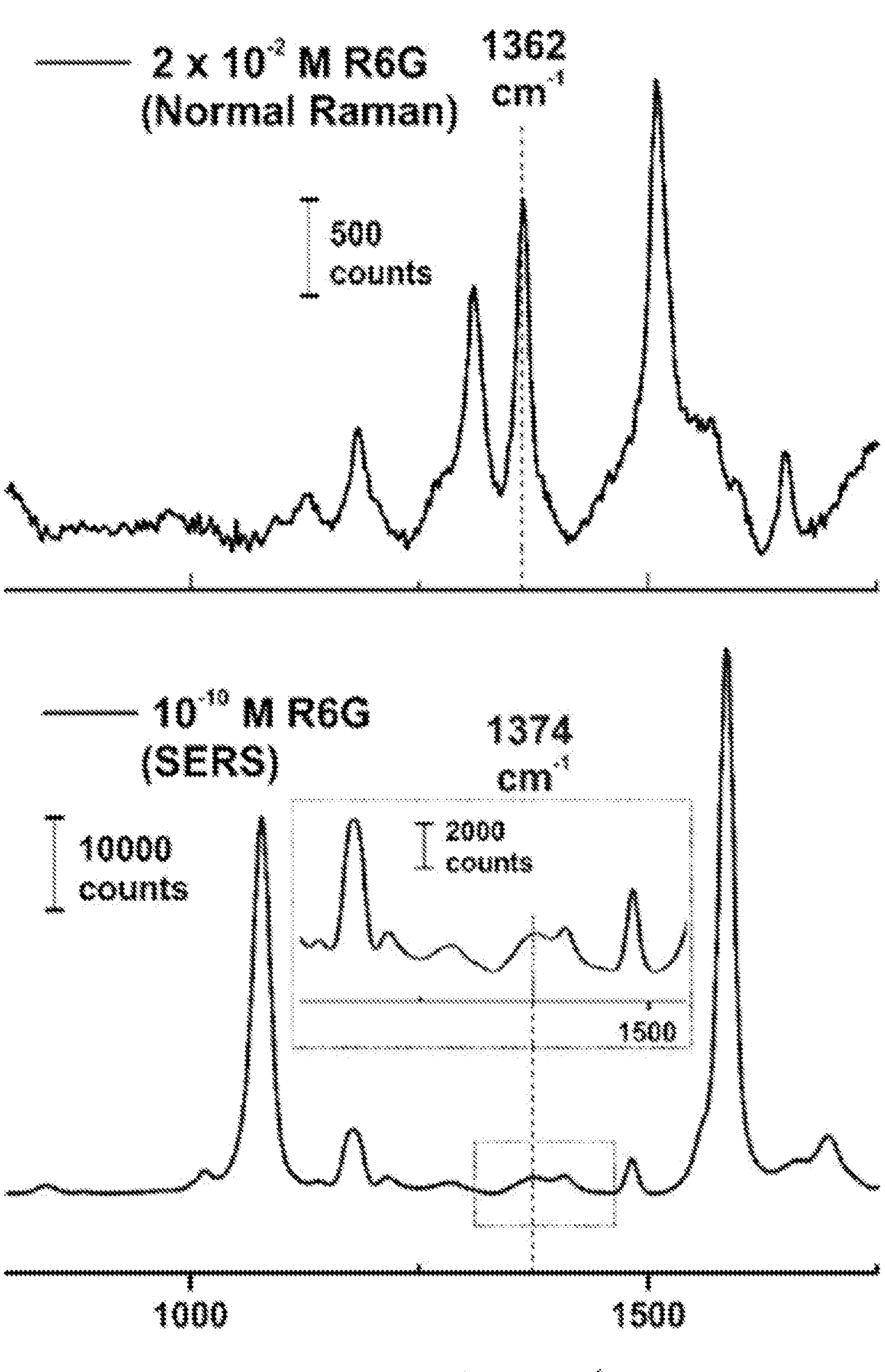
FIG. 29 demonstrates for the determination of the analytical enhancement factor (AEF) of the SERS sensor using Rhodamine 6G. The normal Raman spectrum of Rhodamine 6G ($2\times10^{-2}$ M) drop casted on an aluminum plate is shown in black while the SERS spectra of Rhodamine 6G ($10^{-10}$ M) drop casted on the SERS sensor is in bottom plot.
Figure 30:
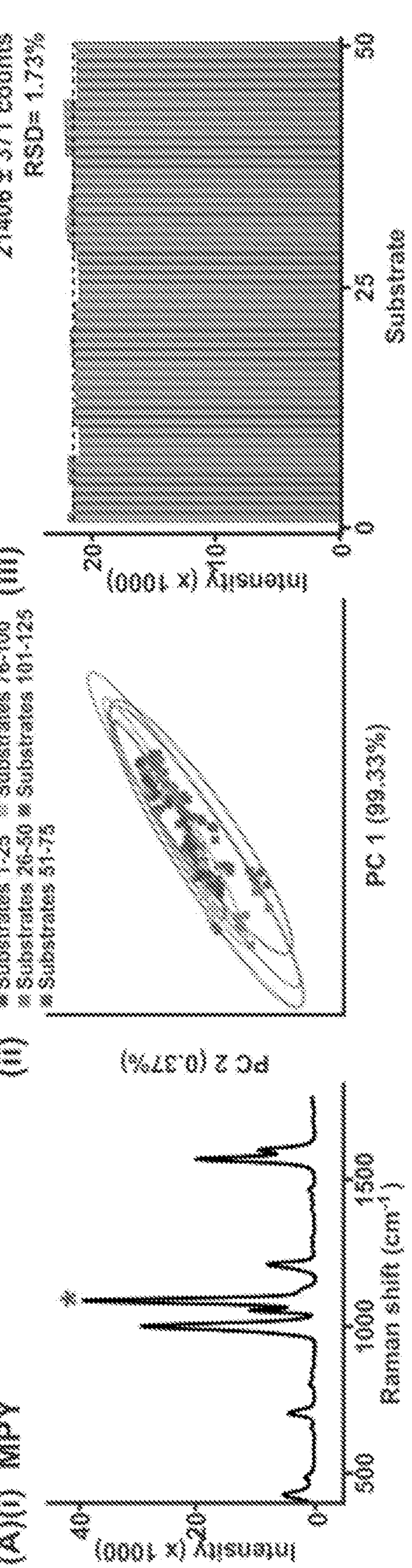
FIG. 30A shows (based on MPY) the (i) representative SERS spectra of each molecular receptor, (ii) PCA score plot (PC 1 vs. PC 2) of SERS spectra measured from 125 different sensor chips (the overlap of the spectral clusters indicates that the SERS signals are consistent and reproducible across different chips, with low chip-to-chip variation), and (iii) comparison of the SERS intensity homogeneity for 50 different substrates. The respective peak of each probe used to determine the SERS intensity homogeneity is indicated by an '*'.
FIG. 30B shows (based on ATP) the (i) representative SERS spectra of each molecular receptor, (ii) PCA score plot (PC 1 vs. PC 2) of SERS spectra measured from 125 different sensor chips (the overlap of the spectral clusters indicates that the SERS signals are consistent and reproducible across different chips, with low chip-to-chip variation), and (iii) comparison of the SERS intensity homogeneity for 50 different substrates. The respective peak of each probe used to determine the SERS intensity homogeneity is indicated by an '*'.
FIG. 30C shows (based on MBA) the (i) representative SERS spectra of each molecular receptor, (ii) PCA score plot (PC 1 vs. PC 2) of SERS spectra measured from 125 different sensor chips (the overlap of the spectral clusters indicates that the SERS signals are consistent and reproducible across different chips, with low chip-to-chip variation), and (iii) comparison of the SERS intensity homogeneity for 50 different substrates. The respective peak of each probe used to determine the SERS intensity homogeneity is indicated by an '*'.
Figure 30:
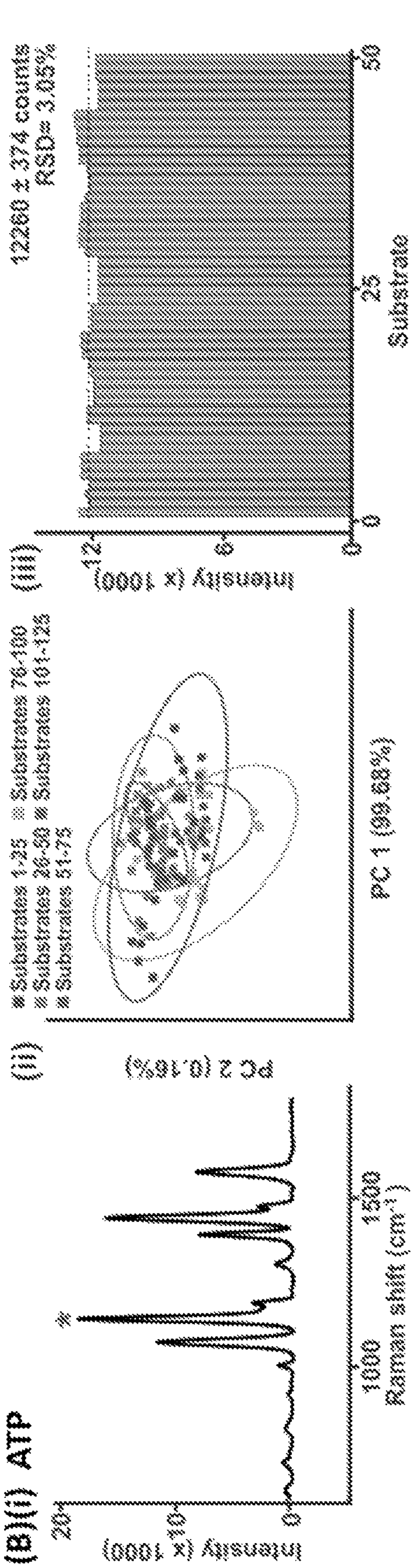
Figure 30:
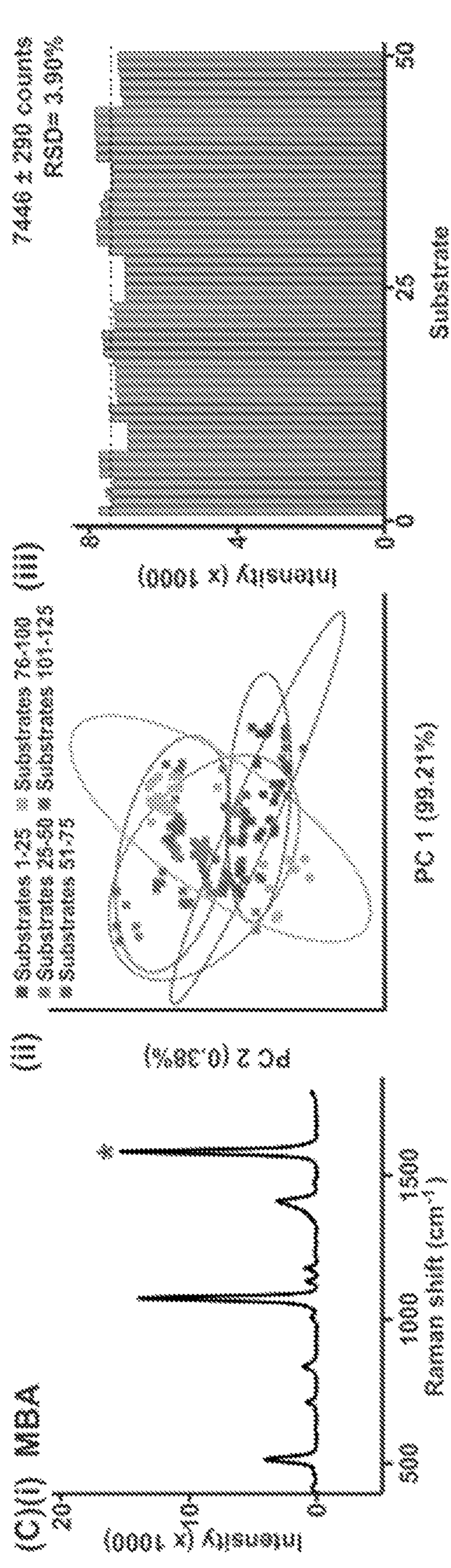
Figure 32:
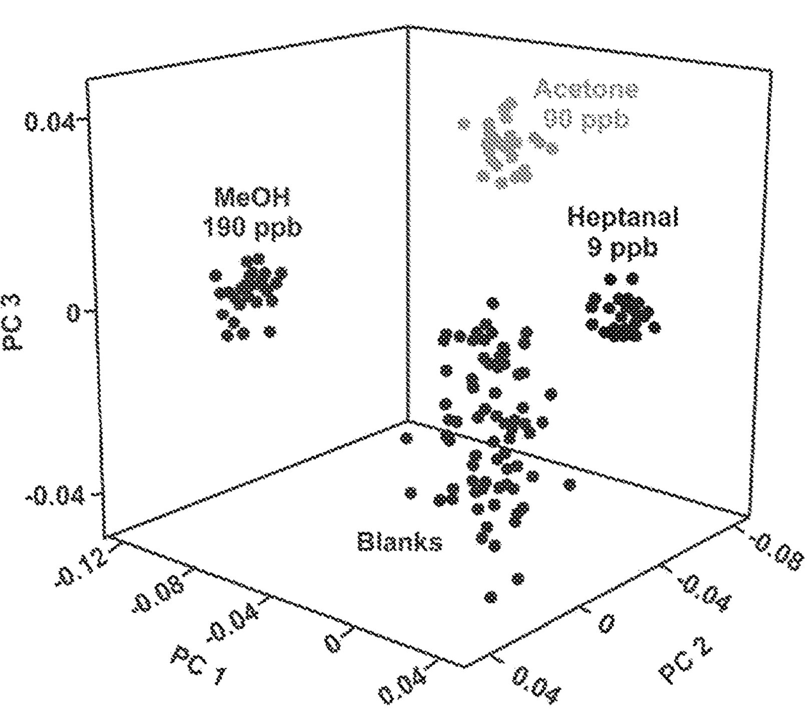
FIG. 32 shows a 3D principal component analysis (PCA) score plot (PC 1 vs. PC 2 vs. PC 3) of SERS spectra collected in the absence (blanks) and presence of representative VOC vapors at their respective physiologically relevant levels. Each marker represents a SERS super-profile concatenated from MBA, MPY and ATP SERS spectra. The target VOCs investigated are heptanal (to represent aldehydes), acetone (to represent ketones) and methanol (to represent alcohols). Prior to PCA clustering, the SERS super-profiles are preprocessed using baseline, normalization and general least squares weighting (GLS) to remove clutter variance. The distinct and well-separated spectral clusters illustrate that methanol, acetone and heptanal each induces distinct and unique spectral changes to the receptors' SERS spectra, even at low ppb levels. This demonstrates the sensitivity of the SERS sensor to various VOCs.

Example 5N: Results and Discussion for Example 5A—Fabrication and Characterization of Present Multireceptor SERS Sensor To effectively discriminate COVID-positive breath profiles, a multiple surface receptors for the SERS sensor was developed to induce a myriad of complementary intermolecular interactions with the BVOCs present as the breath sample flows through the breath chamber. The sensor includes arrays of Ag nanocubes (edge length=120±5 nm, FIG. 27) with 4-mercaptobenzoate (MBA), 4-mercaptopyridine (MPY), and 4-aminothiophenol (ATP) functionalized onto the nanocube surface as molecular receptors (FIG. 25; FIG. 28). The multireceptor SERS sensor is strategically developed to possess specific functional groups that can chemically interact with BVOCs via hydrogen bonding, ion-dipole interactions and π-π interactions to bring the gaseous analytes close to the plasmonic surface. The SERS sensor exhibits a high SERS analytical enhancement factor of $1.4\times10^{10}$, owing to strong electromagnetic enhancement from the sharp Ag nanocube edges and intense inter-nanocube plasmonic coupling, which enables ultrasensitive analyte detection (FIG. 29; example 5O below). In addition, an excellent signal reproducibility of <4% signal standard deviation ensures that the SERS measurements are consistent and reproducible (FIG. 30A to 30C). The sensors were subsequently assembled into single-use breath chambers customized with infection control safety features that ensure high safety and hygiene standards (refer to examples 5C to 5M). It is herein demonstrated the robustness of the sensor, which displays similar signal consistencies after sensor assembly and over time, with no signs of nanocube oxidation even after breath exposure (FIG. 31). It is also affirmed that the SERS sensor can detect various VOCs at their physiologically relevant levels, as evidenced from the well-separated spectral clusters in the principal component analysis (PCA) score plot (FIG. 32).

Example 5O: Results and Discussion for Example 5A—Calculation of Analytical Enhancement Factor (AEF)

Using Rhodamine 6G (FIG. 29), $$I_{SERS} = 1269 \pm 44 \text{ counts}$$

$$I_{Raman} = 1784 \pm 19 \text{ counts}$$

The AEF of the SERS sensor is given as:

$$\begin{aligned} AEF &= \frac{I_{SERS}}{I_{Raman}} \times \frac{C_{Raman}}{C_{SERS}} \\ &= \frac{1269}{17.84} \times \frac{2\times10^{-2}}{10^{10}} \\ &= 1.4\times10^{10} \end{aligned}$$

where $C_{SERS}$ and $C_{Raman}$ are the concentrations of Rhodamine 6G measured using the SERS sensor ($10^{-10}$ M) and normal Raman ($2\times10^{-2}$ M) respectively, while $I_{SERS}$ and $I_{Raman}$ are the signal intensities recorded using SERS and normal Raman at their respective concentrations per unit time.

Figure 33:
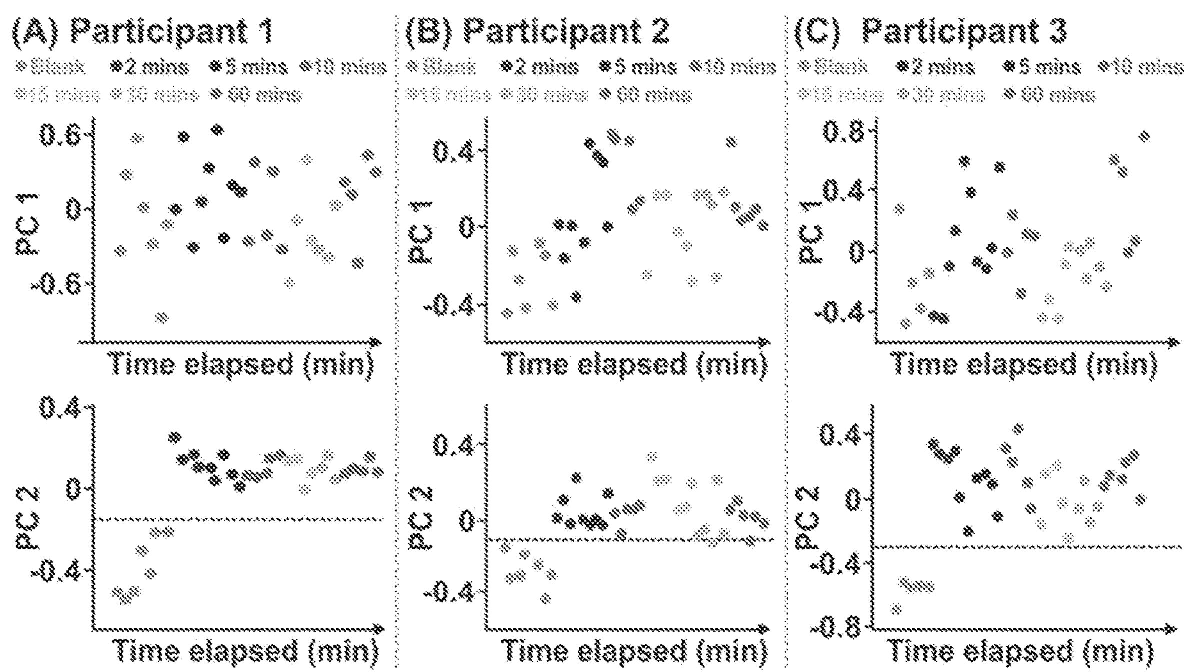
FIG. 33A demonstrates for determination of minimum incubation time for receptor-VOC interactions.
FIG. 33B demonstrates for determination of minimum incubation time for receptor-VOC interactions.
FIG. 33C demonstrates for determination of minimum incubation time for receptor-VOC interactions.

Example 5P: Materials and Methods for Example 5A—SERS Spectral Investigations of COVID-Positive and COVID-Negative Individuals To investigate the ability of the SERS sensor in differentiating COVID-positive and COVID-negative breath profiles, a comparative case control clinical trial in Singapore involving 501 participants was conducted. Participants were required to take a deep breath and exhale continuously into a fresh breath chamber for 10 s under supervision to collect alveolar air from deeper lung regions which are involved in lung-blood VOC exchange (FIG. 25). Each blown breath chamber was allowed to incubate for a minimum of 2 mins to allow sufficient time for receptor-VOC interactions to occur before measuring the SERS spectra using a portable Raman spectrometer (FIG. 33A to 33C). The whole process takes less than 5 mins, which helps for application in mass screenings. Subsequently, a nasopharyngeal swab specimen was collected from the participants for a PCR test within 48 hrs of breath collection as a benchmark to determine if they were COVID-negative or COVID-positive. Of all the participants, 74 participants (14.8%) were classified as COVID-positive on the basis of their PCR test results, with 31 being asymptomatic at the point of testing (FIG. 34A).

Figure 34:
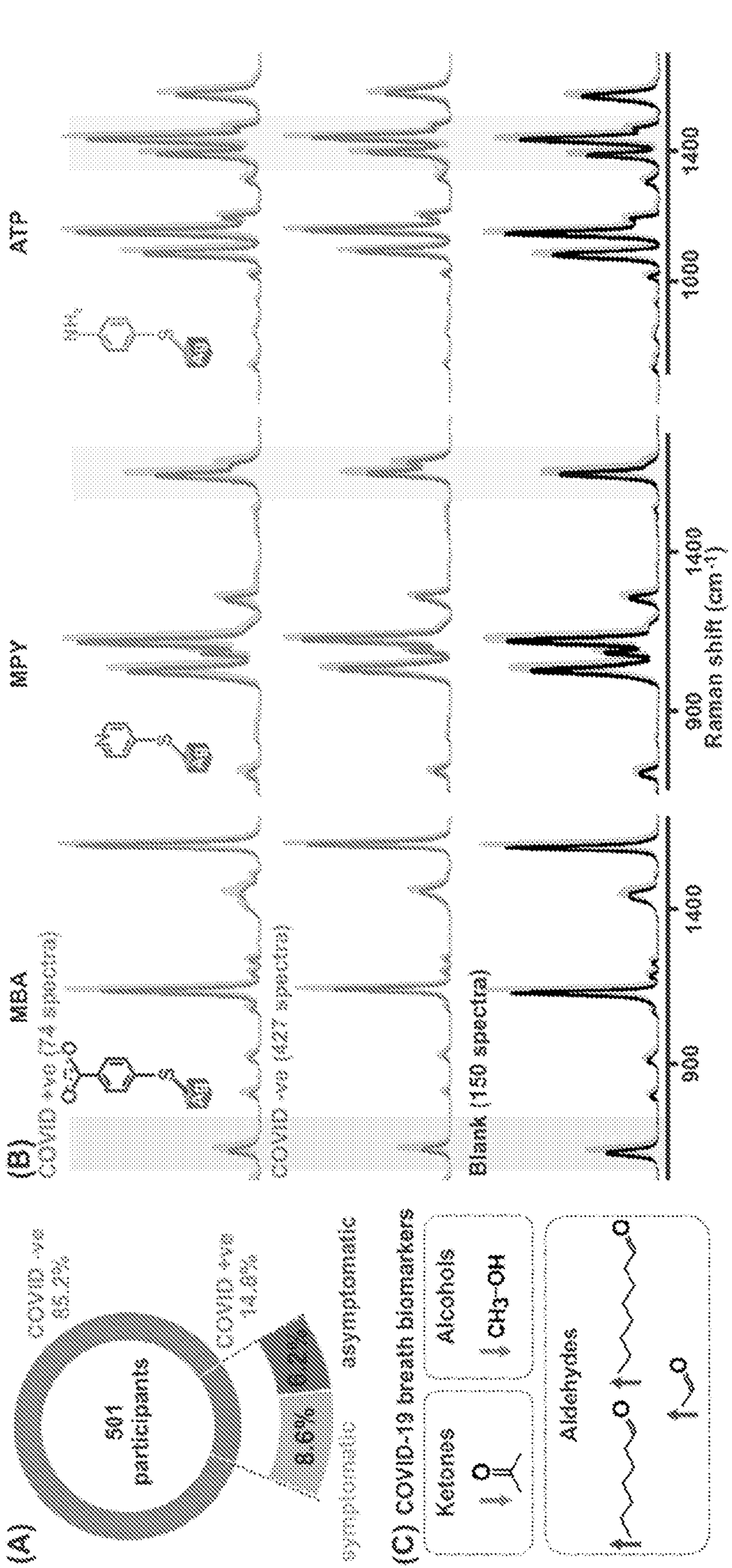
FIG. 34A shows a schematic summary of COVID-19 infection status and outward display of flu-like symptoms of 501 participants.
FIG. 34B shows representative SERS spectra of each molecular receptor (MBA, MPY, ATP) in the absence (referred to as "blank") and presence of COVID-positive and COVID-negative breath samples. Peaks of interest with in-depth analysis are highlighted. A total of 150 blank, 74 COVID-positive, and 427 COVID-negative samples are measured.
FIG. 34C shows molecular structures of reported COVID-19 breath biomarkers. The relative BVOC concentration changes in COVID-positive individuals compared to changes in COVID-negative individuals are indicated by the arrows.

Scrutiny of the SERS spectra in the absence of breath (denoted as "blank", total 150 samples), presence of COVID-positive breath (total 74 samples) and presence of COVID-negative breath (total 427 samples) reveals several considerable spectral differences, which clearly distinguish the breath chemical profiles of COVID-positive and COVID-negative individuals (FIG. 34B). To gain qualitative insight on key receptor-BVOC interactions behind these spectral differences, the observed breath-induced spectral differences were compared against individual SERS responses to several reported VOC biomarkers in the breaths of COVID-positive patients. The target VOCs of interest include methanol, ethanal, heptanal, octanal, and acetone (FIG. 34C). In addition, water vapor is included to investigate its potential influence in the resulting SERS signals. Briefly, the SERS sensor was separately incubated with neat standards in closed systems to allow vaporization of the respective VOC into an equilibrium state (example 5J). For in-depth spectral analysis, three spectral regions were selected, namely, 490-550 $cm^{-1}$ of MBA, 1560-1680 $cm^{-1}$ of MPY, and 1050-1500 $cm^{-1}$ of ATP (FIG. 34B). It should be noted that all investigated differences across blanks, COVID-positive, and COVID-negative breath samples are statistically different at 95% confidence level with p values <0.05, using the Mann-Whitney rank-sum test (examples 5C to 5M; FIG. 35B). This indicates that the identified features are relevant and can be utilized to differentiate COVID-positive and COVID-negative individuals.

Figure 36:
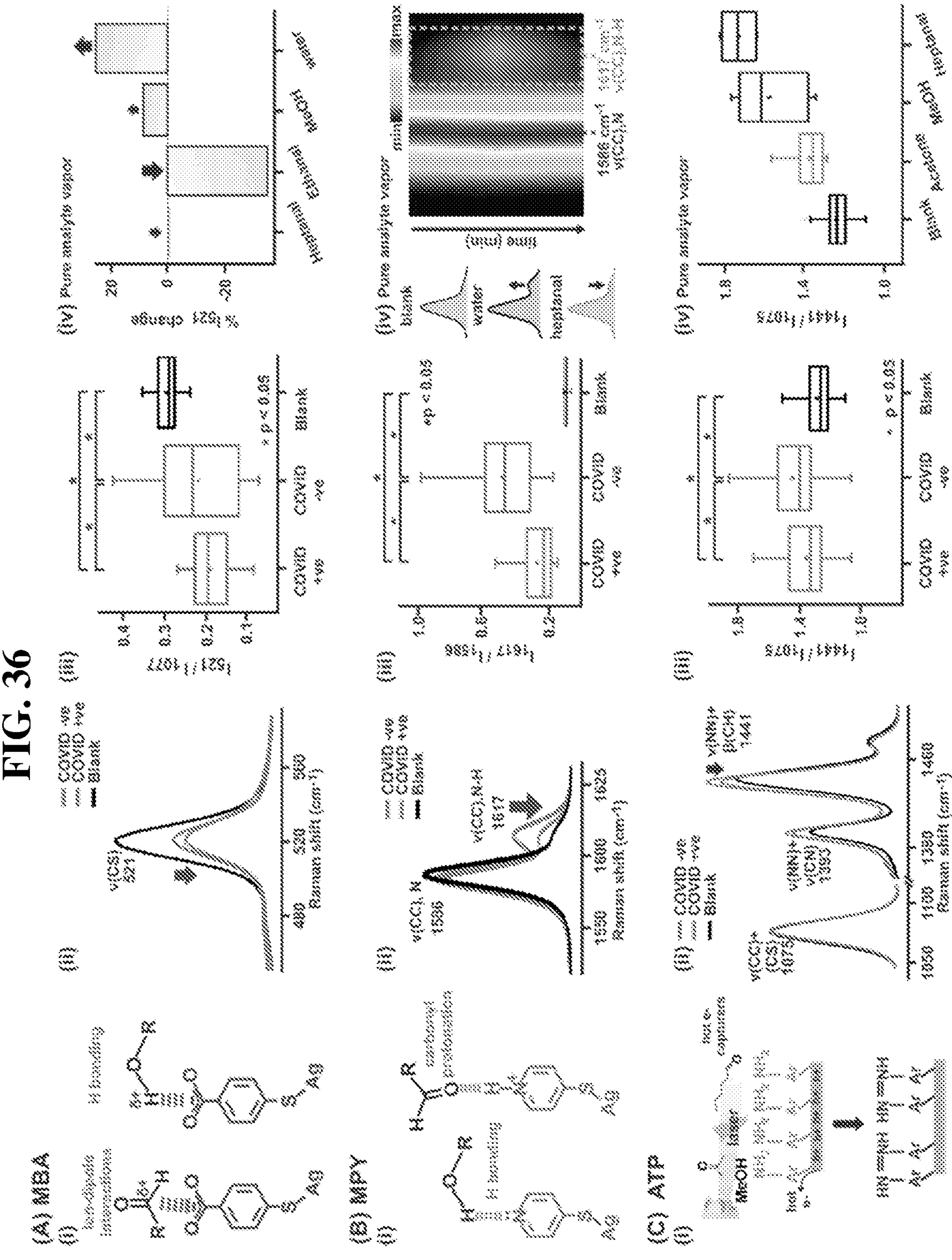
FIG. 36A shows an (i) illustration of ion-dipole interactions between MBA-aldehydes and H-bonding with hydroxyl-containing compounds, (ii) 521 $cm^{-1}$ SERS peak of MBA for blanks, COVID-positive, and COVID-negative breath samples, (iii) box plots comparing the 521 $cm^{-1}$ peak intensity using the 1077 $cm^{-1}$ peak intensity as an internal standard, and (iv) bar charts describing experimental percentage change in the 521 $cm^{-1}$ peak intensity upon exposure to selected pure vapors, using the 1077 $cm^{-1}$ peak as the internal intensity standard. For all box plots, the mean and median are represented by the square box symbol and horizontal line, respectively. The main box covers the lower to upper quartiles while the whiskers are extended to cover all data points that lie within ±1.5 interquartile range.
FIG. 36B shows an (i) illustration of deprotonated and protonated MPY forming hydrogen bonds with aldehydes and hydroxyl-containing compounds, (ii) MPY $I_{1617}/I_{1586}$ SERS peak intensity ratio for blanks, COVID-positive, and COVID-negative breath samples, (iii) box plots comparing the $I_{1617}/I_{1586}$ peak intensity ratios, and (iv) evolution of the 1550-1625 $cm^{-1}$ region upon first exposure to water vapor, followed by heptanal vapor. Intensities are normalized to the 1586 $cm^{-1}$ peak. Schematic illustration of analyte induced changes in peak intensity ratios are included as inset. For all box plots, the mean and median are represented by the square box symbol and horizontal line, respectively. The main box covers the lower to upper quartiles while the whiskers are extended to cover all data points that lie within ±1.5 interquartile range.
FIG. 36C shows an (i) illustration of increased laser-induced ATP dimerization to DMAB in the presence of breath metabolites that serve as hot electron acceptors, (ii) ATP 1030-1600 $cm^{-1}$ SERS spectral region for blanks, COVID-positive and COVID-negative breath samples, (iii) box plots comparing the 1441 $cm^{-1}$ peak intensity using the 1075 $cm^{-1}$ peak intensity as an internal standard, and (iv) box plots comparing the 1441 $cm^{-1}$ peak intensity after exposure to selected pure vapors, using the 1075 $cm^{-1}$ peak intensity as an internal standard. All statistical significances, determined by the Mann-Whitney rank sum test at $p<0.05$ level, is indicated by *. For all box plots, the mean and median are represented by the square box symbol and horizontal line, respectively. The main box covers the lower to upper quartiles while the whiskers are extended to cover all data points that lie within ±1.5 interquartile range.
Figure 37:
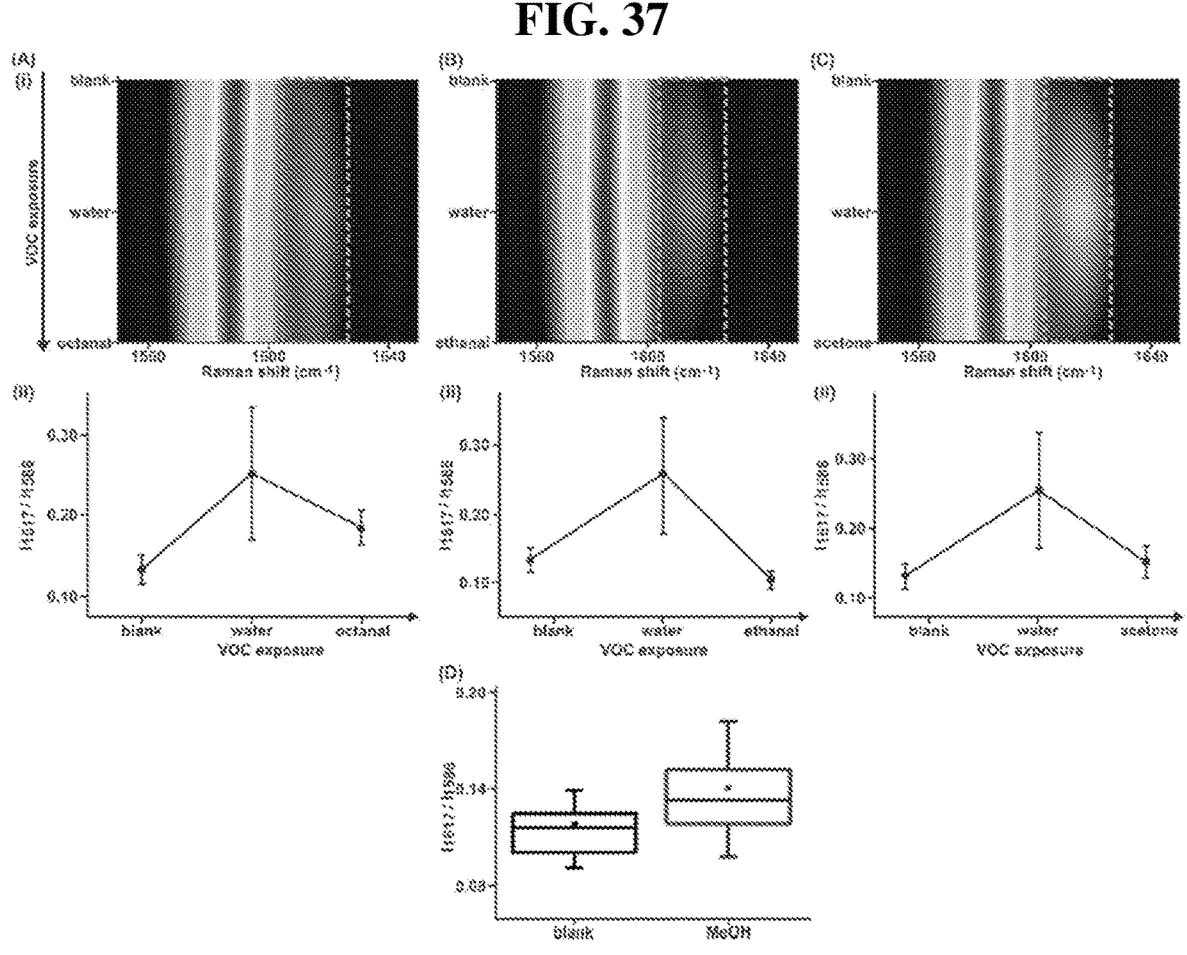
FIG. 37A shows (i) evolution of 1550-1650 $cm^{-1}$ spectral region, normalized to the 1586 $cm^{-1}$ peak intensity upon exposure to water vapor and with subsequent exposure to octanal. The plot in (ii) shows corresponding $I_{1617\ cm^{-1}}/I_{1586\ cm^{-1}}$ peak intensity ratios at different stages of exposure.
FIG. 37B shows (i) evolution of 1550-1650 $cm^{-1}$ spectral region, normalized to the 1586 $cm^{-1}$ peak intensity upon exposure to water vapor and with subsequent exposure to ethanal. The plot in (ii) shows corresponding $I_{1617\ cm^{-1}}/I_{1586\ cm^{-1}}$ peak intensity ratios at different stages of exposure.
FIG. 37C shows (i) evolution of 1550-1650 $cm^{-1}$ spectral region, normalized to the 1586 $cm^{-1}$ peak intensity upon exposure to water vapor and with subsequent exposure to acetone. The plot in (ii) shows corresponding $I_{1617\ cm^{-1}}/I_{1586\ cm^{-1}}$ peak intensity ratios at different stages of exposure.
FIG. 37D shows a box plot of $I_{1617\ cm^{-1}}/I_{1586\ cm^{-1}}$ peak intensity ratios before and after MeOH exposure.

For MBA, a decrease in peak intensity of the C—S stretching (v(CS)) peak at 521 $cm^{-1}$, from 0.29±0.03 in blanks to 0.19±0.05 and 0.22±0.09 in the presence of COVID-positive and COVID-negative breaths were observed, respectively, with COVID-positive samples exhibiting a larger decrease than COVID-negative samples (FIG. 36A plot ii,iii). The v(CS) peak intensity reflects the relative polarizability of the C—S bond and changes when carbonyl compounds such as ethanal, heptanal, octanal, and acetone form ion-dipole interactions or hydroxyl containing compounds such as methanol and water vapor form hydrogen bonding with MBA, resulting in a redistribution of the delocalized electron cloud (FIG. 36A plot i). Experimentally, a decrease in v(CS) peak intensity is observed upon separate exposure to pure vapors of ethanal, heptanal, octanal, and acetone, while an increase is observed upon exposure to methanol and water (FIG. 36A plot iv, FIG. 35C). This trend is in good qualitative agreement with simulated SERS spectra obtained using density functional theory (DFT), where ethanal, heptanal, octanal, and acetone induce a 0.23-29% decrease, while methanol and water vapor induce a 11-32% increase in v(CS) peak intensity (FIG. 35C). The observation of a larger decrease in v(CS) peak intensity for COVID-positive breath profiles is therefore consistent with lower methanol and higher aldehyde (ethanal, heptanal, and octanal) levels. The general decrease in v(CS) intensity for samples exposed to breath indicates a stronger influence of ion-dipole interactions in the C—S bond polarizability. As a result, the effect of relative humidity in the exhaled breath samples on the MBA v(CS) peak intensity is minimal.

For MPY, an increase in peak intensity ratio of 1586 and 1617 $cm^{-1}$ ($I_{1617}/I_{1586}$), from 0.091±0.011 in blanks to 0.265±0.116 and 0.477±0.194 was observed in the presence of COVID-positive and COVID-negative breath, respectively, with COVID-positive samples exhibiting a lower increase than COVID-negative samples (FIG. 36B plot ii,iii). The 1586 and 1617 $cm^{-1}$ peak is indexed to the aromatic C═C stretching v(CC) when the pyridine nitrogen is deprotonated and protonated, respectively; hence $I_{1617}/I_{1586}$ describes the relative amount of protonated pyridine species present. Before breath exposure, MPY exists predominantly in the deprotonated state, as indicated by the low $I_{1617}/I_{1586}$ in blank samples. After breath exposure, pseudo-protonated pyridine species are formed through hydrogen bonding between MPY and hydroxyl containing compounds such as methanol and water vapor, resulting in an intensification of the 1617 $cm^{-1}$ peak and an increase in $I_{1617}/I_{1586}$ (FIG. 36B plot i). A similar increase in $I_{1617}/I_{1586}$ is observed experimentally upon separate exposure to pure vapors of methanol and water (FIG. 36B plot iv; FIG. 37A to 37D). It should be noted that exposure to carbonyl compounds such as ethanal, heptanal, octanal, and acetone after incubation with water vapor induces a slight reduction of the 1617 $cm^{-1}$ peak intensity; however, their respective $I_{1617}/I_{1586}$ remains higher than blank samples. The reduction is triggered by a decrease in protonated pyridine species because carbonyl compounds compete for protons to form protonated carbonyl species (FIG. 36B plot i, FIG. 37A to 37D). The observation of a smaller increase in $I_{1617}/I_{1586}$ for COVID-positive breath profiles is therefore well aligned with lower methanol and higher aldehyde (ethanal, heptanal, and octanal) levels reported.

Figure 39:
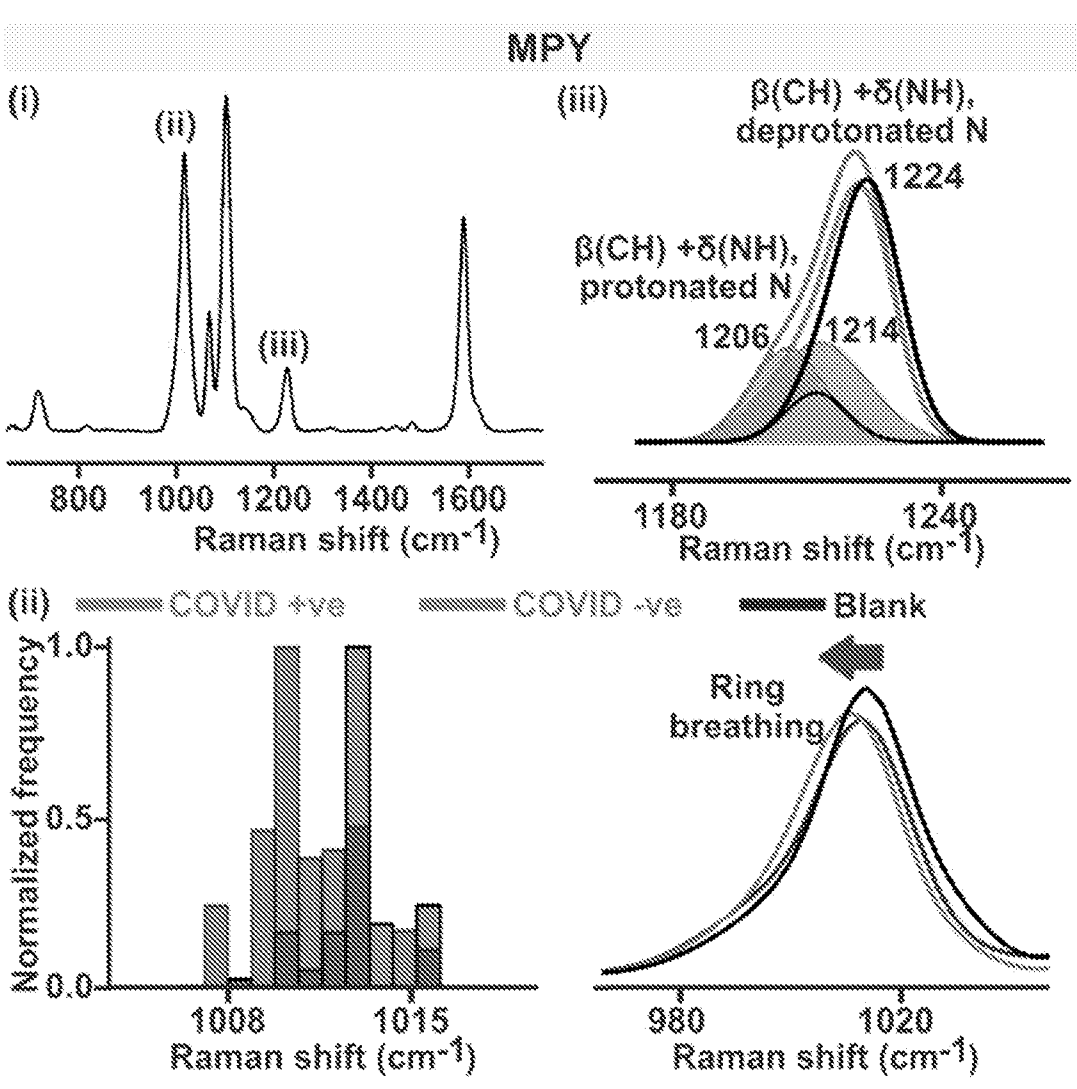
FIG. 39 shows in plot (i) representative MPY SERS spectra. Peaks of statistical difference between COVID-positive and COVID-negative individuals are indicated by plots (ii)-(iii). Plot (ii) MPY ring breathing mode indexed at 1014 $cm^{-1}$ red-shifts upon breath exposure, with COVID-negative individuals exhibiting a larger red-shift in general, as indicated by the histogram (left). Plot (iii) COVID-negative individuals cause a larger intensification of the shoulder peak indexed to CH bending coupled with NH bending β(CH)+δ(NH) with protonated N compared to COVID-positive individuals.
Figure 40:
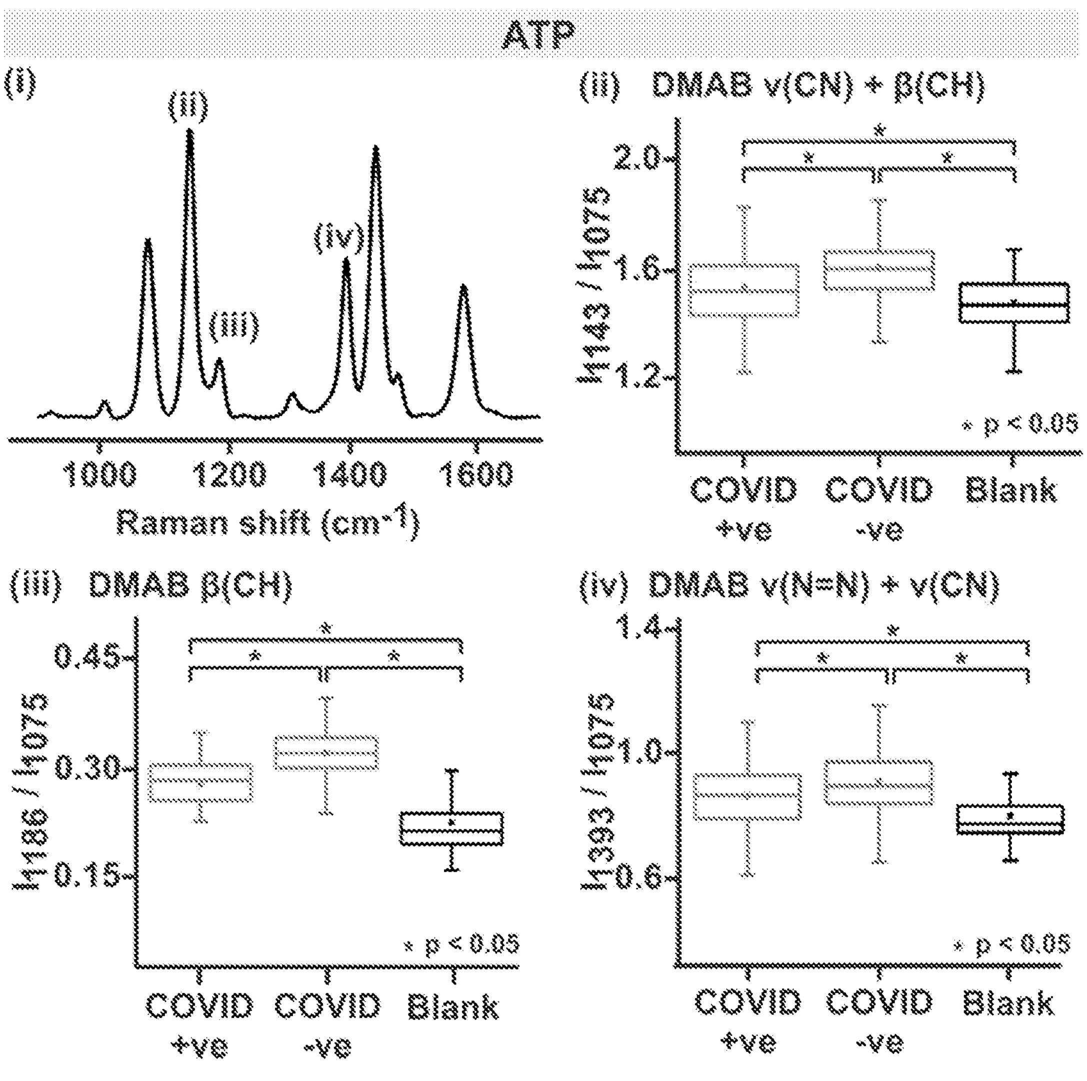
FIG. 40 shows representative ATP SERS spectra. Peaks of statistical difference between COVID-positive and COVID-negative individuals are indicated by plots (ii)-(iv). As discussed in example 5P, ATP may undergo laser-induced dimerization to form DMAB, with characteristic DMAB peaks observed at 1143, 1186 and 1393 $cm^{-1}$. Plots (ii) to (iv) are box plots comparing peak intensity ratios between blanks, COVID-positive and COVID-negative samples for (ii) DMAB CN stretching coupled with CH stretching ν(CH), (iii) DMAB CH bending β(CH) and (iv) DMAB CN stretching coupled with N═N stretching ν(NN). As highlighted in the example, the DMAB-associated peaks intensify upon breath exposure, with COVID-negative samples inducing a larger increase than COVID-positive samples. All statistical significances, determined by the Mann-Whitney rank sum test at $p<0.05$ level, is indicated by *. For all box plots, the mean and median are represented by the square box symbol and horizontal line, respectively. The main box covers the lower to upper quartiles while the whiskers are extended to cover all data points that lie within ±1.5 interquartile range.
Figure 41:
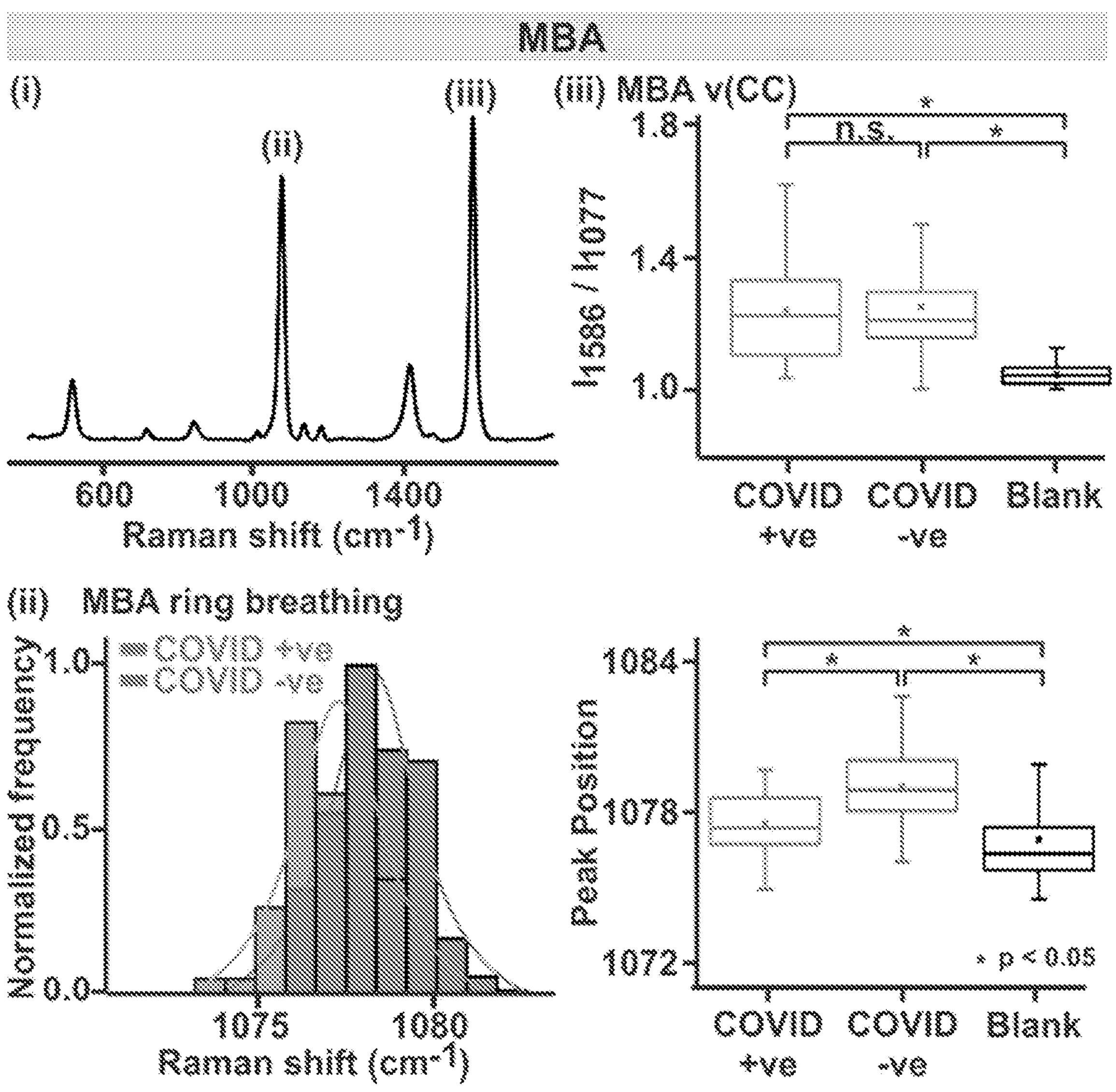
FIG. 41 shows (i) a representative MBA SERS spectra. Spectral regions that undergo changes upon breath exposure are indicated by plots (ii)-(iv). Plot (ii) shows COVID-positive samples cause an increase in intensity of MBA $COO^-$ bending $\delta(COO^-)$ mode indexed at 842 $cm^{-1}$ while there are negligible changes for COVID-negative samples. Plot (iii) shows MBA ring breathing mode indexed at 1077 $cm^{-1}$ blue-shifts upon breath exposure, with COVID-negative individuals exhibiting a larger blue-shift in general, as indicated by the histogram (left). Plot (iv) MBA CC stretching ν(CC) mode indexed at 1486 $cm^{-1}$ intensifies upon breath exposure. However, there are negligible differences between COVID-positive and COVID-negative samples, as denoted by n.s. All statistical significances, determined by the Mann-Whitney rank sum test at $p<0.05$ level, is indicated by *. For all box plots, the mean and median are represented by the square box symbol and horizontal line respectively. The main box covers the lower to upper quartiles while the whiskers are extended to cover all data points that lie within ±1.5 interquartile range.

For ATP, the azobenzene N═N stretching coupled with C—H bending (v(NN)+β(CH)) at 1441 $cm^{-1}$ intensifies from 1.272±0.116 in blanks to 1.339±0.179 and 1.430±0.187 in the presence of COVID-positive and COVID-negative breath, respectively, with COVID-positive samples registering a smaller increase than COVID-negative samples (FIG. 36C plot ii,iii). The v(NN)+β(CH) is a vibrational mode characteristic of p,p'-dimercaptoazobenzene (DMAB) formed by laser-induced dimerization of ATP. The observed intensification of the v(NN)+β(CH) peak can be attributed to increased and faster ATP dimerization facilitated by VOCs present in breath, which capture hot electrons generated by surface plasmon decay, increasing the number of hot holes available to form DMAB (FIG. 36C plot i). This explains similar intensity trends observed for other characteristic DMAB peaks at 1143, 1186, and 1393 $cm^{-1}$ (FIG. 38A to 38E). With separate exposure to pure vapors of ethanal, heptanal, octanal, acetone, methanol, and water, a similar increase in DMAB-associated peak intensities at 1143 and 1441 $cm^{-1}$ was observed (FIG. 36C plot iv; FIG. 38A to 38E). The observation of a smaller increase in the v(NN)+β(CH) peak intensity for COVID-positive breath profiles is therefore in good agreement with lower methanol and acetone levels reported. Notably, the combined effect of lower methanol and acetone levels is more pronounced than elevated aldehyde (ethanal, heptanal, octanal) levels, suggesting that the cumulative effect on ATP is likely to be dominated by the former. It should be noted that in addition to the aforementioned peaks, other spectral differences including MBA's ring breathing+C—S stretching (1077 $cm^{-1}$), MPY's ring breathing (1014 $cm^{-1}$) and C—H+N—H bending (1224 $cm^{-1}$), and ATP's DMAB-associated peaks (1143, 1186, and 1393 $cm^{-1}$) are observed, which facilitate differentiation (FIGS. 39 to 41).

By establishing a strong correlation between observed receptor spectral variances upon exposure to COVID-positive and COVID-negative breath samples, as well as with pure vapors of reported COVID-19 biomarkers, it is affirmed that the SERS sensor effectively captures the distinct breath profile of a COVID-positive individual. The non-specific nature of the SERS sensor effectively records the cumulative response of each receptor to all BVOCs present, with each receptor exhibiting pronounced spectral differences between COVID-positive and COVID-negative individuals. When the different SERS responses of individual receptors are combined, these spectral changes can reinforce one another to form characteristic SERS "breath-prints" that can be used as specialized identifiers of an individual's COVID-19 infection status. Such a recognition technique is highly advantageous because it eliminates the need to isolate and identify individual components for class differentiation, which is tedious and cumbersome.

Figure 42:
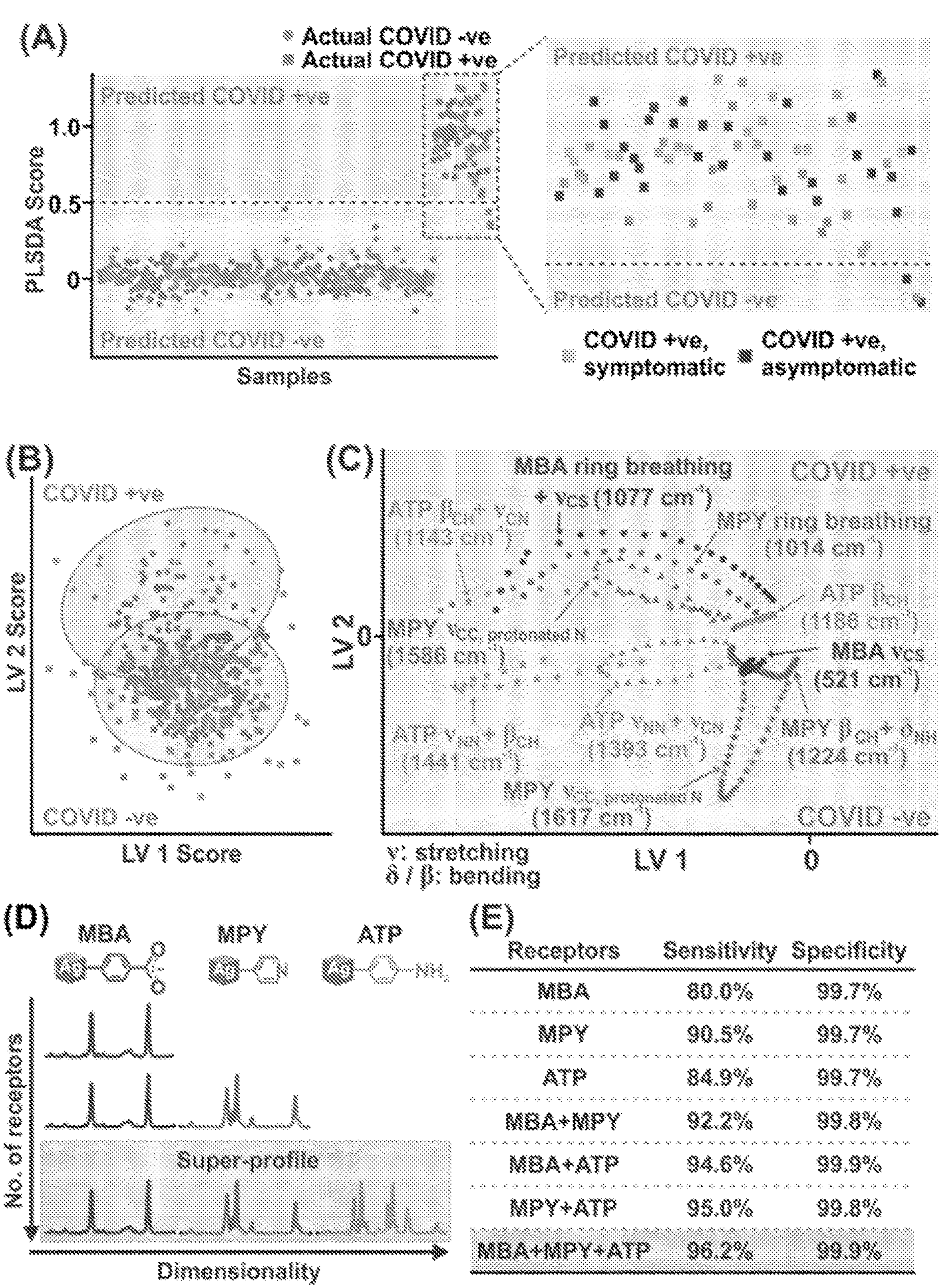
FIG. 42A shows a PLSDA score plot derived from the classification of individual SERS super-profiles showing clear distinction between the breath profiles of COVID-positive and COVID-negative individuals. Inset on right shows the zoomed-in segment of the PLSDA score plot for COVID-positive individuals, illustrating that symptoms do not affect their classification scores.
FIG. 42B shows a PLSDA score plot of the first two latent variables (LVs), highlighting the influence of LV 2 in classifying COVID-positive and COVID-negative individuals.
FIG. 42C shows a PLSDA loadings plot for the first two LVs to illustrate specific receptor vibrational modes which influence the classification of COVID-positive and COVID-negative individuals.
FIG. 42D shows a scheme depicting the formation of SERS super-profiles using spectral information from multiple receptors to increase the data dimensionality.
FIG. 42E is a summary table comparing the classification sensitivity and specificity for an increasing number of receptors using averaged classification outcomes across 50 model iterations.

Example 5O: Results and Discussion for Example 5A—Rapid COVID 19 Classification Using Partial Least-Squares Discriminant Analysis With an in-depth understanding of the spectral regions contributing to the differentiation of breath profiles based on their COVID-19 infection status, a binary classification model was constructed using partial least-squares discriminant analysis (PLSDA) to achieve rapid, high throughput analyses. PLSDA is an established technique that maximizes and combines the largest SERS spectral covariances between different data sets as latent variables (LVs) to achieve maximum differentiation between COVID-19-positive and COVID-19-negative breath profiles. In addition, the algorithm requires minimal computational power and produces classification scores that are easily comprehensible, making it particularly suitable for the application as a mass screening tool. Before the PLSDA model is constructed, SERS spectra derived from all three receptors are baseline corrected, normalized, and concatenated as a single SERS super-profile (FIG. 42D). Each SERS super-profile effectively harnesses spectral variances arising from receptor-BVOC interactions, creating an additive effect that enhances the differentiation of COVID-positive and COVID-negative classes. Next, a random stratified sampling algorithm is used to split the data set into a train set and prediction set comprising 80% and 20% of the original data set, respectively, over 50 different iterations to generate 50 classification outcomes with each prediction set. Such iterations minimize any potential issues with selection bias, chance classification outcomes, and model overfit.

Figure 44:
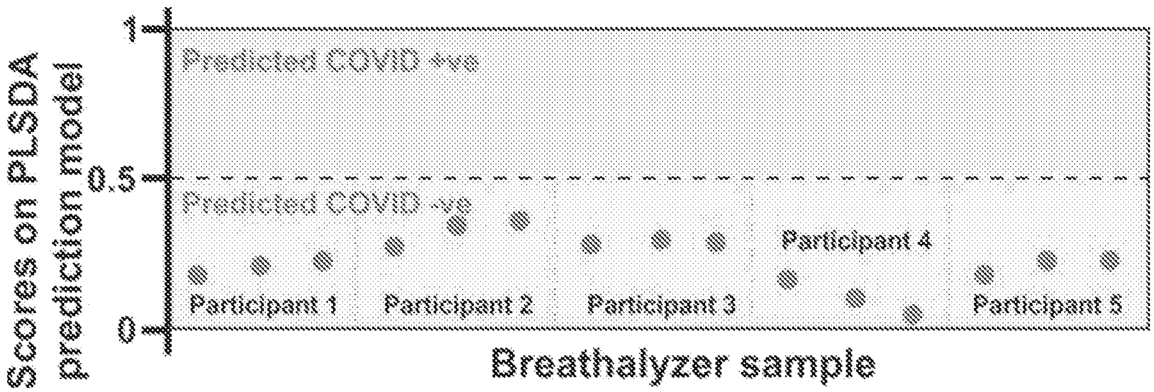
FIG. 44 shows a PLS-DA classification scores and outcomes across 5 participants. 3 breath samples were collected from each participant as replicates. It is affirmed that the reproducibility of the model by conducting a small laboratory-based replicate study with 5 COVID-negative volunteers (not included in the 501 sample size). Their predicted classification outcomes using 3 separate breath samples are all consistent and predicted correctly as COVID-negative. Hence, this affirms that the classification model provides reproducible and consistent results.

Overall, the PLSDA model achieves an average classification sensitivity of 96.2% and specificity of 99.9% when distinguishing COVID-positive and COVID-negative breath profiles (FIG. 42A, FIG. 43, also see example 5R below). Using triplicate breaths, it is affirmed that the PLSDA model classification is reproducible and consistent (FIG. 44). The low average false-negative rate of 3.8% is superior to commercially available antigen rapid tests with reported false-negative rates of 10-30% and is comparable to PCR tests given similar sample sizes. Notably, asymptomatic COVID-positive individuals can be accurately classified, indicating that characteristic BVOC changes do occur and can be detected regardless of symptoms (FIG. 42A inset).

This is consistent with reports that the lack of symptoms does not preclude internal physiological changes. Timely detection of such asymptomatic individuals through active mass screening is especially helpful to disrupt the silent viral spread into local communities that often remains undetected until a massive outbreak occurs.

The PLSDA score and loadings plot are further used to highlight how different receptor spectral regions influence the classification outcome, so as to establish a robust relationship between the classification results and previously identified regions which showed distinct differences (FIGS. 42B and 42C). The first two LVs of are important in describing regions that contribute to the largest variances between the two classes. From the score plot, it can be observed that COVID-positive breath samples show more positive LV 2 scores while COVID-negative breath samples show more negative LV 2 scores (FIG. 42B). It is noted that the distribution of data points along LV 1 for both class groups is due to intraclass variances, which can be attributed to variations in BVOC concentrations among different individuals. Nonetheless, this does not affect the COVID-positive/negative clustering along LV 2. In combination with the loadings plot, which can then correlate spectral regions which are assigned positive LV 2 scores as regions contributing more significantly to a COVID-positive classification outcome, and vice versa (FIG. 42C). For instance, MBA's C—S stretching (1077 $cm^{-1}$), MPY's ring breathing (1014 $cm^{-1}$) and C═C stretching (deprotonated N) (1586 $cm^{-1}$), and ATP's C—H bending+C—N stretching (1143 $cm^{-1}$) and C—H bending (1186 $cm^{-1}$) are assigned positive LV 2 scores. This signifies that the cumulative effect of peak intensity and/or peak position variances from these vibrational modes contribute to the classification of a breath profile as COVID-positive. On the other hand, MBA's C—S stretching (521 $cm^{-1}$), MPY's C—H+N—H bending (1224 $cm^{-1}$) and C═C stretching (protonated N), and ATP's N═N+C—N stretching (1393 $cm^{-1}$) and N═N stretching+C—H bending (1441 $cm^{-1}$) are assigned negative LV 2 scores and therefore are helpful in classifying COVID-negative breath profiles. This thus affirms that the amalgamation of multiple receptor spectral changes in the SERS superprofiles are important in assigning the COVID-positive or COVID-negative class. Furthermore, it proves that the model is built upon valid spectra variances arising from chemical interactions between receptor-BVOC and the change in BVOC concentrations and not spectral noise.

To emphasize the importance of the multireceptor SERS super-profile, it is herein demonstrated the distinct sensitivity improvement from 80 to 96.2% when comparing a single SERS receptor with the SERS super-profile sensor (FIG. 42E, FIG. 43, example 5R). An increase in the number of correctly classified COVID-positive breath profiles can be observed as the number of receptors increases from one to three. This increase exemplifies that each receptor imbues enhanced distinguishing capabilities to the SERS sensor by increasing the total number of distinct features between the breath profiles of COVID-positive and COVID-negative individuals. Such an approach is helpful for complex sample matrices to allow the SERS sensor to record a more complete description of the differences in breath profiles. Notably, a high specificity can be achieved even with a single receptor as it is comparatively easier to distinguish a sensor that is exposed to breath, than accurately identifying a COVID-positive breath profile.

Example 5R: Results and Discussion for Example 5A—Sample Calculation of a Model Sensitivity and Specificity

| | Actual PCR Positive | Actual PCR Negative |
|---|---|---|
| Predicted Positive | 71 | 0 |
| Predicted Negative | 3 | 427 |

$$\begin{aligned}\text{Sensitivity} &= \frac{\text{True Positive}}{\text{True Positive} + \text{False Negative}}\\ &= \frac{71}{71+3} \times 100\%\\ &= 96\%\end{aligned}$$

$$\begin{aligned}\text{Specificity} &= \frac{\text{True Negative}}{\text{True Negative} + \text{False Positive}}\\ &= \frac{427}{427+0} \times 100\%\\ &= 100\%\end{aligned}$$

Figure 45:
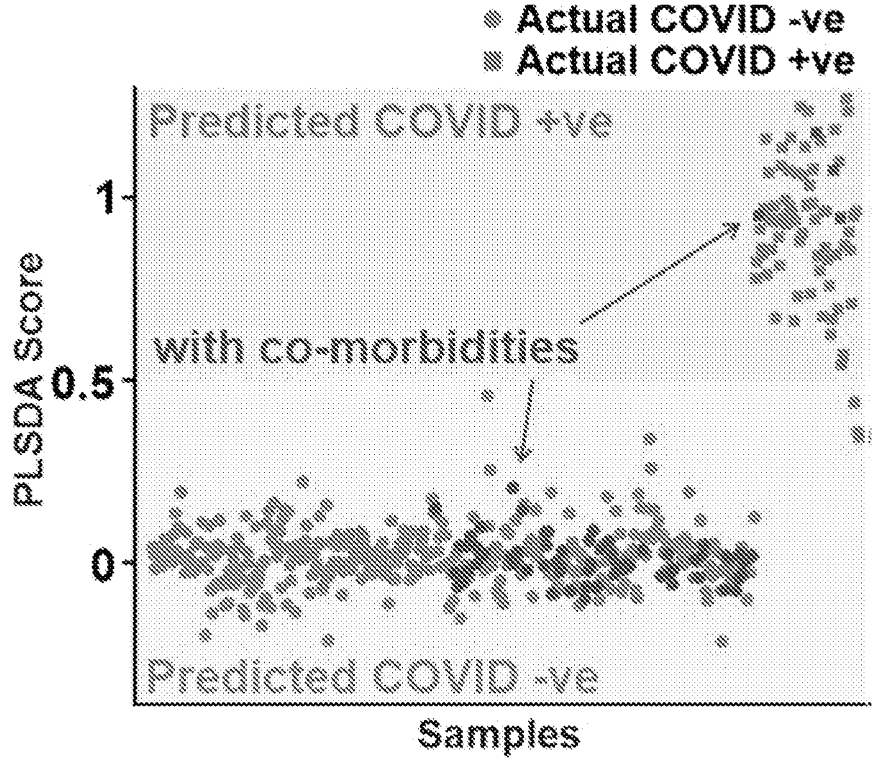
FIG. 45 shows a PLSDA score plot derived from the classification of individual SERS super-profile. Participants with reported comorbidities are highlighted in purple, illustrating that the participants' existing health conditions do not affect their classification scores. It is to be highlighted that since the provision of this information is strictly voluntary, information for all 501 trial participants is not entirely available. Nonetheless, the accurate classification of the 70 participants with reported comorbidities indicates that the SERS sensor is able to identify specific differences in participants' breath profiles that were directly linked to whether they had COVID-19 or not.
Figure 46:
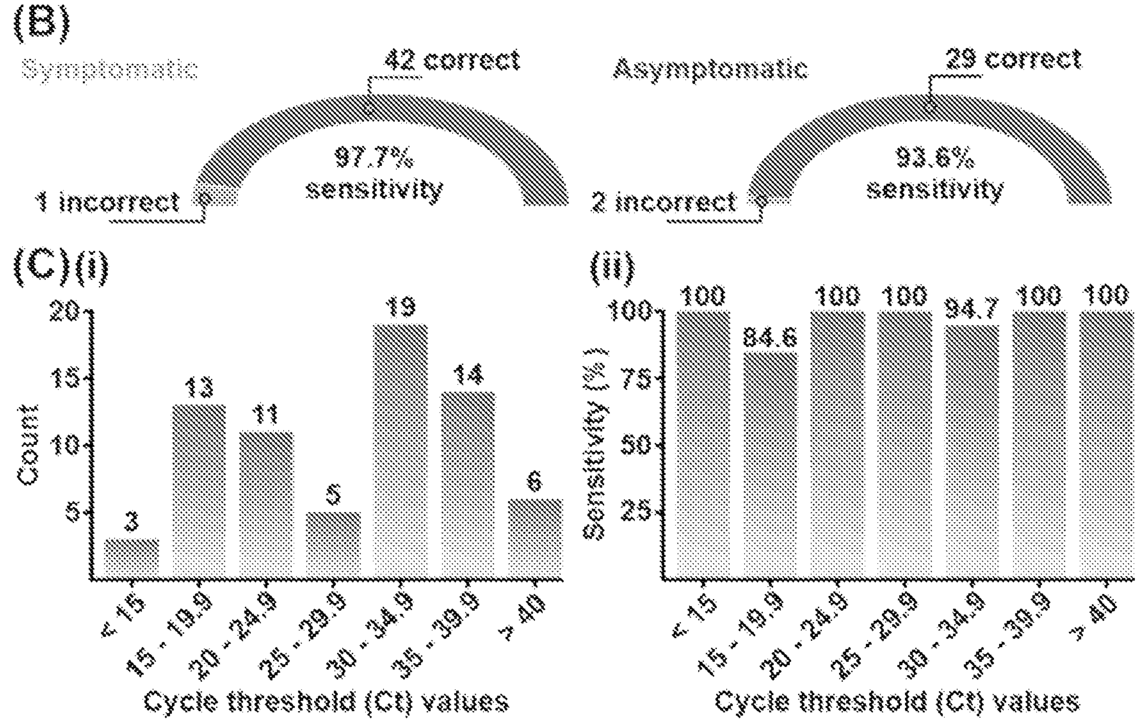
FIG. 46A shows a confusion matrix of the averaged classification outcomes across 50 model iterations. Values in green (41 and 427) and brown (0 and 3) indicate correct and incorrect classification outcomes, respectively. Actual values before rounding off are given in parenthesis. The sensitivity, specificity, positive, and negative prediction values are in blue, with their corresponding 95% confidence intervals in parenthesis directly below.
FIG. 46B shows a scheme depicting the sensitivity of the sensor in the classification of symptomatic and asymptomatic COVID-positive individuals.
FIG. 46C shows a histogram depicting (i) the number of COVID-positive participants based on their respective cycle threshold (Ct) values determined by a PCR test and (ii) the model sensitivity at each Ct range.
FIG. 46D shows a scheme describing participant demographics such as their mean age, gender, and smoking habits.

Example 5S: Results and Discussion for Example 5A—Detailed Model Analysis in Relation to Clinical Test Results Through rigorous analysis of the clinical trial results, the key strengths of the SERS sensor was highlighted via its performance given a specific use case. The overall sensitivity of 96.2% (95% CI: 91.8-100%) and specificity of 99.9% (95% CI: 99.7-100%) can be derived by constructing a confusion matrix using the averaged classification outcomes across 50 model iterations (FIG. 46A). Both the positive and negative predictive values (PPV and NPV) are >99%, indicating high accuracy of the PLSDA model in predicting the presence of COVID-19 at the disease prevalence of the clinical studies. When considering the model sensitivity in relation to displayed COVID-19 symptoms, it is noted that the model shows high sensitivities of 97.7% and 93.6% for both symptomatic and asymptomatic individuals, respectively (FIG. 46B). The slightly lower sensitivity when identifying asymptomatic COVID-positive individuals could be due to the limited sample size of 31 participants. To enhance the ability of the sensor in picking up asymptomatic COVID-positive individuals, it is advantageous to collect more data so as to elucidate spectral features, which should be considered for their classification. In addition, out of 70 participants with reported comorbidities including asthma and thyroid dysfunctions (4 COVID-positive, 66 COVID-negative), all 70 participants are accurately classified in their respective COVID-19 infection status (FIG. 45). This indicates that the presence of pre-existing medical conditions does not affect the prediction outcome of the SERS breathalyzer. Advantageously, good representation of individuals at various stages of COVID-19 infection in the clinical trial with PCR cycle threshold (Ct) values ranging from <15 to >40 (FIG. 46C plot i) has been demonstrated. The PCR Ct value indicates the relative viral load in an infected individual, whereby a low Ct value is equivalent to a high viral load. Notably, the high sensitivity of the SERS sensor across a large range of Ct values indicates that there are distinct BVOC differences for all COVID-positive individuals regardless of the viral load in their bodies (FIG. 46C plot ii).

This is helpful in ensuring the breathalyzer's effectiveness in picking up infected individuals across all stages of infection, as these individuals may still be potentially infectious.

In addition, it has been ascertained that other potential confounding factors such as age, gender, smoking habits, and time since the last meal do not significantly influence the classification, by employing the t test and $\chi^2$ test (FIG. 46D to 46F). Given a mean age of 41±14 years old for COVID-positive participants and 43±13 years old for COVID-negative participants, age did not significantly influence classification at the 95% confidence level (t=1.00, p=0.32). Similarly, the gender distribution of 50 males and 24 females across COVID-positive participants and 239 males and 186 females across COVID-negative participants did not affect classification ($\chi^2$=3.32, p=0.068). When investigating the effect of smoking habits, since only 6 COVID-positive and 90 COVID-negative participants smoke, a higher critical value of p=0.01 was set. At a 99% confidence level, the participants' smoking habits ($\chi^2$=5.64, p=0.018) did not impact classifications. However, a larger sample size is likely necessary in order to arrive at a more statistically robust conclusion for this factor. In terms of the time elapsed since the participants' last meal, there is significant imbalance as most COVID-positive participants (58 out of 66) did not consume any food for >6 hrs prior to the breathalyzer test (FIG. 46F plot i). This resulted in a significant difference between the average time since the last meal (t=12.57, p<0.00001) for COVID-positive and COVID-negative participants. This difference stems from an inherent limitation in operational protocol, as breath samples were typically collected from COVID-positive individuals by nurses before their breakfast at a specified timing. In contrast, breath samples from COVID-negative individuals were collected after disembarking from a flight, which had meals provided, with no restrictions as to when they are allowed to consume any food. Nonetheless, it is noted that even with such an imbalance, the high classification specificity of 99.9% is a clear indicator that the differences between COVID-positive and COVID-negative breath samples were much more pronounced compared to any differences in breath composition resulting from food consumption (FIG. 46F plot ii).

Example 5T: Summary Discussion for Examples 5A to 5S

In conclusion, the SERS-based breathalyzer is herein demonstrated operable for rapid, noninvasive screening of individuals for COVID-19, achieving a sensitivity of 96.2% and specificity of 99.9%. Through the strategic use of multiple molecular receptors to capture and interact with various BVOCs in exhaled breath, highly informative SERS super-profiles that harness each receptor's distinguishing power are generated. Fundamentally, good qualitative agreement between the observed SERS spectral variances with those induced by pure VOC vapors of several potential COVID-19 biomarkers can be established. The in-depth understanding of these spectral differences allows us to construct a robust PLSDA model which attains a false negative rate superior to commercially available antigen rapid tests and comparable to that of PCR tests. In addition, the classification accuracy is independent of whether the individual displays COVID-19-related symptoms and other confounding factors such as age, gender, and smoking habits before breath collection. Also, the procedures are simple, easy to administer, and requires only 5 mins or less from sample collection to output of results for rapid turnover. As the world adjusts to a new normal, government strategies are shifting toward scaling up of COVID-19 testing, contact tracing, and vaccination. In this aspect, the present breathalyzer can play a significant role in fulfilling this goal by supporting mass screening capabilities even at locations with high human traffic. Breath collection and measurements can be performed in parallel, which overcomes the current bottleneck in conventional GC-MS methods for breath analysis, making it suitable for testing in diverse settings and locations like schools, airports, and events like weddings, religious events, and conferences. Moreover, the findings from this work lay the foundation for next-generation breath-based detection of other respiratory and/or non-respiratory related diseases using SERS.

Example 6: Commercial and Potential Applications

The present chip and method, which involve integrated SERS super-fingerprinting and machine-learning analysis, is capable of revolutionizing the gas sensing market. The present chip is portable and enables rapid analysis compared to existing GC-MS methods. The present chip and method also provide better accuracy and are less prone to interferences than EC, MOS, and NDIR sensors. The present chip and method can be integrated into drones for industrial exhaust analysis of greenhouse gases, or into breathalyzer device for disease diagnosis. The present chip and method have potential applications in many industries, including regulatory enforcement, maritime, manufacturing industries, automobile and healthcare.

For example, one particular application that is directly benefiting from the present chip and method is their use in non-invasive and rapid disease diagnosis. By producing super-fingerprints, analysis of human fluids (urine, breath, sweat, tears . . . ) can be performed to determine their molecular composition, from which a subject's medical condition can be inferred based on recent advancement in healthcare-oriented metabolomics. Significantly, the present SERS chip and method offer a highly scalable and deployable solution for such analysis, that can adapt to mass public screening, which is required for critical disease screening need such as COVID-19 screening in the current pandemic.

In terms of SERS, super-fingerprints from the present multi-SERS-probe platforms were producible to identify molecules and also a mixture (wine profile, BVOC profile, etc.). The present technology further involves machine-learning-assisted analysis for rapid and automated prediction. In contrast, most of the traditional SERS detection approaches still employ direct SERS detection of gases which suffers from weak signals especially in complex matrices, and the manual analysis of SERS signature which may be prone to human error. Such analyses usually involve "peak choosing", whereby only one or two peaks are used for calibration and measurements. Hence, many of the chemical information encoded within the spectrum may be lost when using the conventional analysis method.

In terms of gas detection, the platform addresses unresolved issues present in current commercial electrochemical (EC), metal-oxide semiconductor (MOS) and non-dispersive infrared (NDIR) gas sensors in the market. EC sensors and MOS sensors are by far the largest market holders for gas sensors (>50%), both of which measure the current generated when target gases are present at the electrode, through electrochemical current and conductivity measurements, respectively, which do not contain any specific molecular information, and therefore not specific to a particular gas. Hence, a major limitation of electrochemical or metal-oxide semiconductor sensors may be the effect of interfering gases. For instance, $SO_2$ may incur −165% signal interference on $NO_2$ electrochemical sensors. This means the presence of $SO_2$ cancels out the $NO_2$ signals in an EC sensor reading. The present exclusive super-fingerprinting technique extracts the comprehensive molecular profile of target analytes, thus preventing the possibility of false signals commonly observe in EC sensors. Secondly, SERS is water interference-free as water does not exhibit Raman signals in the targeted spectral window of detection. This indicates the present SERS technique is feasible in highly humid sea environment. In contrast, NDIR sensors' signals can be severely interfered by the presence of water and water vapor, and once again giving rise to false positive/negative signals.

In terms of BVOCs measurement, the approach of the present disclosure advantageously profiles the BVOCs present in human breath via the vibrational fingerprints obtained from a series of designed SERS reporter molecules. This is certainly non-trivial and is in fact impossible using traditional approaches like GC-MS and resistivity, whereby the latter is non-molecular-specific, prone to false results and can only detect a narrow range of BVOCs.

While the present disclosure has been particularly shown and described with reference to specific embodiments, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

The invention claimed is:

1. A surface-enhanced Raman scattering (SERS) chip for generating multiple SERS profiles simultaneously from one or more analytes suspected to be in a sample, the SERS chip comprising:
- one or more substrates; and
- one or more Raman probes formed on the one or more substrates,
  - wherein each of the one or more Raman probes comprises a SERS-active nanoparticle grafted with a receptor molecule,
  - (i) wherein the receptor molecule on each of the one or more Raman probes on one substrate is different from the receptor molecule of the one or more Raman probes on another substrate, or (ii) wherein the one or more Raman probes comprise two or more Raman probes and wherein the receptor molecule on each of the two or more Raman probes on one substrate is different,
  - wherein the receptor molecule comprises a thiol group proximal to the SERS-active nanoparticle and a functional group distal to the SERS-active nanoparticle,
  - wherein the functional group interacts with the one or more analytes to induce a change in molecular vibration of the receptor molecule which is identifiable by surface-enhanced Raman scattering for generating the multiple SERS profiles,
  - wherein the SERS-active nanoparticle comprises a nanopolyhedra, and
  - further comprising a bare SERS-active nanoparticle, which is absent of the receptor molecule, formed on the one or more substrates, wherein the one or more substrates comprise aluminum or silicon.

2. The surface-enhanced Raman scattering (SERS) chip of claim 1, wherein at least one of the SERS-active nanoparticle and the bare SERS-active nanoparticle comprises gold, silver, platinum, or palladium.

3. The surface-enhanced Raman scattering (SERS) chip of claim 1, wherein at least one of the SERS-active nanoparticle and the bare SERS-active nanoparticle comprises a nanopolyhedra, a nanosphere, a nanowire, a nanorod, a nanobowl, or a nanoplate.

4. The surface-enhanced Raman scattering (SERS) chip of claim 1, wherein at least one of the SERS-active nanoparticle and the bare SERS-active nanoparticle is porous or non-porous.

5. The surface-enhanced Raman scattering (SERS) chip of claim 1, wherein the receptor molecule comprises an aromatic thiol or an alkanethiol.

6. The surface-enhanced Raman scattering (SERS) chip of claim 1, wherein the functional group comprises an amine, a boron, a hydroxyl, a carboxyl, a carbonyl, a phenyl, a pyridyl, a halogen, or a naphthalene.

7. A method of identifying one or more analytes suspected to be in a sample, the method comprising:
- contacting the surface-enhanced Raman scattering (SERS) chip of claim 1 with a sample suspected to contain the one or more analytes;
- collecting SERS signals from the surface-enhanced Raman scattering (SERS) chip which has contacted the sample;
- constructing a combined-SERS profile from the SERS signals; and
- providing the combined-SERS profile to a device configured with a model trained to identify the one or more analytes from the combined-SERS profile.

8. The method of claim 7, wherein collecting the SERS signals comprises:
- introducing the surface-enhanced Raman scattering (SERS) chip which has contacted the sample to a laser to generate the SERS signals; and
- collecting the SERS signals through a sensor.

9. The method of claim 7, wherein constructing the combined-SERS profile comprises:
- (i) selecting a spectral range for a SERS signal;
- (ii) attributing the SERS signal to a receptor molecule which has undergone a change in molecular vibration; and
- repeating (i) and (ii) for another receptor molecule to generate multiple SERS profiles from each respective receptor molecule.

10. The method of claim 9, wherein constructing the combined-SERS profile comprises:
- connecting the multiple SERS profiles for each respective receptor molecule to form a continuous SERS spectrum as the combined-SERS profile; or
- adding the multiple SERS profiles within the spectral range selected to form an intensity-amplified SERS spectrum as the combined-SERS profile.

11. The method of claim 10, wherein connecting the multiple SERS profiles to form the combined-SERS profile comprises:
- arranging one SERS profile for one respective receptor molecule as a first SERS profile;
- adding a constant value to a second SERS profile for the one respective receptor molecule; and
- arranging the second SERS profile contiguously after the first SERS profile for forming the continuous SERS spectrum.

12. The method of claim 7, wherein providing the combined-SERS profile to the device comprises:

generating several of the combined-SERS profile for providing to the device; and training the device with the several combined-SERS profiles to update the model to identify the one or more analytes.

13. The method of claim 7, further comprising subjecting the combined-SERS profile to chemometric analysis.

14. A device comprising the surface-enhanced Raman scattering (SERS) chip of claim 1 for use in identifying one or more of:

one or more analytes in a gas, a liquid or a combination thereof; and a subject infected with coronavirus disease.

15. The surface-enhanced Raman scattering (SERS) chip of claim 1, wherein the receptor molecule comprises 4-mercaptopyridine, 4-aminodiphenyl disulfide, aminothiophenol, mercaptobenzoic acid, naphthalenethiol, mercaptophenylboronic acid, p-methylthiolbenzaldehyde, or bromothiophenol.

* * * * *